(12) United States Patent
Suzuki et al.

(10) Patent No.: US 11,673,574 B2
(45) Date of Patent: Jun. 13, 2023

(54) VEHICLE WITH MOUNTABLE AND REMOVABLE AUTONOMOUS DRIVING SYSTEM

(71) Applicant: TOYOTA JIDOSHA KABUSHIKI KAISHA, Toyota (JP)

(72) Inventors: Ikuma Suzuki, Okazaki (JP); Yuta Ohashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/722,968

(22) Filed: Apr. 18, 2022

(65) Prior Publication Data

US 2022/0258768 A1 Aug. 18, 2022

Related U.S. Application Data

(63) Continuation of application No. 17/137,531, filed on Dec. 30, 2020.

(30) Foreign Application Priority Data

Jan. 31, 2020 (JP) .............................. JP2020-015718

(51) Int. Cl.
| | |
|---|---|
| *B60W 60/00* | (2020.01) |
| *B60W 10/11* | (2012.01) |
| *B60W 10/18* | (2012.01) |
| *B60W 10/20* | (2006.01) |
| *B60K 20/02* | (2006.01) |
| *B60R 16/023* | (2006.01) |

(Continued)

(52) U.S. Cl.
CPC .......... *B60W 60/001* (2020.02); *B60K 20/02* (2013.01); *B60R 16/0231* (2013.01); *B60W 10/11* (2013.01); *B60W 10/18* (2013.01); *B60W 40/08* (2013.01); *B60W 60/0025* (2020.02); *B60W 10/20* (2013.01); *B60W 2520/06* (2013.01); *B60W 2756/10* (2020.02); *F16H 59/105* (2013.01)

(58) Field of Classification Search
None
See application file for complete search history.

(56) References Cited

U.S. PATENT DOCUMENTS

| | | | |
|---|---|---|---|
| 10,513,184 B2 * | 12/2019 | Lee ...................... | G06V 20/597 |
| 10,981,599 B2 * | 4/2021 | Hattori .................. | B60W 50/14 |

(Continued)

FOREIGN PATENT DOCUMENTS

| | | | | |
|---|---|---|---|---|
| CN | 110239510 A | | 9/2019 | |
| CN | 110239510 B | * | 5/2021 | ............ B60W 10/08 |

(Continued)

OTHER PUBLICATIONS

Office Action dated Sep. 16, 2022 in U.S. Appl. No. 17/137,531.

*Primary Examiner* — Abdhesh K Jha
(74) *Attorney, Agent, or Firm* — Oblon, McClelland, Maier & Neustadt, L.L.P.

(57) ABSTRACT

A vehicle comprises an autonomous driving system and a vehicle platform that controls the vehicle in response to a command received from the autonomous driving system. In the vehicle, when a first signal indicates an autonomous mode, the vehicle platform performs a shift change requested through a first command only while the second signal indicates a standstill.

11 Claims, 24 Drawing Sheets

(51) Int. Cl.
  *B60W 40/08*   (2012.01)
  *F16H 59/10*   (2006.01)

(56) References Cited

U.S. PATENT DOCUMENTS

| | | |
|---|---|---|
| 2006/0042367 A1 | 3/2006 | Matsuura |
| 2018/0188729 A1 | 7/2018 | Harris, III et al. |
| 2019/0004529 A1 | 1/2019 | Im et al. |
| 2019/0210544 A1* | 7/2019 | Gowda ............... B60R 16/0231 |
| 2020/0142426 A1* | 5/2020 | Gist, IV .................. B60R 11/04 |

FOREIGN PATENT DOCUMENTS

| | | |
|---|---|---|
| DE | 10 2009 045 759 A1 | 4/2011 |
| JP | 2006-105401 | 4/2006 |
| JP | 2017-088112 | 5/2017 |
| JP | 2017-177870 | 10/2017 |
| JP | 2018-075904 | 5/2018 |
| JP | 2018-132015 A | 8/2018 |
| JP | 2019-177807 | 10/2019 |
| KR | 10-2017-0105216 | 9/2017 |

* cited by examiner

| COMMAND | VALUES | CONTENTS |
|---|---|---|
| Propulsion Direction Command | No Request | NO REQUEST FOR SHIFT CHANGE |
| | R | REQUEST TO SHIFT TO R RANGE |
| | D | REQUEST TO SHIFT TO D RANGE |

FIG.15

| #1: CREATING A DRIVING PLAN | THE ADS CREATES A DRIVING PLAN. |
|---|---|
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: EXECUTION OF THE API WITH THE VALUE | THE ADS EXECUTES THE API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN THAT THE VEHICLE BEHAVIOR IS REFLECTED TO |

VEHICLE WITH MOUNTABLE AND REMOVABLE AUTONOMOUS DRIVING SYSTEM

CROSS-REFERENCE TO RELATED APPLICATIONS

This application is a continuation of U.S. application Ser. No. 17/137,531, filed Dec. 30, 2020, which claims priority to Japanese Patent Application No. 2020-015718, filed Jan. 31, 2020, the entire contents of each of which are hereby incorporated by reference in their entirety.

BACKGROUND

Field

The present disclosure relates to a vehicle and an autonomous driving system, and more specifically to a technology used to autonomously drive a vehicle.

Description of the Background Art

Japanese Patent Laid-Open No. 2018-132015 discloses a technology used to autonomously drive a vehicle. In the technology described in Japanese Patent Laid-Open No. 2018-132015, an autonomous driving ECU having a function to sense a vicinity of a vehicle is provided to the vehicle separately from an engine ECU, and the autonomous driving ECU issues an instruction to the engine ECU via an in-vehicle network. The ECU for managing the power of the vehicle and the ECU for autonomous driving that are independent from each other allow an autonomous driving function to be added without significantly changing an existing vehicle platform. In addition, it is expected that a third party should accelerate development of an autonomous driving function.

SUMMARY

It is also conceivable to make an autonomous driving system retrofittable to a vehicular body having a vehicle platform incorporated therein. However, a technique allowing a vehicle platform to appropriately perform vehicle control in response to a command received from such an autonomous driving system has not yet been established, and there remains room for improvement.

The present disclosure has been made in order to address the above issue, and contemplates a vehicle and autonomous driving system capable of appropriately performing a shift change when a vehicle platform carries out vehicle control in response to a command received from the autonomous driving system.

A vehicle in a first aspect of the present disclosure comprises an autonomous driving system and a vehicle platform that controls the vehicle in response to a command received from the autonomous driving system. The command sent from the autonomous driving system to the vehicle platform includes a first command to request switching a shift range. The autonomous driving system is configured to obtain a first signal indicating a state of an autonomous mode or a manual mode and a second signal indicating a moving direction of the vehicle. In the vehicle, when the first signal indicates the autonomous mode, the vehicle platform performs the shift change requested through the first command only while the second signal indicates a standstill.

In the manual mode, in which a driver manually drives the vehicle, a shift change is performed while the driver confirms the vehicle's state and situation. In the autonomous mode, in which autonomous driving is performed, the autonomous driving system determines the vehicle's state and situation. When a shift change is performed while the vehicle is travelling, the vehicle may travel unstably depending on the vehicle's state and situation. In addition, it may be difficult to perform a shift change while the vehicle is traveling. In the above configuration, a shift change requested through the first command is performed only when it is confirmed through the second signal that the vehicle is at a standstill. This configuration allows a shift change to be appropriately performed when the vehicle platform carries out vehicle control in response to a command received from the autonomous driving system.

The command sent from the autonomous driving system to the vehicle platform may further include a second command to request acceleration and deceleration. In the vehicle, the autonomous driving system may be configured such that when the autonomous driving system issues the first command to request the vehicle platform to switch a shift range of the vehicle to another thereof in order to perform a shift change of the vehicle the autonomous driving system also issues the second command to simultaneously request the vehicle platform to provide deceleration.

In the vehicle, the autonomous driving system may be configured to issue the second command to continue to request the vehicle platform to provide deceleration while the shift change requested through the first command is performed.

According to the above configuration, a shift change is performed in a state in which acceleration of the vehicle is suppressed in response to a request through the second command for deceleration. This allows a shift change to be easily, appropriately performed.

The vehicle may include a shift lever. In the vehicle, the autonomous driving system may be further configured to obtain a third signal indicating the current shift range of the vehicle. When the first signal indicates the autonomous mode, a driver operation of the shift lever may not be reflected in the third signal. This configuration can suppress a change in value of the third signal when a shift change is not performed during autonomous driving.

In the vehicle, the autonomous driving system may further be configured to obtain a fourth signal indicating a shift lever position by a driver. The autonomous driving system may be configured to determine a value for the first command by referring to the fourth signal. This configuration allows the autonomous driving system to reflect the driver's shift lever operation in shift control in autonomous driving, as required.

In the vehicle, the first command may be set to any one of a first value indicating no request, a second value requesting a shift to a reverse range, and a third value requesting a shift to a drive range. This configuration allows simple control to be applied to perform a shift change in autonomous driving.

In the vehicle, the second signal may indicate standstill when a prescribed number of wheels of the vehicle continue a speed of 0 for a prescribed period of time. This configuration can suppress indication of standstill provided by the second signal while the vehicle is moving.

A vehicle in a second aspect of the present disclosure comprises a vehicle platform that controls the vehicle, and a vehicle control interface that mediates communication of a signal between the vehicle platform and the autonomous driving system. When the vehicle has the autonomous driving system attached thereto, the vehicle platform can perform autonomous driving control for the vehicle in response to a command received from the autonomous driving system. The command sent from the autonomous driving system to the vehicle platform through the vehicle control interface includes a first command to request switching a shift range. The vehicle control interface is configured to output to the autonomous driving system a first signal indicating a state of an autonomous mode or a manual mode and a second signal indicating a moving direction of the vehicle. The vehicle platform is configured such that when the first signal indicates the autonomous mode, the vehicle platform performs the shift change requested through the first command only while the second signal indicates a standstill.

The vehicle does not include an autonomous driving system. However, when the autonomous driving system is retrofitted to the vehicle, the shift control described above comes to be performed. That is, a shift change requested through the first command is performed only when it is determined through the second signal that the vehicle is at a standstill. This configuration allows a shift change to be appropriately performed when the vehicle platform carries out vehicle control in response to a command received from the autonomous driving system.

An autonomous driving system in a third aspect of the disclosure comprises a computer configured to send a command to a vehicle platform. The computer is configured to obtain a first signal indicating a state of an autonomous mode or a manual mode, and a second signal indicating a moving direction of the vehicle. The command sent from the computer to the vehicle platform includes a first command to request switching a shift range. The computer is configured such that when the first signal indicates the autonomous mode, the computer issues the first command to request a shift change only while the second signal indicates a standstill.

The autonomous driving system issues the first command to request switching a shift range only when it is determined through the second signal that the vehicle is at a standstill. This configuration allows a shift change to be appropriately performed when the vehicle platform carries out vehicle control in response to a command received from the autonomous driving system.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 15 is a diagram showing a typical flow in an autonomous driving system.

DESCRIPTION OF THE PREFERRED EMBODIMENTS

Embodiments of the present disclosure will now be described in detail hereinafter with reference to the drawings, in which identical or corresponding components are identically denoted and will not be described repeatedly.

Figure 1:
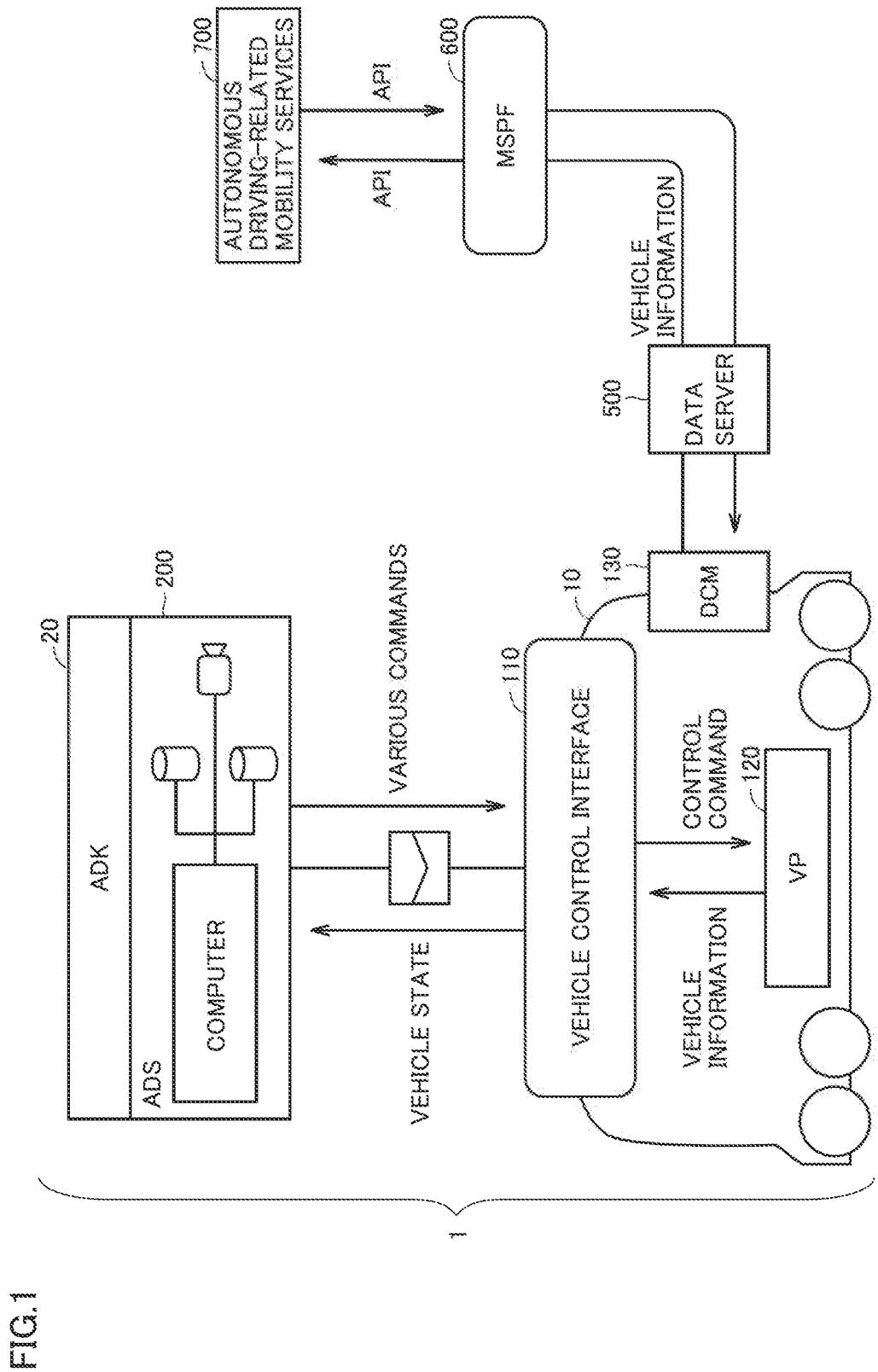
FIG. 1 is a diagram generally showing a MaaS system to which a vehicle according to an embodiment of the present disclosure is applied.

FIG. 1 is a diagram generally showing a MaaS (Mobility as a Service) system to which a vehicle according to the present embodiment is applied.

Referring to FIG. 1, the MaaS system comprises a vehicle 1, a data server 500, an MSPF (Mobility Service Platform) 600, and autonomous driving-related mobility services 700.

Vehicle 1 includes a vehicular body 10 and an ADK (Autonomous Driving Kit) 20.

Vehicular body 10 includes a vehicle control interface 110, a VP (Vehicle Platform) 120, and a DCM (Data Communication Module) 130. ADK 20 includes an ADS (Autonomous Driving System) 200 for autonomously driving vehicle 1. Vehicle control interface 110 mediates communication of a signal between VP 120 and ADS 200. ADK 20 is actually attached to vehicular body 10 although FIG. 1 shows vehicular body 10 and ADK 20 at positions distant from each other. In the present embodiment, ADK 20 has its body attached to a roof top of vehicular body 10. Note, however, that where ADK 20 is mounted can be changed as appropriate.

Vehicle 1 is configured to be autonomously drivable. When vehicle 1 is autonomously driven, VP 120 and ADS 200 communicate signals with each other via vehicle control interface 110, and VP 120 carries out travel control (that is, autonomous driving control) in an autonomous mode in response to a command received from ADS 200. ADK 20 is removable from vehicular body 10. Even when vehicular body 10 has ADK 20 removed therefrom, the user can drive the vehicle to cause the vehicle to travel with vehicular body 10 alone. When the vehicle travels with vehicular body 10 alone, VP 120 carries out travel control in a manual mode (that is, in response to the user's operation).

In the present embodiment, ADS 200 communicates signals with vehicle control interface 110 through an API (Application Program Interface) defining each signal to be communicated. ADS 200 is configured to process various signals defined by the API. For example, ADS 200 creates a driving plan for vehicle 1 and outputs various commands to vehicle control interface 110 through the API for causing vehicle 1 to travel in accordance with the created driving plan. Hereinafter, each of the various commands output from ADS 200 to vehicle control interface 110 will also be referred to as an "API command." Further, ADS 200 receives various signals indicating states of vehicular body 10 from vehicle control interface 110 through the API, and reflects the received states of vehicular body 10 in creating the driving plan. Hereinafter, each of the various signals that ADS 200 receive from vehicle control interface 110 will also be referred to as an "API signal." An API command and an API signal both correspond to signals defined by the API. Details in configuration of ADS 200 will be described hereinafter (see FIG. 2).

Vehicle control interface 110 receives various API commands from ADS 200. When vehicle control interface 110 receives an API command from ADS 200, vehicle control interface 110 converts the API command into a format of a signal that can be processed by VP 120. Hereinafter, an API command converted into a format of a signal that can be processed by VP 120 will also be referred to as a "control command." When vehicle control interface 110 receives an API command from ADS 200, vehicle control interface 110 outputs to VP 120 a control command corresponding to the API command.

Vehicle control interface 110 outputs to ADS 200 various API signals indicating states of vehicular body 10. In the present embodiment, VP 120 detects a state of vehicular body 10 and sequentially sends various signals (e.g., a sensor signal or a status signal) indicating the state of vehicular body 10 to vehicle control interface 110 in real time. Vehicle control interface 110 receives a signal from VP 120 and uses the received signal to obtain an API signal as described above. Vehicle control interface 110 may determine a value for the API signal based on the signal received from VP 120, or may convert the signal received from VP 120 (i.e., a signal indicating a state of vehicular body 10) to a form of an API signal. Thus, vehicle control interface 110 obtains an API signal in which a value indicating a state of vehicular body 10 is set, and vehicle control interface 110 outputs the obtained API signal to ADS 200. From vehicle control interface 110 to ADS 200, the API signal indicating the state of vehicular body 10 is sequentially output in real time.

In the present embodiment, a less versatile signal defined by, for example, an automobile manufacturer is communicated between VP 120 and vehicle control interface 110, and a more versatile signal (for example, a signal defined by an open API) is communicated between ADS 200 and vehicle control interface 110. Vehicle control interface 110 converts a signal between ADS 200 and VP 120 to allow VP 120 to control vehicle 1 in response to a command received from ADS 200. By attaching ADS 200 to vehicular body 10 having VP 120 incorporated therein, VP 120 can perform autonomous driving control for vehicular body 10 in response to a command received from ADS 200. Note, however, that vehicle control interface 110 functions not only to convert a signal, as described above. For example, vehicle control interface 110 may make a determination, as prescribed, and send a signal based on a result of the determination (e.g., a signal for making notification, an instruction, or a request) to at least one of VP 120 and ADS 200. Details in configuration of vehicle control interface 110 will be described hereinafter (see FIG. 2).

VP 120 includes various systems and various sensors for controlling vehicular body 10. Commands are sent from ADS 200 to VP 120 through vehicle control interface 110. VP 120 carries out vehicle control variously in response to commands received from ADS 200 (more specifically, control commands corresponding to API commands sent by ADS 200). Various commands for causing vehicle 1 to travel in accordance with a driving plan as described above are transmitted from ADS 200 to VP 120, and vehicle 1 is autonomously driven by VP 120 carrying out vehicle control variously in response to the commands. Details in configuration of VP 120 will more specifically be described hereinafter (see FIG. 2).

DCM 130 includes a communication I/F (interface) allowing vehicular body 10 to communicate with data server 500 wirelessly. DCM 130 outputs various vehicle information such as a velocity, a position, and an autonomous driving state to data server 500. Further, DCM 130 for example receives from autonomous driving-related mobility services 700 through MSPF 600 and data server 500 various types of data for travelling of an autonomously driven vehicle including vehicle 1 managed by mobility services 700.

MSPF 600 is an integrated platform to which various mobility services are connected. In addition to autonomous driving related-mobility services 700, various mobility services (not shown) (for example, various mobility services provided by a ride-share company, a car-sharing company, an insurance company, a rent-a-car company, and a taxi company) are connected to MSPF 600. Various mobility services including mobility services 700 can use various functions that are provided by MSPF 600 through an API published on MSPF 600, depending on service contents.

Autonomous driving-related mobility services 700 provide mobility services using an autonomously driven vehicle including vehicle 1. Mobility services 700 can obtain various types of information (for example, driving control data of vehicle 1 communicating with data server 500, and information stored in data server 500) from MSPF 600 through an API published on MSPF 600. Further, mobility services 700 can transmit various types of information (for example, data for management of an autonomously driven vehicle including vehicle 1) to MSPF 600 through the API.

MSPF 600 publishes an API for using various types of data on vehicular state and vehicular control necessary for development of an ADS, and an ADS provider can use as the API the various types of data stored in data server 500 on vehicular state and vehicular control necessary for development of the ADS.

Figure 2:
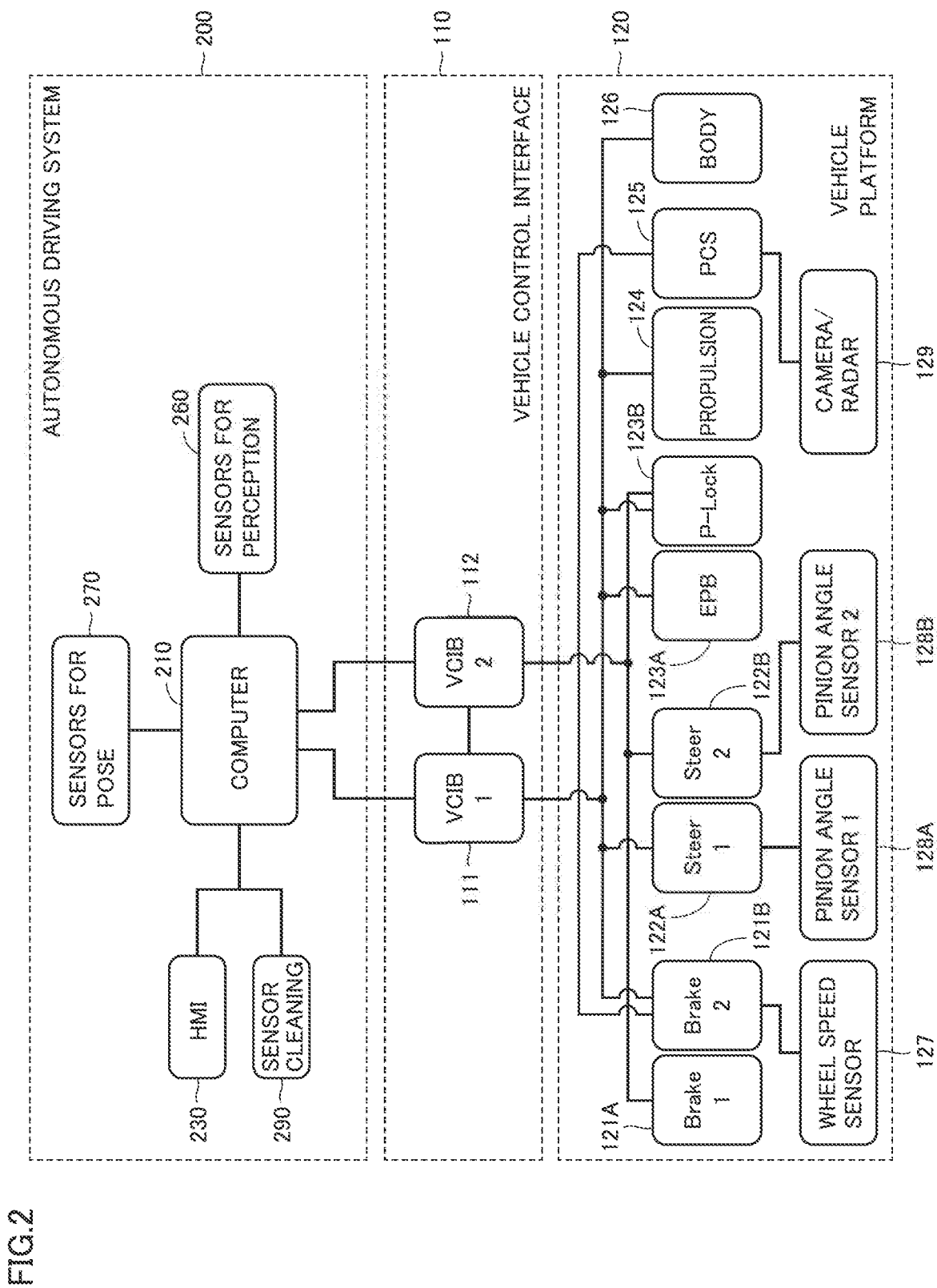
FIG. 2 is a diagram showing details in configuration of a vehicle control interface, a vehicle platform, and an autonomous driving system that the vehicle shown in FIG. 1 comprises.

FIG. 2 is a diagram showing details in configuration of vehicle control interface 110, VP 120 and ADS 200 that vehicle 1 comprises.

Referring to FIG. 2 together with FIG. 1, ADS 200 includes an ADC (Autonomous Driving Control) computer 210, an HMI (Human Machine Interface) 230, sensors for perception 260, sensors for pose 270, and a sensor cleaning 290.

ADC computer 210 includes a processor and a storage device for storing autonomous driving software, and is configured to be capable of executing the autonomous driving software by the processor. The above-described API is executed by the autonomous driving software.

HMI 230 is a device allowing a user and ADC computer 210 to communicate information therebetween. HMI 230 may include an input device to receive an input (including a voice input) from a user, and a notification device to notify the user of information. For example, ADC computer 210 may notify the user of prescribed information (e.g., an autonomous driving state, or occurrence of failure) through the notification device. The user can use the input device to instruct or request ADC computer 210, change values of parameters used in the autonomous driving software that are permitted to be changed, and the like. HMI 230 may be a touch panel display which functions as both the input device and the notification device.

Sensors for perception 260 include various sensors which obtain environment information that is information for perceiving an environment external to vehicle 1. Sensors for perception 260 are configured to obtain environment information of vehicle 1 and output the environment information to ADC computer 210. The environment information is used for autonomous driving control. In the present embodiment, sensors for perception 260 include a camera that captures an image around vehicle 1 (including its front and rear sides) and an obstacle detector (e.g., a millimeter-wave radar and/or lidar) that detects an obstacle by an electromagnetic wave or a sound wave. Note, however, that the sensors are not limited as such, and any sensor suitable for obtaining environment information used for autonomous driving control may be adopted as sensors for perception 260. ADC computer 210 can recognize, for example, a person, an object (e.g., another vehicle, a pole, a guard rail and the like), and a line (e.g., a center line) on a road that are present in a range perceivable from vehicle 1 by using environment information received from sensors for perception 260. Artificial intelligence (AI) or an image processing processor may be used for recognition.

Sensors for pose 270 are configured to obtain pose information, which is information regarding a pose of vehicle 1, and output the pose information to ADC computer 210. Sensors for pose 270 include various sensors to sense vehicle 1's acceleration, angular velocity, and position. In the present embodiment, sensors for pose 270 include an IMU (Inertial Measurement Unit) and a GPS (Global Positioning System). The IMU for example detects vehicle 1's acceleration in each of the vehicle's longitudinal, lateral and vertical directions, and detects vehicle 1's angular velocity in each of the vehicle's roll, pitch, and yaw directions. The GPS detects the position of vehicle 1 by using signals received from a plurality of GPS satellites. Combining an IMU and a GPS to measure a pose with high accuracy is a technique known in the field of automobiles and aircraft. ADC computer 210 may for example use such a known technique to measure a pose of vehicle 1 from the pose information.

Sensor cleaning 290 is a device to remove soiling from a sensor (for example, sensors for perception 260) exposed to external air outside the vehicle. For example, sensor cleaning 290 may be configured to use a cleaning solution and a wiper to clean a lens of the camera and an exit of the obstacle detector.

Hereinafter, how vehicle control interface 110 and VP 120 included in vehicular body 10 are configured will be described. In vehicular body 10, for better safety, a prescribed function (for example, braking, steering, and locking the vehicle) is provided with redundancy. Vehicular body 10 includes a plurality of systems to implement equivalent functions.

Vehicle control interface 110 includes VCIBs (Vehicle Control Interface Boxes) 111 and 112. Each of VCIBs 111 and 112 is an ECU (Electronic Control Unit) functioning as an interface and a signal converter between ADS 200 and VP 120. Each of VCIBs 111 and 112 is communicatively connected to ADC computer 210. VCIBs 111 and 112 are both connected to a system constituting VP 120. Note, however, that, as shown in FIG. 2, VCIB 111 and VCIB 112 are partially different in to what they are connected. VCIB 111 and VCIB 112 are mutually communicatively connected. Each of VCIBs 111 and 112 can operate alone, and even when one VCIB fails, the other normally operates, and vehicle control interface 110 thus normally operates.

Each of VCIBs 111 and 112 includes a processor, a RAM (Random Access Memory), and a storage device. As the processor, for example, a CPU (Central Processing Unit) can be employed. The storage device is configured to be able to hold stored information. As the storage device, for example, a ROM (Read Only Memory) and/or a rewritable nonvolatile memory can be employed. The storage device stores a program, and in addition, information (e.g., various parameters) used in the program. A process of vehicle control interface 110, which will be described hereinafter (see FIGS. 4 to 9 and 11), is performed by the processor executing a program stored in the storage device (e.g., a program using the API described above). These processes may be performed by any of VCIBs 111 and 112 or may be performed by VCIBs 111 and 112 cooperating when they both normally operate.

In the present embodiment, VP 120 and ADS 200 perform CAN (Controller Area Network) communication with each other via vehicle control interface 110. The API described above is executed periodically as defined for each API. However, a system in which VP 120 and ADS 200 communicate is not limited to the CAN, and may be changed as appropriate.

When any failure occurs in one of the redundant systems of VP 120, VCIBs 111 and 112 switch/shut down a control system to cause a normal system to operate properly. This maintains a function of VP 120 (e.g., braking, steering, and locking the vehicle).

VP 120 includes brake systems 121A and 121B. Each of brake systems 121A and 121B includes a plurality of braking mechanisms provided to each wheel of vehicular body 10, a braking actuator serving as an actuator for driving each braking mechanism, and a control device that controls the braking actuator. The braking mechanism may be, for example, a hydraulic disc brake that applies braking force to a wheel through hydraulic pressure adjustable by the actuator. The control device controls the braking actuator in response to a user operation (for example, a brake pedal operation) in the manual mode, and controls the braking actuator in response to a control command received from VCIBs 111 and 112 in the autonomous mode. The control device of brake system 121A and the control device of brake system 121B may be communicatively connected to each other. Brake systems 121A and 121B both implement a braking function and can operate alone. Therefore, even when one brake system fails, the other normally operates, and vehicular body 10 can be braked.

VP 120 further includes a wheel speed sensor 127. Wheel speed sensor 127 is provided to each wheel of vehicular body 10 and senses a rotation speed of each wheel. A result of sensing by wheel speed sensor 127 is transmitted to vehicle control interface 110. In the present embodiment, the rotation speed of each wheel sensed by wheel speed sensor 127 is output from wheel speed sensor 127 to brake system 121B, and from brake system 121B to VCIB 111.

VP 120 further includes steering systems 122A and 122B. Each of steering systems 122A and 122B includes a steering mechanism capable of adjusting and varying a steering angle of a steering wheel of vehicle 1, a steering actuator serving as an actuator for driving the steering mechanism, and a control device that controls the steering actuator. The steering mechanism may be, for example, a rack and pinion type EPS (Electric Power Steering) capable of adjusting a steering angle by the actuator. The control device controls the steering actuator in response to a user operation (e.g., a steering-wheel operation) in the manual mode, and controls the steering actuator in response to a control command received from VCIBs 111 and 112 in the autonomous mode. The control device of steering system 122A and the control device of steering system 122B may be communicatively connected to each other. Steering systems 122A and 122B both implement a steering function and can operate alone. Therefore, even when one of steering systems 122A and 122B fails, the other normally operates, and vehicular body 10 can thus be steered.

Pinion angle sensors 128A and 128B are connected to steering systems 122A and 122B, respectively. Each of pinion angle sensors 128A and 128B senses a pinion angle. The pinion angle is a rotation angle of a pinion gear coupled to a rotation shaft of the steering mechanism or the steering actuator. The pinion angle represents a tire turning angle. Results of sensing by pinion angle sensors 128A and 128B are transmitted to vehicle control interface 110. In the present embodiment, the pinion angle sensed by pinion angle sensor 128A is output from pinion angle sensor 128A to steering system 122A and from steering system 122A to VCIB 111. The pinion angle sensed by pinion angle sensor 128B is output from pinion angle sensor 128B to steering system 122B and from steering system 122B to VCIB 112.

VP 120 further includes an EPB (Electric Parking Brake) system 123A and a P (parking)-Lock system 123B.

EPB system 123A includes an EPB (electric parking brake) that applies braking force to at least one wheel of vehicular body 10, and a control device that controls the EPB. The EPB is provided separately from the braking mechanism described above, and locks the wheel by an electric actuator. The EPB may be configured to lock the wheel by operating a drum brake by the electric actuator for parking brakes. Further, the EPB may be configured to lock the wheel by adjusting by the electric actuator the hydraulic pressure of a hydraulic system different from the above-described braking actuator. The control device controls the EPB in response to a user operation in the manual mode, and controls the EPB in response to a control command received from VCIBs 111 and 112 in the autonomous mode.

P-Lack system 123B includes a P-Lock mechanism provided in the transmission of vehicular body 10, a P-Lock actuator serving as an actuator for driving the P-Lock mechanism, and a control device that controls the P-Lock actuator. The P-Lock mechanism may be, for example, a mechanism to lock a position of rotation of the output shaft of the transmission by fitting a parking lock pawl, which is positionally adjustable by an actuator, into a gear (a lock gear) coupled to a rotational element in the transmission and thus provided. The control device controls the P-Lock actuator in response to a user operation in the manual mode, and controls the P-Lock actuator in response to a control command received from VCIBs 111 and 112 in the autonomous mode.

EPB system 123A and P-Lock system 123B both implement a vehicle locking function and can operate alone. Therefore, even when one of EPB system 123A and P-Lock system 123B fails, the other operates normally, and vehicular body 10 can be locked. The control device of EPB system 123A and the control device of P-Lock system 123B may be communicatively connected to each other.

VP 120 further includes a propulsion system 124, a PCS (Pre-Crash Safety) system 125, and a body system 126.

Propulsion system 124 includes a shift device that determines a shift range (that is, a propulsion direction) and a driving device that imparts propulsive force to vehicular body 10. The shift device has a shift lever operated by the user, and in the manual mode, the shift device switches a shift range in response to a user operation (that is, a shift lever operation). In the autonomous mode, the shift device switches a shift range in response to a control command received from VCIBs 111 and 112. The driving device includes, for example, a battery that stores electric power for traveling, a motor generator that receives electric power from the battery to rotate a wheel of vehicular body 10, and a control device that controls the motor generator. The control device controls the motor generator in response to a user operation (for example, an accelerator pedal operation) in the manual mode, and controls the motor generator in response to a control command received from VCIBs 111 and 112 in the autonomous mode.

PCS system 125 uses a camera/radar 129 which is a camera and/or a radar to carry out vehicle control to mitigate or avoid damage caused by collision. PCS system 125 is communicatively connected to brake system 121B. PCS system 125 for example uses camera/radar 129 to determine whether there is a possibility of a collision, and when PCS system 125 determines that there is a possibility of a collision, PCS system 125 requests brake system 121B to increase a braking force.

Body system 126 includes body-related components (e.g., a direction indicator, a horn, and a wiper) and a control device that controls the body-related components. In the manual mode, the control device controls the body-related components in response to a user operation, and in the autonomous mode, the control device controls the body-related components in response to a control command received from VCIBs 111 and 112.

While in VP 120 according to the present embodiment a control device is provided for each control system, the number of control devices can be changed as appropriate.

For example, one control device may be configured to integrally control each control system.

Vehicle 1 according to the present embodiment is a four-wheel electric vehicle (EV) which does not include an engine (an internal combustion engine). However, vehicle 1 is not limited thereto, and may be a connected car (e.g., a hybrid vehicle) provided with an engine. The number of wheels that vehicle 1 includes is not limited to four wheels, and may be changed as appropriate. Vehicle 1 may include three wheels or five or more wheels.

Vehicle 1 is configured to switchable between an autonomous mode and a manual mode. An API signal that ADS 200 receives from vehicle control interface 110 includes a signal Autonomy_State indicating whether vehicle 1 is in the autonomous mode or the manual mode. The user can select either the autonomous mode or the manual mode via a prescribed input device. The prescribed input device may be an input device (not shown) included in vehicular body 10 (for example, vehicle control interface 110 or VP 120). When any mode is selected by the user, vehicle 1 enters the selected mode, and the selection result is reflected in the Autonomy_State. However, when vehicle 1 is not in an autonomously drivable state, the vehicle does not transition to the autonomous mode even when the user selects the autonomous mode. Autonomy_State indicating the current mode of the vehicle (i.e., the autonomous mode/the manual mode) is sequentially output from vehicle control interface 110 to ADS 200 in real time. In an initial state (that is, when vehicle 1 is started), vehicle 1 is in the manual mode. In the present embodiment, Autonomy_State corresponds to an example of a "first signal" according to the present disclosure. ADS 200 may be configured to obtain Autonomy_State through HMI 230 (see FIG. 2).

Figure 3:
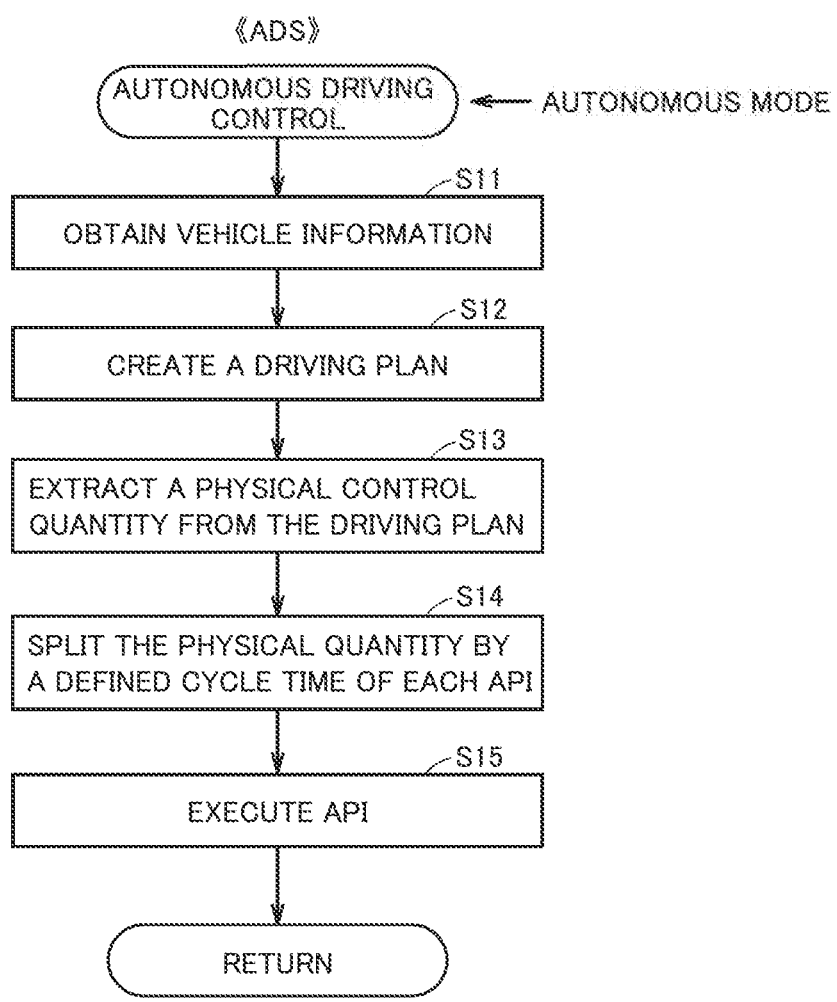
FIG. 3 is a flowchart of a process performed by the autonomous driving system in autonomous driving control according to an embodiment of the present disclosure.

When vehicle 1 is in the autonomous mode, ADS 200 executes the API to transmit a command for autonomous driving control to VP 120 through vehicle control interface 110. FIG. 3 is a flowchart of a process performed by ADS 200 in autonomous driving control according to the present embodiment. The process shown in this flowchart is repeatedly performed periodically as corresponding to the API (i.e., in accordance with an API period) when vehicle 1 is in the autonomous mode.

Referring to FIG. 3 together with FIGS. 1 and 2, in step (hereinafter simply referred to as "S") 11, ADS 200 obtains current information of vehicle 1. For example, ADC computer 210 obtains environment information and pose information of vehicle 1 from sensors for perception 260 and sensors for pose 270. In the present embodiment, regardless of whether vehicle 1 may be in the autonomous mode or the manual mode, an API signal indicating a state of vehicle 1 (Propulsion Direction by Driver, Actual_Moving_Direction, Propulsion Direction Status, Estimated_Max_Accel_Capability, Estimated_Max_Decel_Capability, Longitudinal_Velocity, etc., described hereinafter) is sequentially output from vehicle control interface 110 to ADS 200 in real time. ADS 200 can refer to such an API signal to obtain information of vehicle 1 to be used in generating a driving plan (S12), which will be described hereinafter. When the Autonomy_State indicates the manual mode, the process of series of steps shown in FIG. 3 ends.

In S12, ADC computer 210 creates a driving plan based on the information of vehicle 1 obtained in S11. When a driving plan is already present, the driving plan may be corrected based on the information of vehicle 1. For example, ADC computer 210 calculates a behavior of vehicle 1 (e.g., a pose of vehicle 1) and creates a driving plan suitable for a state of vehicle 1 and an environment external to vehicle 1. The driving plan is data indicating a behavior of vehicle 1 for a prescribed period of time.

In S13, ADC computer 210 extracts a physical control quantity (acceleration, a tire turning angle, etc.) from the driving plan created in S12.

In S14, ADC computer 210 splits the physical quantity extracted in S13 by a defined cycle time of each API.

In S15, ADC computer 210 executes the API using the physical quantity split in S14. When the API is thus executed, an API command (e.g., a Propulsion Direction Command, an Acceleration Command, and a Standstill Command, and the like, which will be described hereinafter) for implementing the physical quantity in accordance with the driving plan is transmitted from ADS 200 to vehicle control interface 110. Vehicle control interface 110 transmits a control command corresponding to the received API command to VP 120, and VP 120 carries out autonomous driving control of vehicle 1 in response to the control command.

In the present embodiment, it is assumed that vehicle 1 is autonomously driven when vehicle 1 is manned. This is not exclusive, however, and vehicle 1 may be autonomously driven when vehicle 1 is unmanned.

The API signal includes a signal Longitudinal_Velocity indicating an estimated longitudinal velocity of vehicle 1. Longitudinal_Velocity indicates, for example, a longitudinal velocity of vehicle 1 as estimated by VP 120 using a wheel speed sensor.

Longitudinal_Velocity indicates an absolute value of the velocity. That is, Longitudinal_Velocity indicates a positive value both when vehicle 1 moves forward and when vehicle 1 moves backward.

Figure 4:
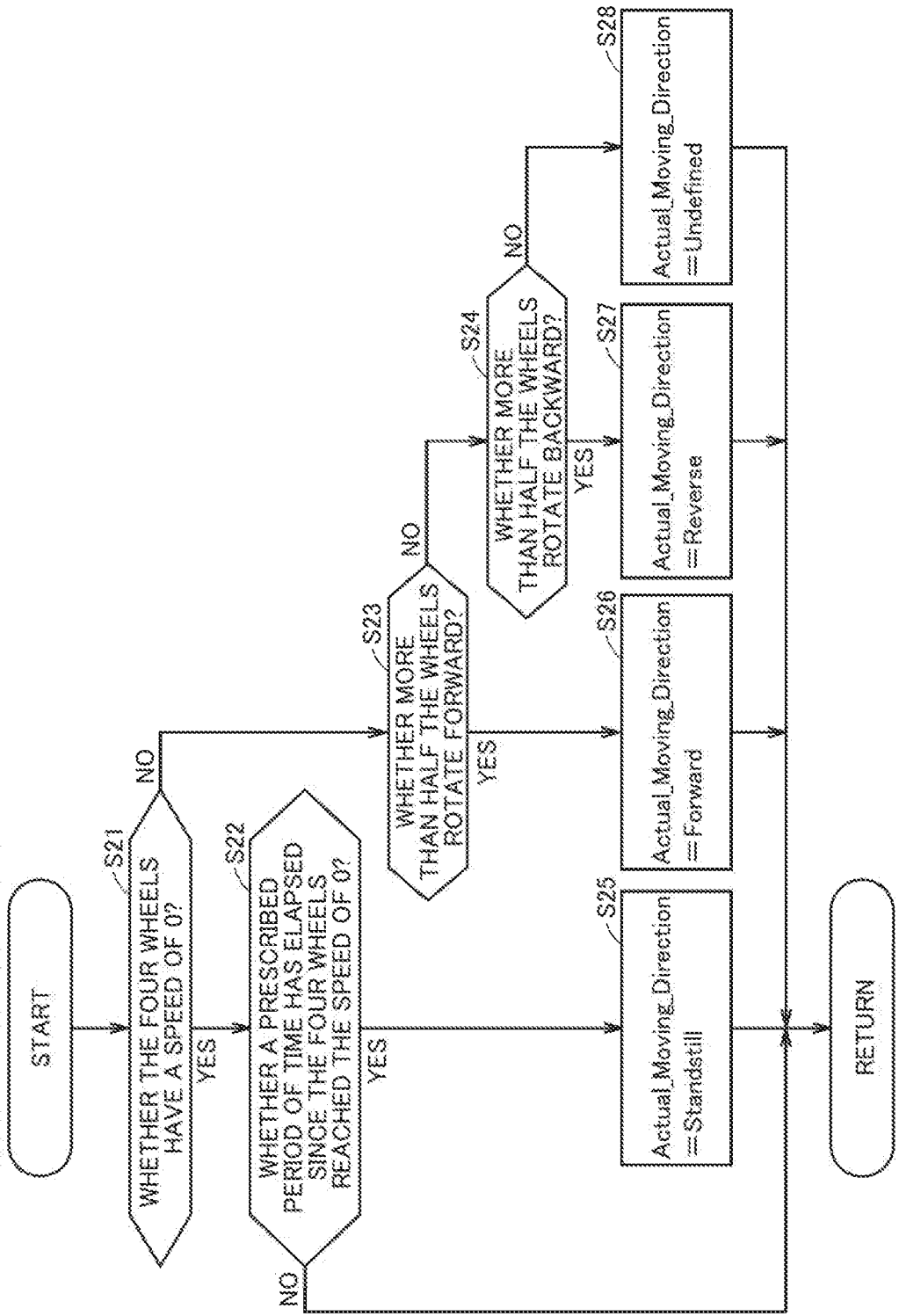
FIG. 4 is a flowchart of a process performed in the vehicle for setting an actual moving direction according to an embodiment of the present disclosure.

The API signal includes a signal Actual_Moving_Direction indicating a moving direction of vehicle 1. In the present embodiment, Actual_Moving_Direction is set to any one of Forward, Reverse, Standstill, and Undefined. FIG. 4 is a flowchart of a process performed by vehicle control interface 110 for setting Actual_Moving_Direction. The Actual_Moving_Direction according to the present embodiment corresponds to an example of a "second signal" according to the present disclosure.

Referring to FIG. 4 together with FIG. 2, in S21, vehicle control interface 110 determines whether the wheels (i.e., four wheels) of vehicle 1 all have a speed of 0.

When a determination of YES is made in S21 (that is, the four wheels are all stopped), then, vehicle control interface 110 determines in S22 whether a prescribed period of time (for example of 500 msec) has elapsed since the four wheels reached the speed of 0. While a determination of YES is made in S21 and a determination of NO is made in S22 (that is, the prescribed period of time has not yet elapsed), S21 and S22 are repeated. Once a determination of YES is made in S22 (that is, the prescribed period of time has elapsed), vehicle control interface 110 sets the Actual_Moving_Direction to "Standstill" in S25.

When a determination of NO is made in S21 (that is, any of the four wheels is rotating), vehicle control interface 110 determines in S23 whether more than half the wheels rotate forward. When a determination of YES is made in S23 (that is, when three or more wheels rotate forward), vehicle control interface 110 sets the Actual_Moving_Direction to "Forward" in S26.

When a determination of NO is made in S23 (that is, when two or less wheels rotate forward), vehicle control interface 110 determines in S24 whether more than half the wheels rotate backward. When a determination of YES is made in S24 (that is, when three or more wheels rotate backward), vehicle control interface 110 sets the Actual_Moving_Direction to "Reverse" in S27. In contrast, when a determination of NO is made in S24 (that is, when two or less wheels rotate backward), vehicle control interface 110 sets the Actual_Moving_Direction to "Undefined" in S28.

Thus, in vehicle 1 according to the present embodiment, the Actual_Moving_Direction indicates Standstill when a prescribed number of wheels (for example, four wheels) of vehicle 1 continue a speed of 0 for a prescribed period of time. In the present embodiment, the process shown in FIG. 4 is performed by vehicle control interface 110. This is not exclusive, however, and the process of FIG. 4 may be partially or entirely performed by VP 120. For example, the FIGS. 4 S21 and S22 may be performed by VP 120, rather than vehicle control interface 110, and vehicle control interface 110 may receive a result of the steps from VP 120.

A command sent from ADS 200 to VP 120 through vehicle control interface 110 includes an Acceleration Command and a Standstill Command.

The Acceleration Command is a signal requesting acceleration and deceleration in the autonomous mode. The Acceleration Command indicates a positive value when acceleration is requested for a direction indicated by the Propulsion Direction Status, and the Acceleration Command indicates a negative value when deceleration is requested in that direction. The Acceleration Command requests acceleration (+) and deceleration (−) for the direction indicated by the Propulsion Direction Status. Upper limit values of acceleration and deceleration of the Acceleration Command are determined by estimated maximum acceleration capability and estimated maximum deceleration capability, respectively, which will be described hereinafter. The Acceleration Command according to the present embodiment corresponds to an example of a "second command" according to the present disclosure.

The API signal includes a signal Estimated_Max_Accel_Capability indicating an estimated maximum acceleration, and a signal Estimated_Max_Decel_Capability indicating an estimated maximum deceleration. In the present embodiment, VP 120 calculates an acceleration provided at the time of WOT (Wide Open Throttle), estimates a value for Estimated_Max_Accel_Capability (that is, a possible maximum acceleration that vehicle 1 is currently requested to provide) based on the calculated acceleration, the current state of vehicle 1 and the current road surface condition (e.g., gradient and road surface load), and outputs the estimated value to vehicle control interface 110. Estimated_Max_Accel_Capability is such that a direction in which vehicle 1 proceeds (that is, a direction indicated by the Propulsion Direction Status) is a positive direction and the reverse direction is a negative direction. Estimated_Max_Decel_Capability has a value varying in a range of −9.8 m/s² to 0 m/s². VP 120 estimates a value for Estimated_Max_Decel_Capability (that is, a possible maximum deceleration that vehicle 1 is currently requested to provide) based on the states of brake systems 121A, 121B (e.g., a brake mode), the current state of vehicle 1, and the current road surface condition. Depending on the state of vehicle 1 and the road surface condition, Estimated_Max_Decel_Capability may be 0.

The Acceleration Command has a value selected from the range of Estimated_Max_Decel_Capability to Estimated_Max_Accel_Capability. When VP 120 receives a request from both the Acceleration Command and PCS system 125 (FIG. 2) for deceleration, VP 120 selects a maximum deceleration out of the decelerations requested by the Acceleration Command and PCS system 125. Note that deceleration is represented in magnitude by an absolute value. That is, deceleration becomes smaller as it approaches 0, and deceleration becomes larger as it is farther away from 0.

The Standstill Command is a signal requesting to maintain stationary in the autonomous mode. In the present embodiment, the Standstill Command is set to any one of No Request, Applied (a value requesting to maintain stationary), and Released (a value requesting release from maintaining stationary). The Standstill Command can be set to maintain stationary when vehicle 1 is at a standstill (for example when the Actual_Moving_Direction is "Standstill"). When the Acceleration Command indicates an acceleration value (a positive value), the Standstill Command is not set to "Applied." Once to maintain stationary (e.g., brake hold control described hereinafter) is completed, vehicle 1 transitions to Standstill.

The API signal includes a signal Standstill Status indicating a stationary status of vehicle 1. The Standstill Status basically indicates either Applied (a value indicating that vehicle 1 is at a Standstill) or Released (a value indicating that vehicle 1 is not at a Standstill), and indicates "Invalid Value" when it is unknown which stationary status vehicle 1 has. Standstill means a state in which vehicle 1 is maintained stationary (for example, brake hold).

In the present embodiment, when ADS 200 issues an Acceleration Command to request VP 120 to provide deceleration to bring vehicle 1 to a standstill, and the Longitudinal_Velocity indicates 0 km/h, ADS 200 issues a Standstill Command to request VP 120 to maintain stationary, and VP 120 carries out brake hold control. After the brake hold control is finished, the Standstill Status indicates Applied. Until the Standstill Status indicates Applied, the Acceleration Command continues to request VP 120 to provide deceleration.

Figure 5:
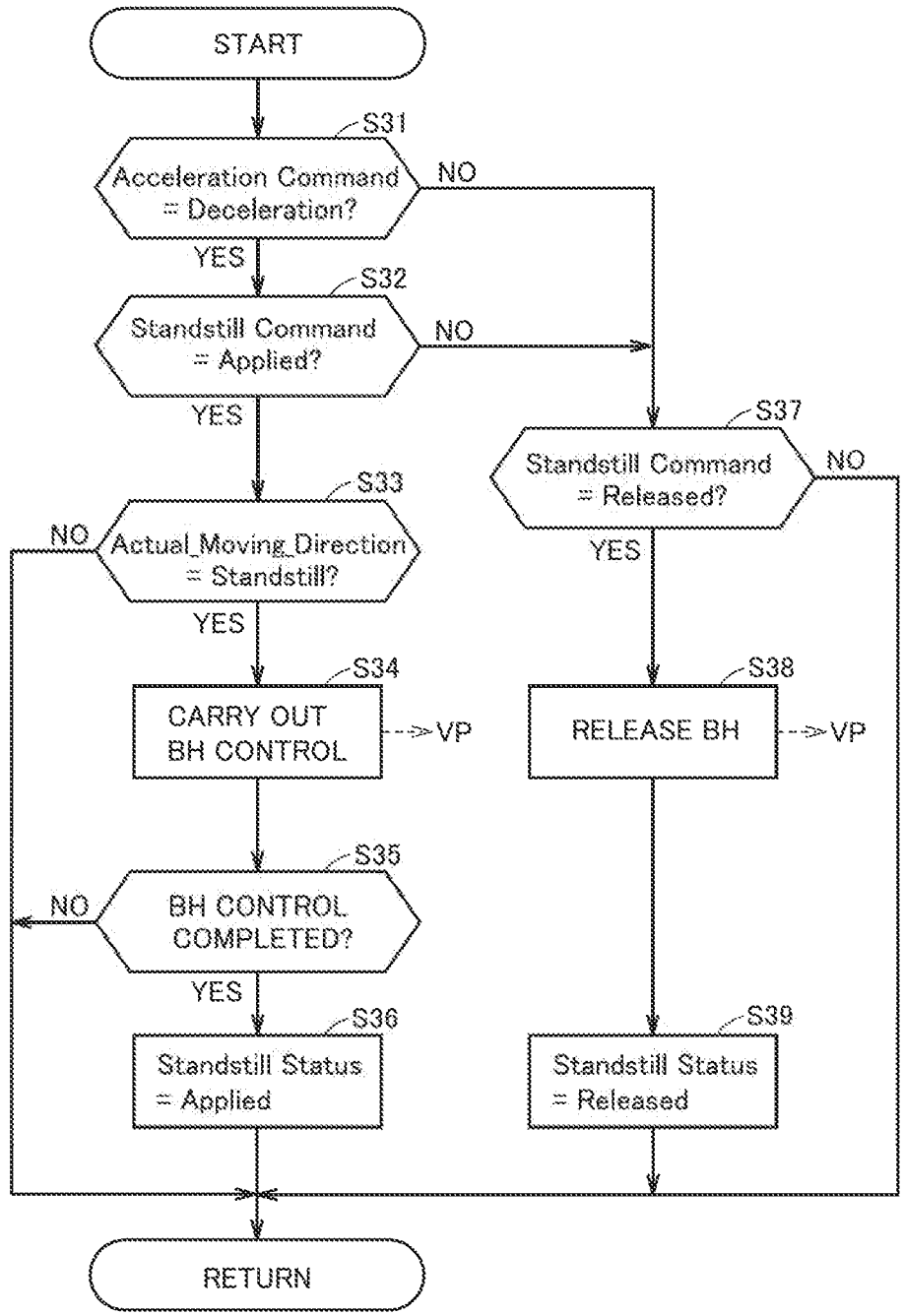
FIG. 5 is a flowchart of brake hold control carried out in an autonomous mode according to an embodiment of the present disclosure.

FIG. 5 is a flowchart of a process involved in brake hold control carried out by vehicle control interface 110 in the autonomous mode. The process shown in this flowchart is repeatedly performed in accordance with the API period in synchronization with a process of ADS 200 when vehicle 1 is in the autonomous mode.

Referring to FIG. 5 together with FIG. 2, in S31, vehicle control interface 110 determines whether a deceleration request (that is, an Acceleration Command to request deceleration) has been received. When a determination of YES is made in S31 (that is, a deceleration request has been received), vehicle control interface 110 determines in S32 whether a standstill request (that is, a Standstill Command to request to maintain stationary) has been received. When a determination of YES is made in S32 (that is, a standstill request has been received), vehicle control interface 110 determines in S33 whether the Actual_Moving_Direction is Standstill.

When a determination of NO is made in S33, the control returns to the initial step (S31). When the Acceleration Command requests deceleration (YES in S31), vehicle 1 is controlled to be decelerated in response to the Acceleration Command (see S52 in FIG. 7 described hereinafter). When vehicle 1 controlled to be decelerated has its four wheels all reaching a speed of 0, the Actual_Moving_Direction is set to Standstill (see FIG. 4), and a determination of YES is made in S33.

When the Acceleration Command requests deceleration (YES in S31), the Standstill Command requests to maintain stationary (YES in S32), and the Actual_Moving_Direction indicates Standstill (YES in S33), vehicle control interface 110 instructs VP 120 in S34 to start brake hold (BH) control. In brake systems 121A and 121B of VP 120 (see FIG. 2), the braking actuator is controlled in accordance with the instruction from vehicle control interface 110. When controlling the braking actuator is completed, brake systems 121A and 121B transmit a BH Completed signal indicating that controlling the braking actuator is completed.

In S35, vehicle control interface 110 determines whether the brake hold control is completed. Vehicle control interface 110 determines whether the brake hold control has been completed based on, for example, whether the BH Completed signal has been received. In the present embodiment, vehicle control interface 110 having received the BH Completed signal means that VP 120 has completed the brake hold control.

While determination of YES is made in all of S31 to S33, brake hold control is carried out in S34, and when the brake hold control is completed (YES in S35), then, in step S36, vehicle control interface 110 sets the Standstill Status to Applied.

When a determination of NO is made in either S31 or S32, vehicle control interface 110 determines in S37 whether a Release Standstill request (that is, a Standstill Command to request release from maintaining stationary) has been received. When a determination of YES is made in S37 (that is, a Release Standstill request has been received), vehicle control interface 110 instructs VP 120 in S38 to release brake hold (BH) of vehicle 1. Thus in brake systems 121A and 121B of VP 120 the brake actuators are controlled and the brake hold is thus released. When it is already released, it is held released. Then, vehicle control interface 110 sets the Standstill Status to Released in S39. In contrast, when a determination of NO is made in S37 (that is, no Release Standstill request has been received), the control returns to the initial step (S31).

In vehicle 1 according to the present embodiment, when ADS 200 issues an Acceleration Command to request VP 120 to provide deceleration to bring vehicle 1 to a standstill (YES in S31), and thereafter, before brake hold control is completed the request through the Acceleration Command for deceleration is cancelled (NO in S31), transitioning to the brake hold control (S34) is canceled. When the request is cancelled before the brake hold control starts, transitioning to the brake hold control is not performed. When the request is cancelled while the brake hold control has already been started, the brake hold control currently carried out is stopped, and brake systems 121A and 121B return to a state assumed before the brake hold control is carried out.

In vehicle 1 according to the present embodiment, when ADS 200 issues a Standstill Command to request VP 120 to maintain stationary (YES in S32), and thereafter, before brake hold control is completed the request through the Standstill Command to maintain stationary is cancelled (NO in S32), transitioning to the brake hold control (S34) is canceled. When the request is cancelled before the brake hold control starts, transitioning to the brake hold control is not performed. When the request is cancelled while the brake hold control has already been started, the brake hold control currently carried out is stopped, and brake systems 121A and 121B return to a state assumed before the brake hold control is carried out.

In the present embodiment, the process shown in FIG. 5 is performed by vehicle control interface 110. This is not exclusive, however, and the process of FIG. 5 may partially or entirely be performed by VP 120. When the FIG. 5 process is performed by VP 120, rather than vehicle control interface 110, then, in S34 and S38, VP 120 per se controls brake systems 121A and 121B (i.e., to maintain stationary/ release therefrom) without receiving an instruction from vehicle control interface 110.

Figure 6:
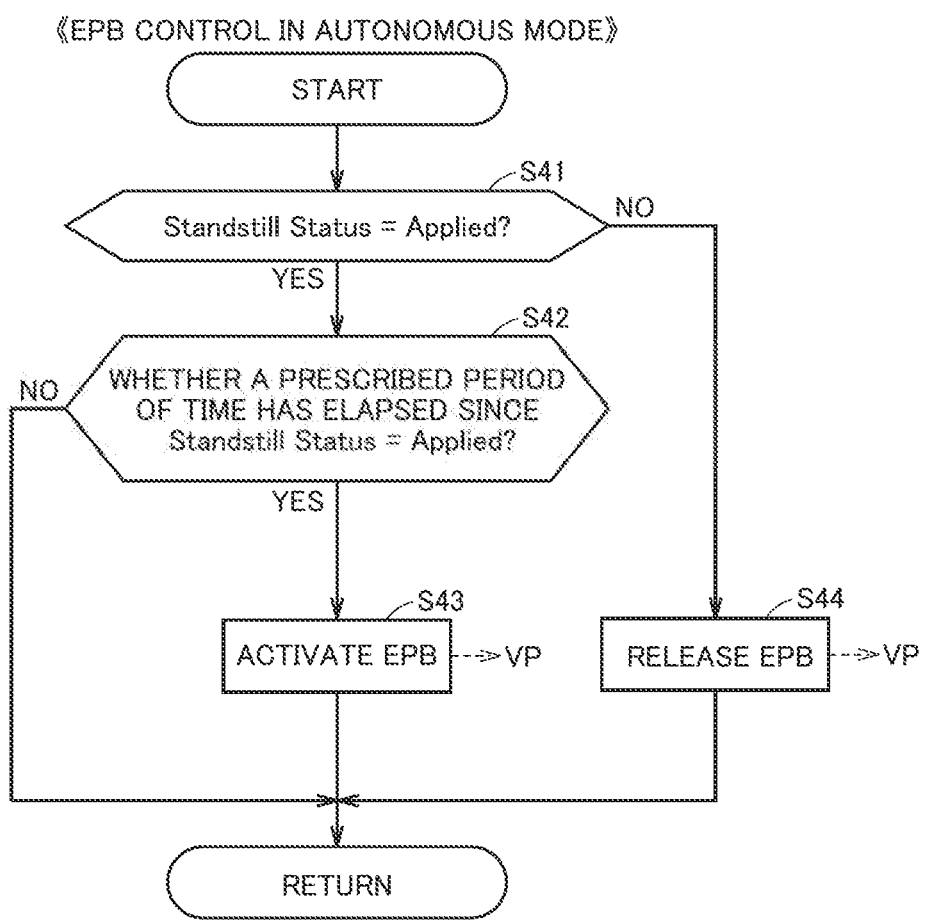
FIG. 6 is a flowchart of EPB control carried out in the autonomous mode according to an embodiment of the present disclosure.

In the present embodiment, the EPB (electric parking brake) is activated after a prescribed period of time has elapsed since the Standstill Status indicated Applied. FIG. 6 is a flowchart of a process involved in EPB control carried out by vehicle control interface 110 in the autonomous mode. The process shown in this flowchart is repeatedly performed in accordance with the API period in synchronization with a process of ADS 200 when vehicle 1 is in the autonomous mode.

Referring to FIG. 6 together with FIG. 2, in S41, vehicle control interface 110 determines whether the Standstill Status indicates Applied. When a determination of YES is made in S41 (Standstill Status=Applied), vehicle control interface 110 determines in S42 whether a prescribed period of time (for example of 3 minutes) has elapsed since the Standstill Status indicated Applied. While the Standstill Status is maintained Applied (YES in S41) and a determination of NO is made in S42, S41 and S42 are repeated, and when a determination of YES is made in S42, the control proceeds to S43. In S43, vehicle control interface 110 instructs VP 120 to activate the EPB. Thus, EPB system 123A is controlled in VP 120, and the EPB is activated. When the EPB is already active, the EPB is held active.

When a determination of NO is made in S41 (Standstill Status=Released or Invalid Value), the control proceeds to S44. In S44, vehicle control interface 110 instructs VP 120 to release the EPB. Thus, EPB system 123A is controlled in VP 120, and the EPB is thus released. When the EPB has already been released, the EPB is held released.

Thus, in vehicle 1 according to the present embodiment, the EPB (electric parking brake) is engaged after a prescribed period of time has elapsed since the Standstill Status indicated Applied. In the present embodiment, the process shown in FIG. 6 is performed by vehicle control interface 110. This is not exclusive, however, and the process of FIG. 6 may partially or entirely be performed by VP 120. When the FIG. 6 process is performed by VP 120, rather than vehicle control interface 110, then, in S43 and S44, VP 120 per se controls (i.e., activates/deactivates) EPB system 123A without receiving an instruction from vehicle control interface 110.

In the present embodiment, vehicle control interface 110 interposed between VP 120 and ADS 200 adjusts commands involved in deceleration control, start control, and acceleration control. Various signals communicated between VP 120 and ADS 200 are input to and output from vehicle control interface 110.

Figure 7:
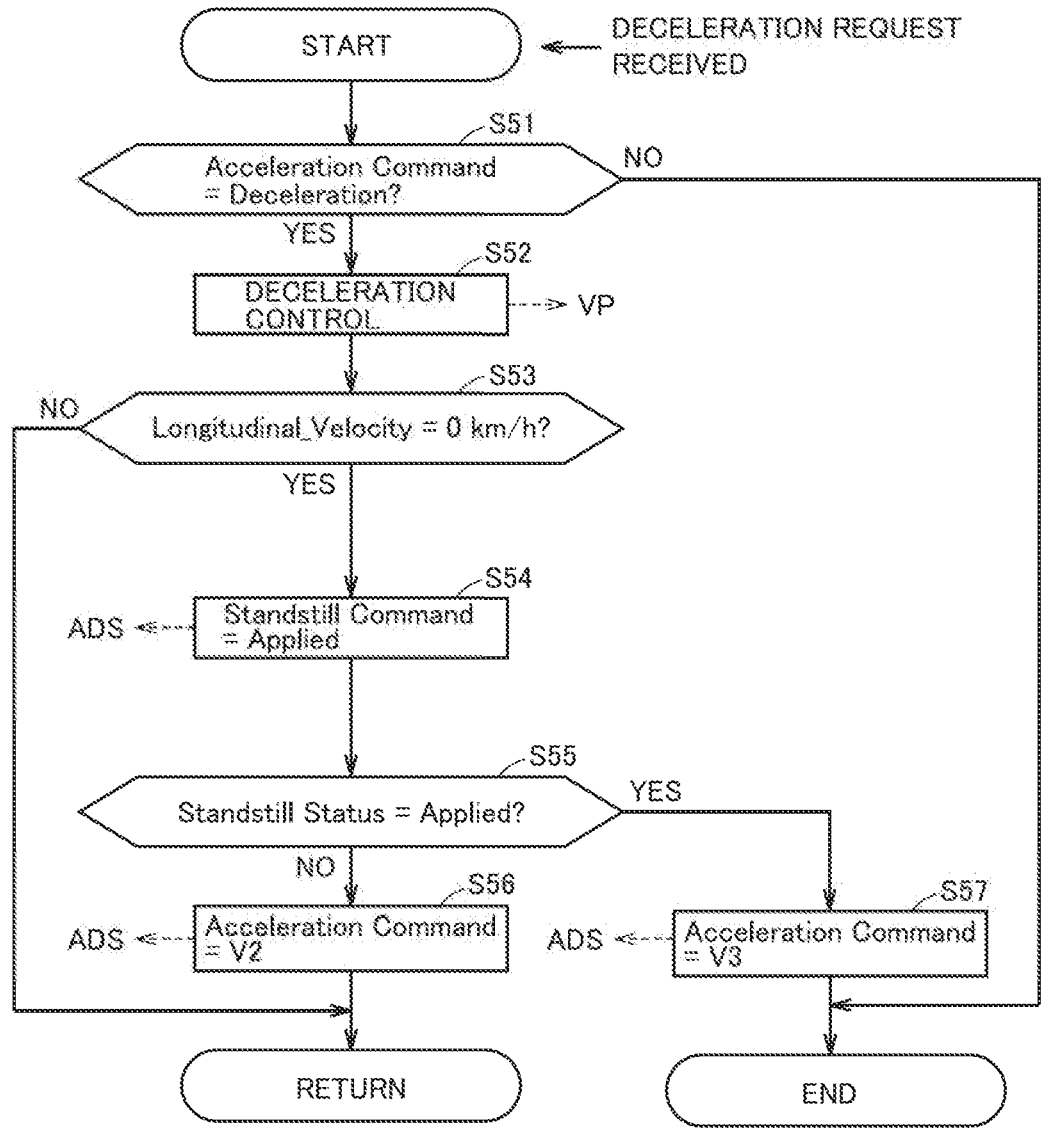
FIG. 7 is a flowchart of deceleration control carried out in the autonomous mode according to an embodiment of the present disclosure.

FIG. 7 is a flowchart of a procedure of a process performed by vehicle control interface 110 in deceleration control in the autonomous mode. The process shown in this flowchart is started when vehicle 1 is in the autonomous mode and vehicle control interface 110 receives a deceleration request from ADS 200. While vehicle control interface 110 receives a deceleration request from ADS 200, this process is repeatedly performed in accordance with the API period in synchronization with a process of ADS 200.

Referring to FIG. 7 together with FIG. 2, in S51, vehicle control interface 110 determines whether a deceleration request (that is, an Acceleration Command to request deceleration) has been received from ADS 200. When a determination of YES is made in S51 (that is, a deceleration request has been received), in S52 vehicle control interface 110 transmits a control command corresponding to the Acceleration Command (an API command) received from ADS 200 (more specifically, a control command to request deceleration) to VP 120 to carry out deceleration control for vehicle 1. In VP 120, brake systems 121A and 121B and propulsion system 124 (see FIG. 2) are controlled in response to the control command.

After the step of S52, in S53, vehicle control interface 110 uses a signal received from VP 120 to determine whether the Longitudinal_Velocity indicates 0 km/h. When a determination of NO is made in S53 (that is, Longitudinal_Velocity>0 km/h), the control returns to the initial step (S51). When ADS 200 issues an Acceleration Command to request VP 120 to provide deceleration to bring vehicle 1 to a standstill, then, in response to the deceleration request (S51), vehicle 1 is subjected to deceleration control (S52) and thus reduced in velocity, and finally, the Longitudinal_Velocity will indicate 0 km/h.

When a determination of YES is made in S53 (that is, Longitudinal_Velocity=0 km/h), then, in S54, vehicle control interface 110 requests from ADS 200 a Standstill request (i.e., a Standstill Command to request to maintain stationary). In response to this request, ADS 200 transmits the Standstill request to VP 120 through vehicle control interface 110.

After the step of S54, vehicle control interface 110 determines in S55 whether the Standstill Status indicates Applied. The Standstill Status is set through the process shown in FIG. 5. After the step of S54 in FIG. 7, when the Actual_Moving_Direction is set to Standstill, brake hold control is carried out (S34 in FIG. 5). When the brake hold control is completed (YES in S35 in FIG. 5), the Standstill Status is set to Applied (S36 in FIG. 5).

After in response to the request in S54 the Standstill Command is set to Applied before the Standstill Status is set to Applied (that is, while a determination of NO is made in S55), vehicle control interface 110 requests ADS 200 in S56 to set V2 for the value of the Acceleration Command. V2 is a deceleration value (i.e., a negative value). In response to this request, ADS 200 transmits a constant deceleration value (i.e., V2) as a value for the Acceleration Command to VP 120 through vehicle control interface 110. In the present embodiment, V2 is set to −0.4 m/s².

When a determination of YES is made in S55 (Standstill Status=Applied), vehicle control interface 110 requests ADS 200 in S57 to set V3 for the value of the Acceleration Command. V3 is a deceleration value or 0 m/s². In response to the above request (S57), ADS 200 transmits V3 as a value for the Acceleration Command to VP 120 through vehicle control interface 110. Until start control described hereinafter (see FIG. 8) is started, ADS 200 maintains vehicle 1 at a standstill (Standstill Status=Applied) and maintains the value of the Acceleration Command at V3. Note that V3 may be the same deceleration value as V2, a deceleration value smaller than V2, or 0 m/s².

When the step of S57 is performed, the series of steps of the process of FIG. 7 ends. The series of steps of the process of FIG. 7 also ends when the Acceleration Command no longer requests deceleration (NO in S51).

Figure 8:
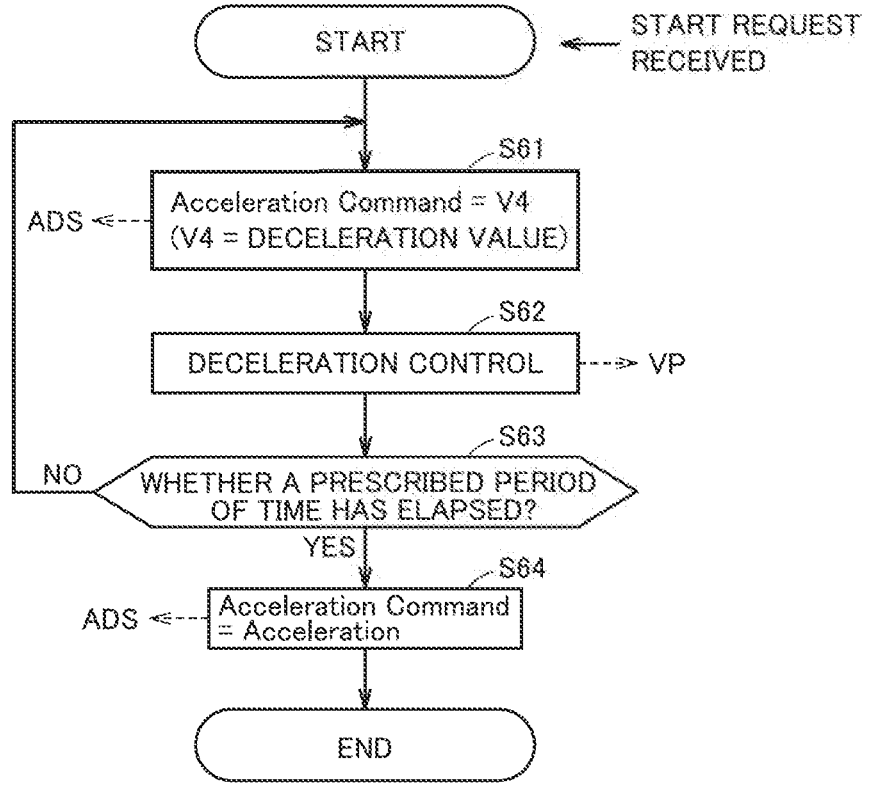
FIG. 8 is a flowchart of start control carried out in the autonomous mode according to an embodiment of the present disclosure.

FIG. 8 is a flowchart of a procedure of a process performed by vehicle control interface 110 in the start control in the autonomous mode. The process shown in this flowchart is started when vehicle 1 is in the autonomous mode and vehicle control interface 110 receives a start request from ADS 200. When the Standstill Status indicates "Applied" and a Standstill Command received from ADS 200 changes from "Applied" to "Released" vehicle control interface 110 determines that a start request has been received from ADS 200.

Referring to FIG. 8 together with FIG. 2, vehicle control interface 110 requests ADS 200 in S61 to set V4 for the value of the Acceleration Command (more specifically, a deceleration value), and in S62 receives the Acceleration Command from ADS 200 and transmits a control command corresponding thereto (more specifically, a control command to request deceleration) to VP 120 to perform deceleration control for vehicle 1. In VP 120, brake systems 121A and 121B and propulsion system 124 (see FIG. 2) are controlled in response to the control command Thus, until a determination of YES is made in S63 described hereinafter, acceleration of vehicle 1 is suppressed and vehicle 1 is held in a state with a vehicular velocity of 0 (Actual_Moving_Direction=Standstill). V4 is a prescribed deceleration value (that is, a negative value). V4 may be a deceleration value smaller than V2 or may be equal to V2.

In S63, vehicle control interface 110 determines whether a prescribed period of time (hereinafter referred to as "ΔT") has elapsed since the start request was made. ΔT is for example set to be equal to or longer than a period of time taken after the Standstill Command is set to "Released" before the Standstill Status is set to "Released." ΔT may be selected from a range of 1 second to 10 seconds.

ADS 200 maintains the Acceleration Command at value V4 for a period of time after the start request is made before ΔT elapses (that is, while a determination of NO is made in S63). After the start request is made when ΔT elapses (YES in S63), in S64 vehicle control interface 110 requests from ADS 200 an Acceleration Command to request acceleration, or an acceleration request, and thereafter the series of steps of the process of FIG. 8 ends. In response to the request from vehicle control interface 110 (S64), ADS 200 transmits the acceleration request to VP 120 through vehicle control interface 110. This allows transitioning to acceleration control described hereinafter.

Figure 9:
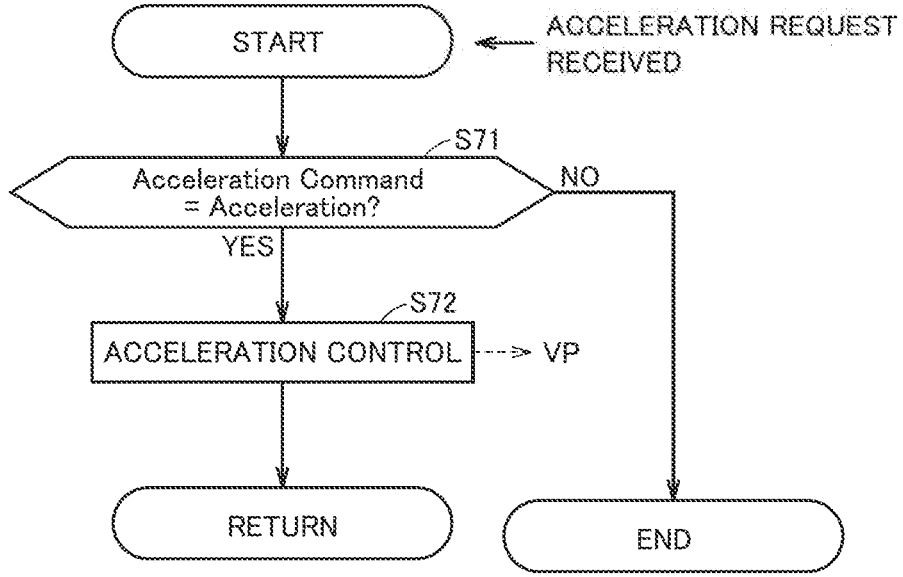
FIG. 9 is a flowchart of acceleration control carried out in the autonomous mode according to an embodiment of the present disclosure.

FIG. 9 is a flowchart of a procedure of a process performed by vehicle control interface 110 in acceleration control in the autonomous mode. The process shown in this flowchart is started when vehicle 1 is in the autonomous mode and vehicle control interface 110 receives an acceleration request from ADS 200. While vehicle control interface 110 receives an acceleration request from ADS 200, this process is repeatedly performed in accordance with the API period in synchronization with a process of ADS 200.

Referring to FIG. 9 together with FIG. 2, in S71, vehicle control interface 110 determines whether an acceleration request has been received from ADS 200. When a determination of YES is made in S71 (that is, an acceleration request has been received), in S72 vehicle control interface 110 transmits a control command corresponding to an Acceleration Command received from ADS 200 (more specifically, a control command to request acceleration) to VP 120 to carry out acceleration control for vehicle 1. In propulsion system 124 of VP 120, the driving device is controlled in response to the control command.

While vehicle control interface 110 receives the acceleration request from ADS 200 (that is, while a determination of YES is made in S71), vehicle control interface 110 continues acceleration control for vehicle 1 (S72). In contrast, when the Acceleration Command no longer requests acceleration (NO in S71), the series of steps of the process in FIG. 9 ends.

In the present embodiment, the processes shown in FIGS. 7 to 9 are performed by vehicle control interface 110. This is not exclusive, however, and the processes shown in FIGS. 7 to 9 may partially or entirely be performed by ADS 200. For example, when the process shown in FIG. 7 is performed by ADS 200, rather than vehicle control interface 110, ADS 200 per se changes each command's value in the steps of S54, S56 and S57 without receiving a request from vehicle control interface 110.

Hereinafter, shift control will be described. In the manual mode, a shift change of vehicle 1 (i.e., switching a shift range) is performed in response to the driver's shift lever operation. In the present embodiment, in the manual mode, the driver can select any one of a P (parking) range, an N (neutral) range, a D (drive) range, an R (reverse) range, and a B (brake) range, for example. The D range and the B range correspond to a traveling range. Deceleration is stronger in the B range than in the D range.

In the present embodiment, ADS 200 can only select the D range and the R range in the autonomous mode. That is, in the autonomous mode, vehicle 1 has a shift range which is either the D range or the R range. In the autonomous mode, ADS 200 performs a shift change of vehicle 1 by using a Propulsion Direction Command, which is a command to request switching a shift range to another. The Propulsion Direction Command is included in a command sent from ADS 200 to VP 120 through vehicle control interface 110. The Propulsion Direction Command according to the present embodiment corresponds to an example of a "first command" according to the present disclosure.

Figures 10, 11:
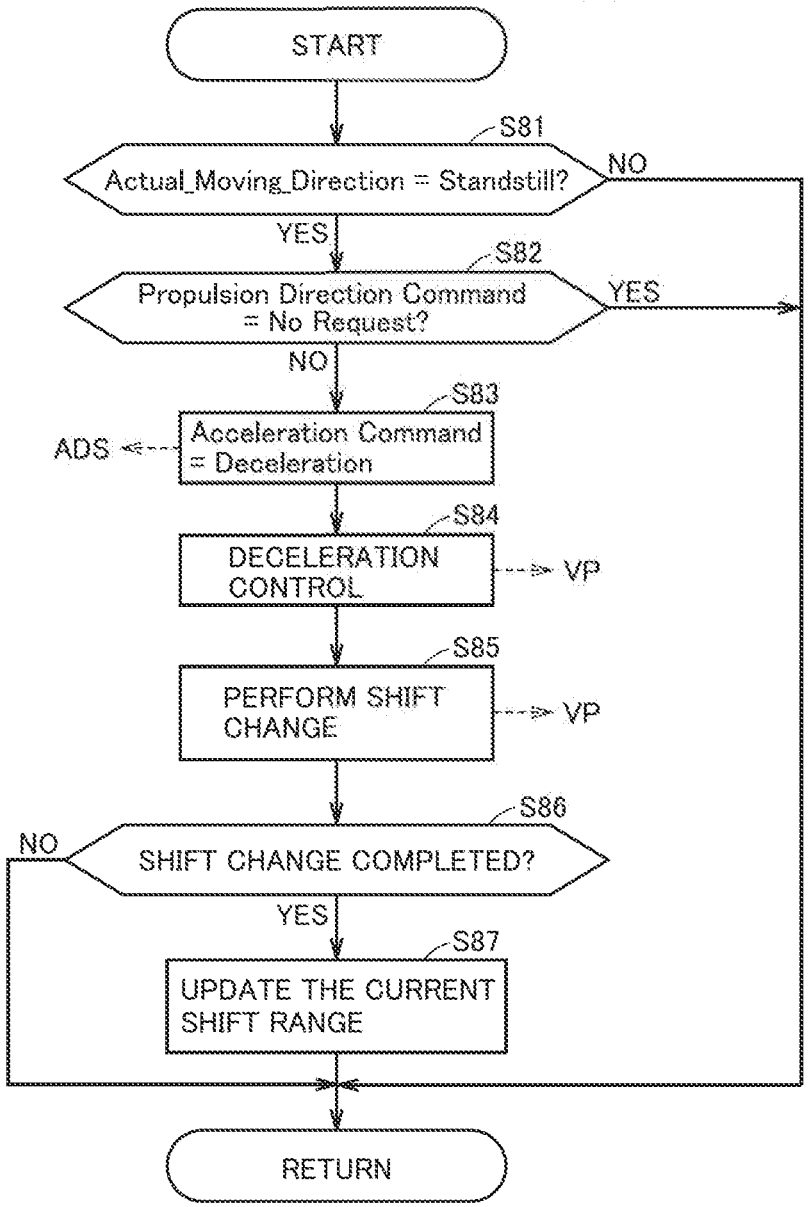
FIG. 10 indicates possible values of a Propulsion Direction Command used in an embodiment of the present disclosure.
FIG. 11 is a flowchart of shift control carried out in the autonomous mode according to an embodiment of the present disclosure.

FIG. 10 indicates a value that can be assumed by the Propulsion Direction Command used in the present embodiment. Referring to FIG. 10, in the present embodiment, the Propulsion Direction Command is set to any one of a first value (No Request), a second value (R) requesting a shift to the R range, and a third value (D) requesting a shift to the D range. In the autonomous mode, VP 120 performs a shift change of vehicle 1 in response to the Propulsion Direction Command thus set.

The API signal includes a signal Propulsion Direction Status indicating the current shift range. The Propulsion Direction Status basically indicates a value corresponding to the current shift range (one of P, N, D, R, and B in the present embodiment), and indicates "Invalid Value" when the current shift range is unknown. The Propulsion Direction Status according to the present embodiment corresponds to an example of a "third signal" according to the present disclosure.

The API signal includes a signal Propulsion Direction by Driver indicating a shift lever position by a driver. The Propulsion Direction by Driver is output from vehicle control interface 110 to ADS 200 when the driver operates the shift lever. The Propulsion Direction by Driver basically represents a value corresponding to a position of the shift lever (one of P, N, D, R, and B in the present embodiment). When the driver releases his/her hand from the shift lever, the shift lever returns to a central position and the Propulsion Direction by Driver indicates "No Request." The Propulsion Direction by Driver according to the present embodiment corresponds to an example of a "fourth signal" according to the present disclosure.

During the autonomous mode, the driver's shift lever operation is not reflected in the Propulsion Direction Status. Note, however, that ADS 200 determines a value for the Propulsion Direction Command by referring to the Propulsion Direction by Driver. Thus, ADS 200, if necessary, can confirm the Propulsion Direction by Driver, and request switching a shift position to another by the Propulsion Direction Command as necessary.

FIG. 11 is a flowchart of a procedure of a process performed by vehicle control interface 110 in the shift control in the autonomous mode. The process shown in this flowchart is repeatedly performed in accordance with the API period in synchronization with a process of ADS 200 when vehicle 1 is in the autonomous mode.

Referring to FIG. 11 together with FIG. 2, in S81, vehicle control interface 110 determines whether the Actual_Moving_Direction is Standstill. In S82, vehicle control interface 110 determines whether the Propulsion Direction Command is No Request. When a determination of NO is made in S81 or a determination of YES is made in S82 (Propulsion Direction Command=No Request), the control returns to the initial step (S81).

When a determination of YES is made in S81 (Actual_Moving_Direction=Standstill) and a determination of NO is made in S82 (that is, a shift change request has been received), in S83 vehicle control interface 110 requests ADS 200 to set a deceleration value for the value of the Acceleration Command. In S84, vehicle control interface 110 transmits a control command corresponding to the Acceleration Command (an API command) received from ADS 200 (more specifically, a control command to request deceleration) to VP 120 to carry out deceleration control for vehicle 1. In VP 120, brake systems 121A and 121B and propulsion system 124 (see FIG. 2) are controlled in response to the control command.

After the step of S84, in S85 vehicle control interface 110 transmits a control command corresponding to a Propulsion Direction Command (an API command) received from ADS 200 (more particularly, a control command to request a shift to the D range or the R range) to VP 120 to instruct VP 120 to start the shift change. In propulsion system 124 of VP 120, the shift device switches a shift range to another in response to the control command received from vehicle control interface 110. When the shift device has completed the shift change, propulsion system 124 accordingly transmits a shift change completed signal to vehicle control interface 110.

In S86, vehicle control interface 110 determines whether the shift change has been completed. Vehicle control interface 110 determines whether the shift change has been completed based on, for example, whether the shift change completed signal has been received. In the present embodiment, vehicle control interface 110 having received the shift change completed signal means that VP 120 has completed a shift change.

While the autonomous mode is continued, and a determination of YES is made in S81 and a determination of NO is made in S82, a shift change is performed in S85, and when the shift change is completed (YES in S86), vehicle control interface 110 updates the Propulsion Direction Status (the current shift range) in S87. When a shift range is changed from the D range to the R range in S85, the Propulsion Direction Status is set to "R" in S87. When a shift range is changed from the R range to the D range in S85, the Propulsion Direction Status is set to "D" in S87.

In the present embodiment, ADS 200 is configured such that when ADS 200 issues a Propulsion Direction Command to request VP 120 to switch a shill range to another in order to perform a shill change of vehicle 1 (S85), ADS 200 also issues an Acceleration Command to simultaneously request VP 120 to provide deceleration (S84). Further, ADS 200 is configured such that while a shift change is performed as requested through the Propulsion Direction Command (NO in S86) ADS 200 issues an Acceleration Command to continue to request VP 120 to provide deceleration (S84). This configuration allows a shift change to be performed in a state in which acceleration of vehicle 1 is suppressed in response to a deceleration request of the Acceleration Command. This facilitates performing a shift change appropriately.

In the autonomous mode, as shown in FIG. 11, the driver's shift lever operation is not reflected in the Propulsion Direction Status (the current shift range). This configuration can suppress a change of a value of the Propulsion Direction Status when no shift change is performed during autonomous driving.

In the present embodiment, the process shown in FIG. 11 is performed by vehicle control interface 110. This is not exclusive, however, and the process shown in FIG. 11 may partially or entirely be performed by ADS 200 and VP 120. For example, the FIGS. 11 S81 to S85 may be performed by ADS 200 rather than vehicle control interface 110, and the FIGS. 11 S86 and S87 may be performed by VP 120 rather than vehicle control interface 110. In that case, only when the Actual_Moving_Direction indicates Standstill in the autonomous mode (YES in S81), ADS 200 issues a Propulsion Direction Command to request switching a shift range to another (S85).

Figure 12:
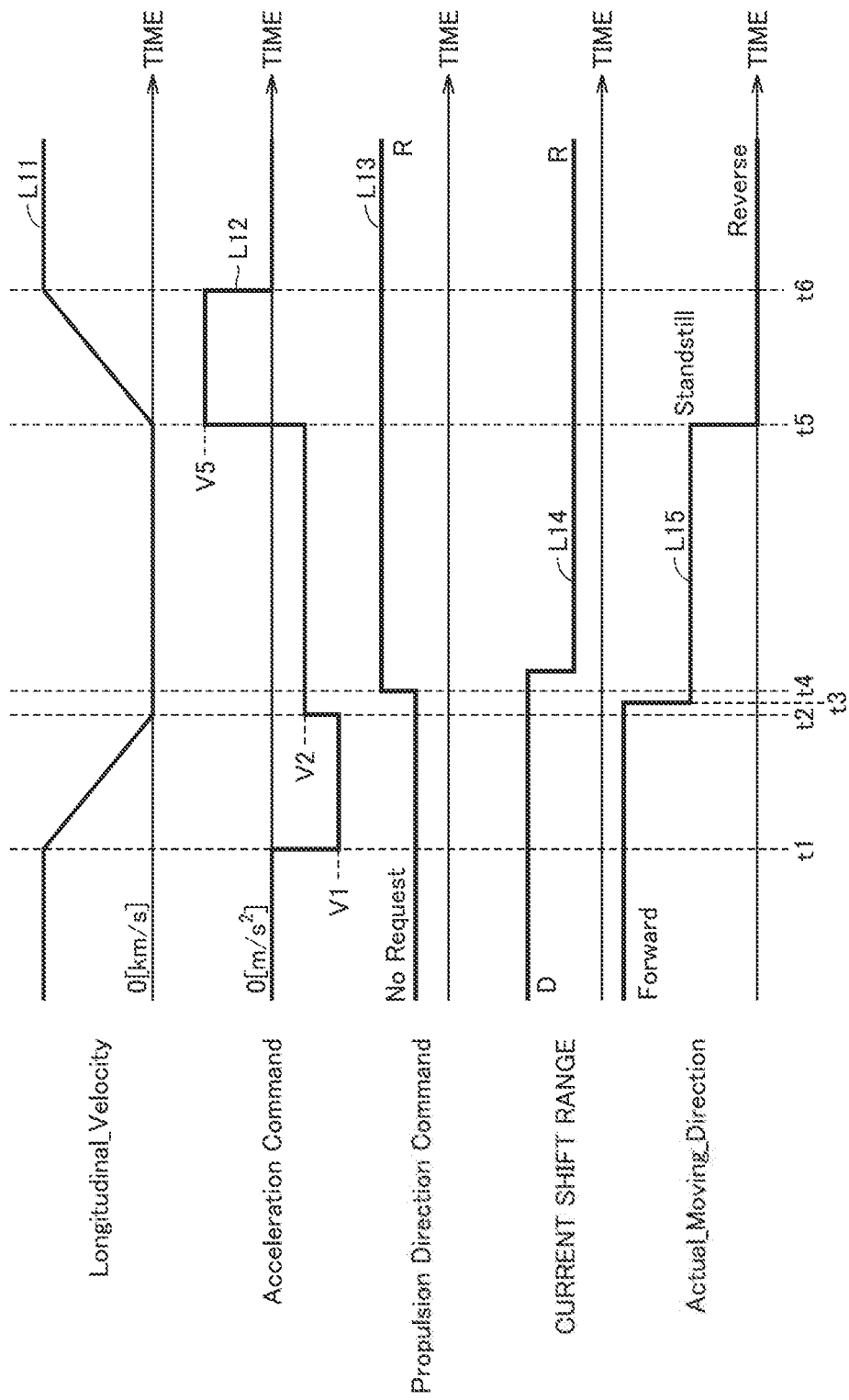
FIG. 12 is timing plots representing an exemplary operation of a vehicle autonomously driven in the autonomous mode according to an embodiment of the present disclosure.

FIG. 12 is timing plots representing an exemplary operation of vehicle 1 autonomously driven in the autonomous mode. Referring to FIG. 12, in this example, the Acceleration Command (indicated by a line L12) is set from 0 m/s$^2$ to V1 at time t1. V1 is a deceleration value larger than V2 (that is, a deceleration value more negative than V2). V1 may be selected, for example, from a range of −6.0 m/s$^2$ to −1.0 m/s$^2$. When the Acceleration Command (line L12) is set to V1, vehicle 1 is subjected to deceleration control (S52 in FIG. 7). As a result, the Longitudinal_Velocity (indicated by a line L11) approaches 0 km/h. Thereafter, at time t2, the Longitudinal_Velocity (line L11) reaches 0 km/h, and in response, the Standstill Command is set to "Applied" (S54 in FIG. 7) and the Acceleration Command is set to V2 (for example, −0.4 m/s$^2$) (S56 in FIG. 7). Thereafter, at time t3, the Actual_Moving_Direction (indicated by a line L15) is set to "Standstill" and brake hold control is carried out (S34 in FIG. 5). When the brake hold control is completed and the Standstill Status is set to "Applied" (S36 in FIG. 5), the Acceleration Command (line L12) is set to V3 (S57 in FIG. 7). And when a prescribed period of time has elapsed, the EPB is activated (S43 in FIG. 6). In this example, V3 is the same deceleration value as V2. Therefore, even when the Standstill Status is set to "Applied," the Acceleration Command's value does not change.

During a period of t3 to t5, vehicle 1 does not move and is instead at a standstill, and the Actual_Moving_Direction (line L15) indicates "Standstill." The period of t3 to t5 may be a signal waiting period. During this period at time t4 the Propulsion Direction Command (indicated by a line L13) is set from "No Request" to "R," and in response, a shift change from the D range to the R range is performed (S85 in FIG. 11). The shift change is performed in a state with vehicle 1 maintained stationary (e.g., brake hold). When the shift change is completed, the Propulsion Direction Status (indicated by a line L14) indicating the current shift range changes from "D" to "R" (S87 in FIG. 11).

In vehicle 1 according to the present embodiment, when ADS 200 cancels a Standstill Command to cancel a Maintain Stationary request (Standstill Command=Released) in order to start vehicle 1, brake hold applied to vehicle 1 is released and VP 120 controls acceleration and deceleration of vehicle 1 based on an Acceleration Command. For example, at a time slightly before time t5, the Standstill Command is set from "Applied" to "Released," and the Acceleration Command (line L12) is set to V4 (S61 in FIG. 8). In this example, V4 is the same deceleration value as V2. Therefore, even when the Standstill Command is set to "Released," the Acceleration Command's value does not change.

When the Standstill Command is set to "Released," brake hold applied to vehicle 1 is released (S38 in FIG. 5), the Standstill Status is set to "Released" (S39 in FIG. 5), and the EPB is released (S44 in FIG. 6). Thereafter, at time t5, the Acceleration Command (line L12) is set to V5 (S64 in FIG. 8). V5 is an acceleration value (i.e., a positive value).

During a period of t5 to t6, vehicle 1 is subjected to acceleration control (S72 in FIG. 9). As a result, the Longitudinal_Velocity (line L11) increases. At time t6, the Longitudinal_Velocity (line L11) reaches a target value, and in response, the Acceleration Command is set to 0 m/s$^2$, and the acceleration control (FIG. 9) ends.

Thus, vehicle 1 according to the present embodiment comprises ADS 200 and VP 120 that controls vehicle 1 in response to a command received from ADS 200. When the Autonomy_State indicates the autonomous mode, and the Actual_Moving_Direction indicates standstill, VP 120 performs a shift change as requested through the Propulsion Direction Command. This configuration allows a shift change to be appropriately performed when VP 120 carries out vehicle control in response to a command received from ADS 200.

Vehicle control interface 110 according to the present embodiment is provided between ADS 200 and VP 120 that controls vehicle 1 in response to a command received from ADS 200. When the Autonomy_State indicates the autonomous mode, and the Actual_Moving_Direction indicates Standstill, vehicle control interface 110 permits ADS 200 to transmit a Propulsion Direction Command to VP 120 to request switching a shift range to another. When the Actual_Moving_Direction does not indicate Standstill, and vehicle control interface 110 receives a shift change request from ADS 200, vehicle control interface 110 rejects the request. This configuration allows a shift change to be appropriately performed when VP 120 carries out vehicle control in response to a command received from ADS 200.

Vehicle control interface 110 may be attached to vehicular body 10 replaceably. Vehicle control interface 110 may be mounted in ADK 20 rather than vehicular body 10. Vehicle control interface 110 may be dispensed with by providing the above described function of vehicle control interface 110 to at least one of VP 120 and ADS 200.

Various processes of the vehicle platform, the autonomous driving system, and the vehicle control interface are not limited to execution by software, and may instead be performed by dedicated hardware (or electronic circuitry).

Example 1

Toyota's MaaS Vehicle Platform
API Specification
for ADS Developers
[Standard Edition #0.1]
History of Revision

TABLE 1

| Date of Revision | ver. | Summary of Revision | Reviser |
|---|---|---|---|
| 2019 May 04 | 0.1 | Creating a new material | MaaS Business Div. |

Index
1. Outline 4
1.1. Purpose of this Specification 4
1.2. Target Vehicle 4
1.3. Definition of Term 4
1.4. Precaution for Handling 4

2. Structure 5
2.1. Overall Structure of MaaS 5
2.2. System structure of MaaS vehicle 6
3. Application Interfaces 7
3.1. Responsibility sharing of when using APIs 7
3.2. Typical usage of APIs 7
3.3. APIs for vehicle motion control 9
   3.3.1. Functions 9
   3.3.2. Inputs 16
   3.3.3. Outputs 23
3.4. APIs for BODY control 45
   3.4.1. Functions 45
   3.4.2. Inputs 45
   3.4.3. Outputs 56
3.5. APIs for Power control 68
   3.5.1. Functions 68
   3.5.2. Inputs 68
   3.5.3. Outputs 69
3.6. APIs for Safety 70
   3.6.1. Functions 70
   3.6.2. Inputs 70
   3.6.3. Outputs 70
3.7. APIs for Security 74
   3.7.1. Functions 74
   3.7.2. Inputs 74
   3.7.3. Outputs 76
3.8. APIs for MaaS Service 80
   3.8.1. Functions 80
   3.8.2. Inputs 80
   3.8.3. Outputs 80

1. Outline

1.1. Purpose of this Specification

This document is an API specification of Toyota Vehicle Platform and contains the outline, the usage and the caveats of the application interface.

1.2. Target Vehicle e-Palette, MaaS vehicle based on the POV (Privately Owned Vehicle) manufactured by Toyota

1.3. Definition of Term

TABLE 2

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.
All the contents are subject to change. Such changes are notified to the users. Please note that some parts are still T.B.D. will be updated in the future.

2. Structure

2.1. Overall Structure of MaaS

Figure 13:
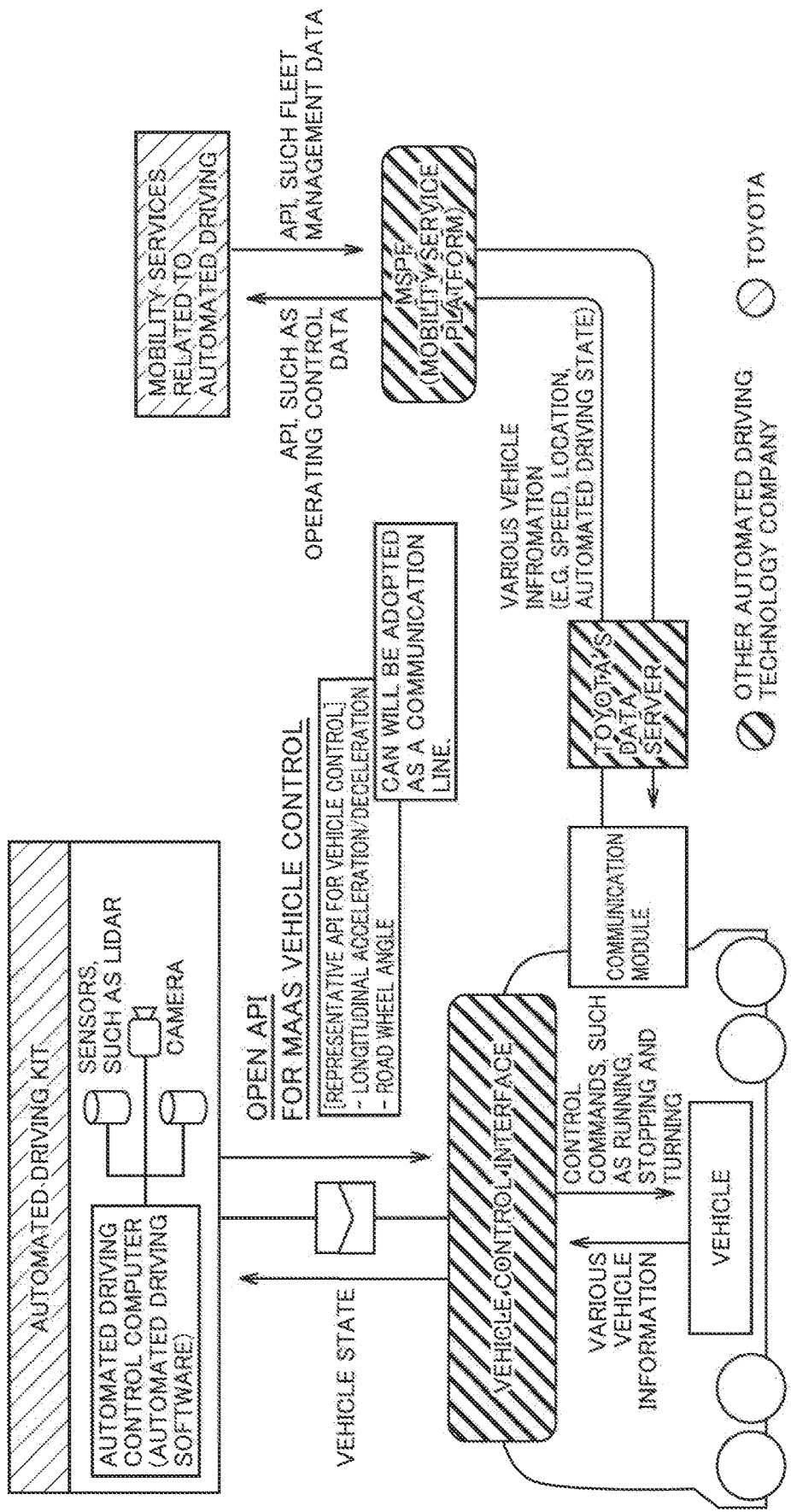
FIG. 13 is a diagram of an overall configuration of MaaS.

The overall structure of MaaS with the target vehicle is shown (FIG. 13). Vehicle control technology is being used as an interface for technology providers.

Technology providers can receive open API such as vehicle state and vehicle control, necessary for development of automated driving systems.

2.2. System Structure of MaaS Vehicle

Figure 14:
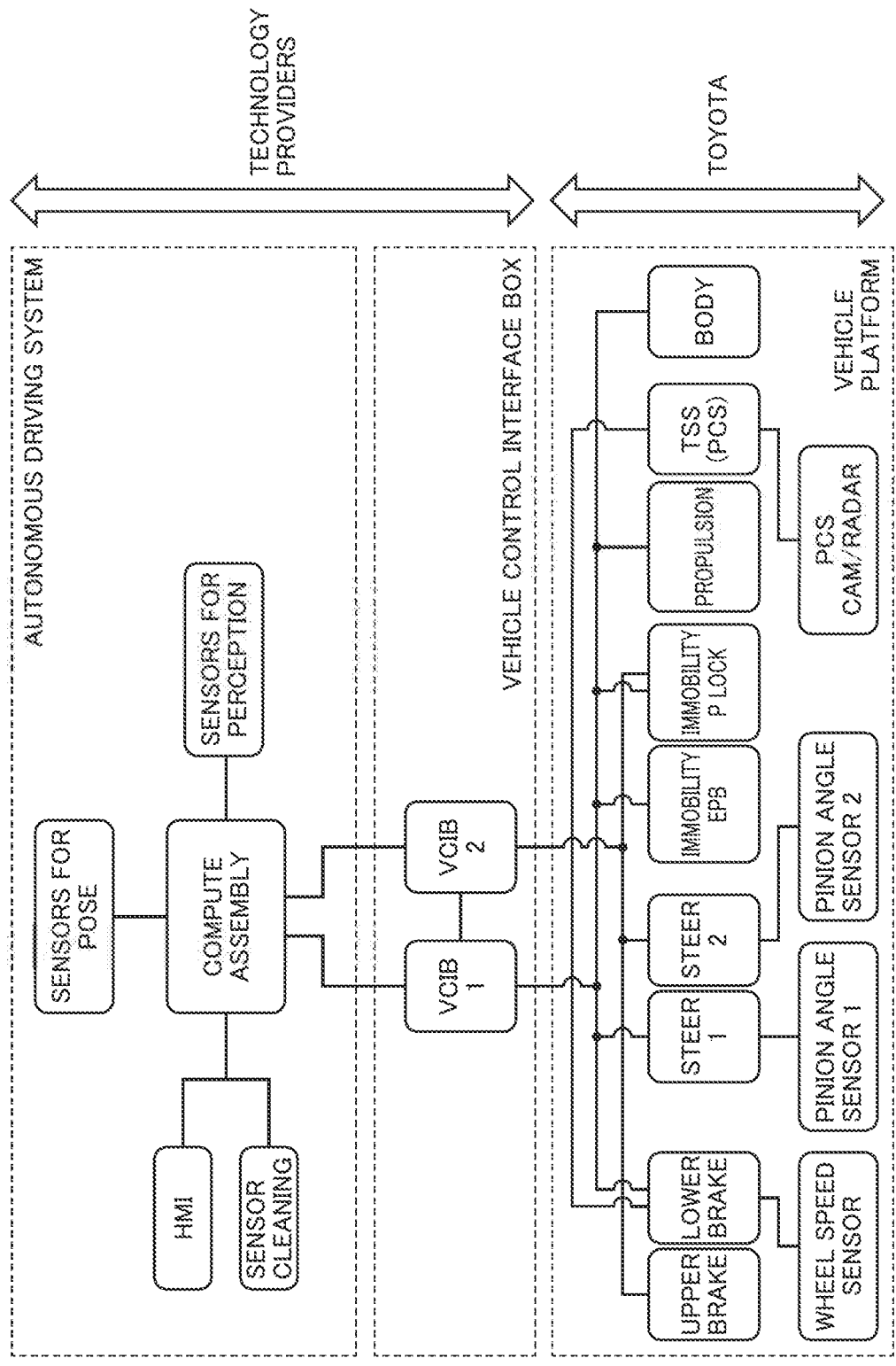
FIG. 14 is a diagram of a system configuration of a MaaS vehicle.

The system architecture as a premise is shown (FIG. 14).
The target vehicle will adopt the physical architecture of using CAN for the bus between ADS and VCIB. In order to realize each API in this document, the CAN frames and the bit assignments are shown in the form of "bit assignment table" as a separate document.

3. Application Interfaces

3.1. Responsibility Sharing of when Using APIs

Basic responsibility sharing between ADS and vehicle VP is as follows when using APIs.
[ADS]
The ADS should create the driving plan, and should indicate vehicle control values to the VP.
[VP]
The Toyota VP should control each system of the VP based on indications from an ADS.

3.2. Typical Usage of APIs

In this section, typical usage of APIs is described.
CAN will be adopted as a communication line between ADS and VP. Therefore, basically, APIs should be executed every defined cycle time of each API by ADS.
A typical workflow of ADS of when executing APIs is as follows (FIG. 15).

3.3. APIs for Vehicle Motion Control

In this section, the APIs for vehicle motion control which is controllable in the MaaS vehicle is described.

3.3.1. Functions

3.3.1.1. Standstill, Start Sequence

Figure 16:
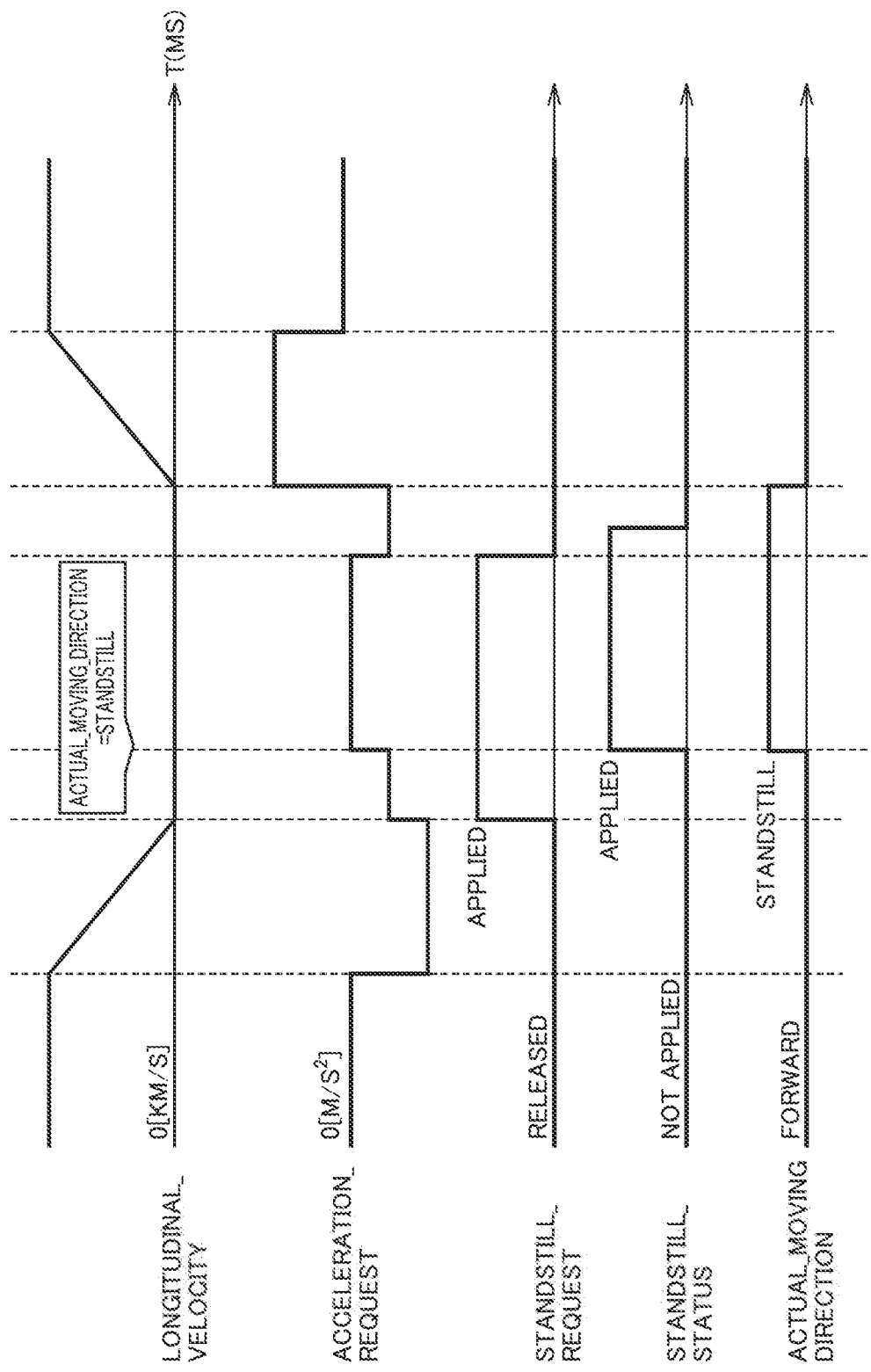
FIG. 16 is an example of timing plots of an API involved in stopping and starting the MaaS vehicle.

The transition to the standstill (immobility) mode and the vehicle start sequence are described. This function presupposes the vehicle is in Autonomy_State=Autonomous Mode. The request is rejected in other modes.
The below diagram shows an example.
Acceleration Command requests deceleration and stops the vehicle. Then, when Longitudinal_Velocity is confirmed as 0 [km/h], Standstill Command="Applied" is sent. After the brake hold control is finished, Standstill Status becomes "Applied". Until then, Acceleration Command has to continue deceleration request. Either Standstill Command="Applied" or Acceleration Command's deceleration request were canceled, the transition to the brake hold control will not happen. After that, the vehicle continues to be standstill as far as Standstill Command="Applied" is being sent. Acceleration Command can be set to 0 (zero) during this period.
If the vehicle needs to start, the brake hold control is cancelled by setting Standstill Command to "Released". At the same time, acceleration/deceleration is controlled based on Acceleration Command (FIG. 16).

EPB is engaged when Standstill Status="Applied" continues for 3 minutes.

3.3.1.2. Direction Request Sequence

The shift change sequence is described. This function presupposes that Autonomy_State=Autonomous Mode. Otherwise, the request is rejected.

Shift change happens only during Actual_Moving_Direction="standstill"). Otherwise, the request is rejected.

In the following diagram shows an example. Acceleration Command requests deceleration and makes the vehicle stop. After Actual_Moving_Direction is set to "standstill", any shift position can be requested by Propulsion Direction Command. (In the example below, "D"→"R").

During shift change, Acceleration Command has to request deceleration.

Figure 17:
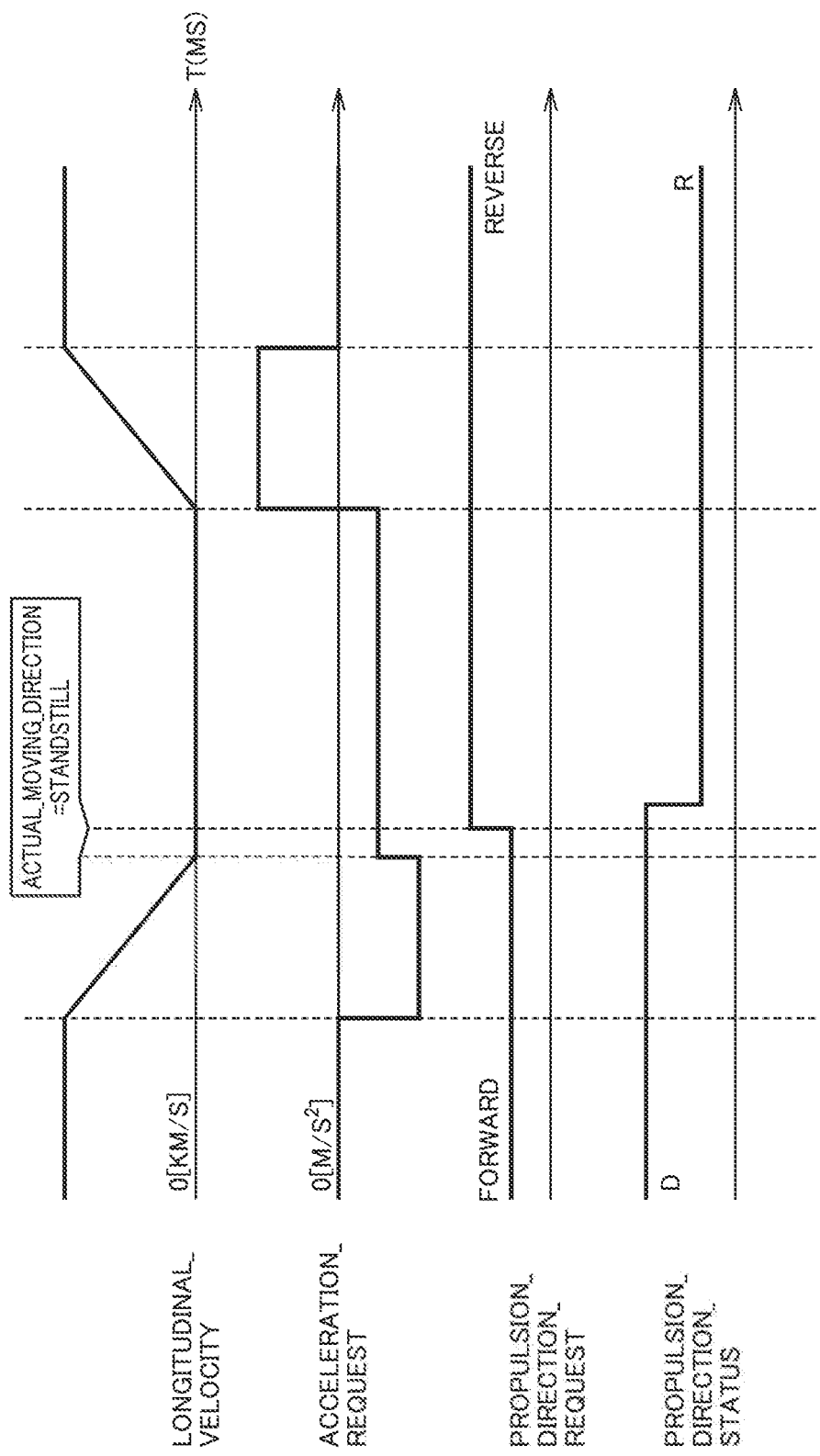
FIG. 17 is an example of timing plots of an API involved in a shift change of the MaaS vehicle.

After the shift change, acceleration/deceleration is controlled based on Acceleration Command value (FIG. 17).

3.3.1.3. WheelLock Sequence

The engagement and release of wheel lock is described. This function presupposes Autonomy_State=Autonomous Mode, otherwise the request is rejected.

This function is conductible only during vehicle is stopped. Acceleration Command requests deceleration and makes the vehicle stop. After Actual_Moving_Direction is set to "standstill", WheelLock is engaged by Immobilization Command="Applied". Acceleration Command is set to Deceleration until Immobilization Status is set to "Applied".

If release is desired, Immobilization Command="Release" is requested when the vehicle is stationary. Acceleration Command is set to Deceleration at that time.

Figure 18:
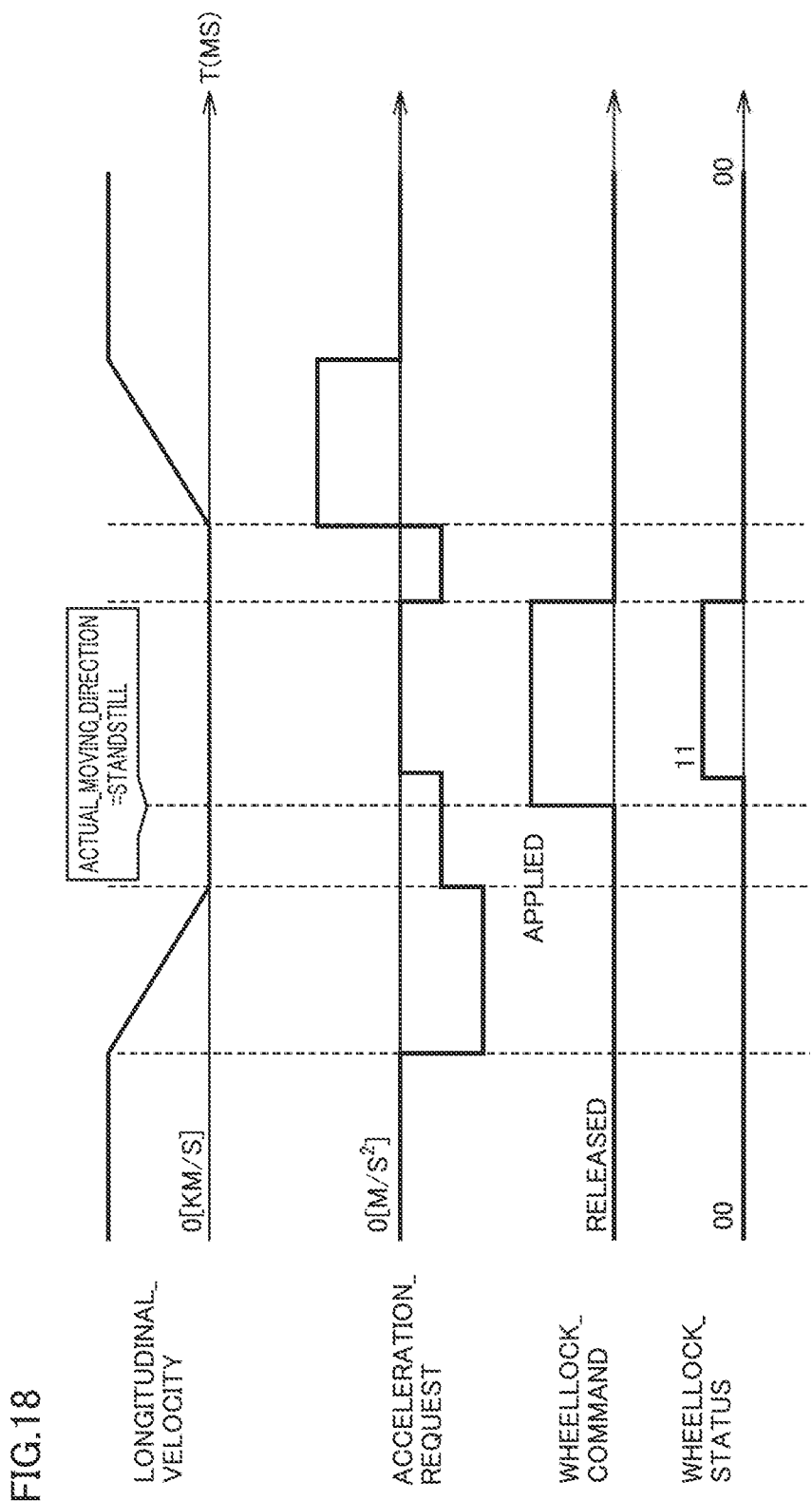
FIG. 18 is an example of timing plots of an API involved in locking a wheel of the MaaS vehicle.

After this, the vehicle is accelerated/decelerated based on Acceleration Command value (FIG. 18).

3.3.1.4. Road_Wheel_Angle Request

This function presupposes Autonomy_State="Autonomous Mode", and the request is rejected otherwise.

Tire Turning Angle Command is the relative value from Estimated_Road_Wheel_Angle_Actual.

For example, in case that Estimated_Road_Wheel_Angle_Actual=0.1 [rad] while the vehicle is going straight;

If ADS requests to go straight ahead, Tire Turning Angle Command should be set to 0+0.1=0.1 [rad].

If ADS requests to steer by −0.3 [rad], Tire Turning Angle Command should be set to −0.3+0.1=−0.2 [rad].

3.3.1.5. Rider Operation

3.3.1.5.1. Acceleration Pedal Operation

While in Autonomous driving mode, accelerator pedal stroke is eliminated from the vehicle acceleration demand selection.

3.3.1.5.2. Brake Pedal Operation

The action when the brake pedal is operated. In the autonomy mode, target vehicle deceleration is the sum of 1) estimated deceleration from the brake pedal stroke and 2) deceleration request from AD system.

3.3.1.5.3. Shift_Lever_Operation

In Autonomous driving mode, driver operation of the shift lever is not reflected in Propulsion Direction Status.

If necessary, ADS confirms Propulsion Direction by Driver and changes shift position by using Propulsion Direction Command.

3.3.1.5.4. Steering Operation

When the driver (rider) operates the steering, the maximum is selected from 1) the torque value estimated from driver operation angle, and 2) the torque value calculated from requested wheel angle.

Note that Tire Turning Angle Command is not accepted if the driver strongly turns the steering wheel. The above-mentioned is determined by Steering_Wheel_Intervention flag.

3.3.2. Inputs

TABLE 3

| Signal Name | Description | Redundancy |
|---|---|---|
| Propulsion Direction Command | Request to switch between forward (D range) and back (R range) | N/A |
| Immobilization Command | Request to engage/release WheelLock | Applied |
| Standstill Command | Request to maintain stationary | Applied |
| Acceleration Command | Request to accelerate/decelerate | Applied |
| Tire Turning Angle Command | Request front wheel angle | Applied |
| Autonomization Command | Request to transition between manual mode and autonomy mode | Applied |

3.3.2.1. Propulsion Direction Command

Request to switch between forward (D range) and back (R range)

Values

TABLE 4

| value | Description | Remarks |
|---|---|---|
| 0 | No Request | |
| 2 | R | Shift to R range |
| 4 | D | Shift to D range |
| other | Reserved | |

Remarks

Only available when Autonomy_State="Autonomous Mode"

D/R is changeable only the vehicle is stationary (Actual_Moving_Direction="standstill").

The request while driving (moving) is rejected.

When system requests D/R shifting, Acceleration Command is sent deceleration (−0.4 m/s$^2$) simultaneously. (Only while brake is applied.)

The request may not be accepted in following cases.

Direction_Control_Degradation_Modes="Failure detected"

3.3.2.2. Immobilization Command

Request to engage/release WheelLock
Values

TABLE 5

| value | Description | Remarks |
|---|---|---|
| 0 | No Request | |
| 1 | Applied | EPB is turned on and TM shifts to P range |
| 2 | Released | EPB is turned off and TM shifts to the value of Propulsion Direction Command |

Remarks
Available only when Autonomy_State="Autonomous Mode"
Changeable only when the vehicle is stationary (Actual_Moving_Direction="standstill")
The request is rejected when vehicle is running.
When Apply/Release mode change is requested, Acceleration Command is set to deceleration (−0.4 m/s²). (Only while brake is applied.)

3.3.2.3. Standstill Command

Request the vehicle to be stationary
Values

TABLE 6

| value | Description | Remarks |
|---|---|---|
| 0 | No Request | |
| 1 | Applied | Standstill is requested |
| 2 | Released | |

Remarks
Only available when Autonomy_State="Autonomous Mode"
Confirmed by Standstill Status="Applied"
When the vehicle is stationary (Actual_Moving_Direction="standstill"), transition to Stand Still is enabled.
Acceleration Command has to be continued until Standstill Status becomes "Applied" and Acceleration Command's deceleration request (−0.4 m/s²) should be continued.
There are more cases where the request is not accepted. Details are T.B.D.

3.3.2.4. Acceleration Command

Command vehicle acceleration
Values
Estimated_Max_Decel_Capability to Estimated_Max_Accel_Capability [m/s²]
Remarks
Only available when Autonomy_State="Autonomous Mode"
Acceleration (+) and deceleration (−) request based on Propulsion Direction Status direction
The upper/lower limit will vary based on Estimated_Max_Decel_Capability and Estimated_Max_Accel_Capability.
When acceleration more than Estimated_Max_Accel_Capability is requested, the request is set to Estimated_Max_Accel_Capability.
When deceleration more than Estimated_Max_Decel_Capability is requested, the request is set to Estimated_Max_Decel_Capability.
Depending on the accel/brake pedal stroke, the requested acceleration may not be met. See 3.4.1.4 for more detail.
When Pre-Collision system is activated simultaneously, minimum acceleration (maximum deceleration) is selected.

3.3.2.5. Tire Turning Angle Command

Command tire turning angle
Values

TABLE 7

| value | Description | Remarks |
|---|---|---|
| — | [unit: rad] | |

Remarks
Left is positive value (+). Right is negative value (−).
Available only when Autonomy_State="Autonomous Mode"
The output of Estimated_Road_Wheel_Angle_Actual when the vehicle is going straight, is set to the reference value (0).
This requests relative value of Estimated_Road_Wheel_Angle_Actual. (See 3.4.1.1 for details)
The requested value is within Current_Road_Wheel_Angle_Rate_Limit.
The requested value may not be fulfilled depending on the steer angle by the driver.

3.3.2.6. Autonomization Command

Request to transition between manual mode and autonomy mode
Values

TABLE 8

| value | Description | Remarks |
|---|---|---|
| 00b | No Request For Autonomy | |
| 01b | Request For Autonomy | |
| 10b | Deactivation Request | means transition request to manual mode |

The mode may be able not to be transitioned to Autonomy mode. (e.g. In case that a failure occurs in the vehicle platform.)

3.3.3. Outputs

TABLE 9

| Signal Name | Description | Redundancy |
|---|---|---|
| Propulsion Direction Status | Current shift range | N/A |
| Propulsion Direction by Driver | Shift lever position by driver | N/A |

TABLE 9-continued

| Signal Name | Description | Redundancy |
|---|---|---|
| Immobilization Status | Output of EPB and Shift P | Applied |
| Immobilization Request by Driver | EPB switch status by driver | N/A |
| Standstill Status | Stand still status | N/A |
| Estimated_Coasting_Rate | Estimated vehicle deceleration when throttle is closed | N/A |
| Estimated_Max_Accel_Capability | Estimated maximum acceleration | Applied |
| Estimated_Max_Decel_Capability | Estimated maximum deceleration | Applied |
| Estimated_Road_Wheel_Angle_Actual | Front wheel steer angle | Applied |
| Estimated_Road_Wheel_Angle_Rate_Actual | Front wheel steer angle rate | Applied |
| Steering_Wheel_Angle_Actual | Steering wheel angle | N/A |
| Steering_Wheel_Angle_Rate_Actual | Steering wheel angle rate | N/A |
| Current_Road_Wheel_Angle_Rate_Limit | Road wheel angle rate limit | Applied |
| Estimated_Max_Lateral_Acceleration_Capability | Estimated max lateral acceleration | Applied |
| Estimated_Max_Lateral_Acceleration_Rate_Capability | Estimated max lateral acceleration rate | Applied |
| Accelerator_Pedal_Position | Position of the accelerator pedal (How much is the pedal depressed?) | N/A |
| Accelerator_Pedal_Intervention | This signal shows whether the accelerator pedal is depressed by a driver (intervention) | N/A |
| Brake_Pedal_Position | Position of the brake pedal (How much is the pedal depressed?) | T.B.D. |
| Brake_Pedal_Intervention | This signal shows whether the brake pedal is depressed by a driver (intervention) | T.B.D. |
| Steering_Wheel_Intervention | This signal shows whether the steering wheel is turned by a driver (intervention) | T.B.D. |
| Shift_Lever_Intervention | This signal shows whether the shift lever is controlled by a driver (intervention) | T.B.D. |
| WheelSpeed_FL | wheel speed value (Front Left Wheel) | N/A |
| WheelSpeed_FL_Rotation | Rotation direction of wheel (Front Left) | N/A |
| WheelSpeed_FR | wheel speed value (Front Right Wheel) | N/A |
| WheelSpeed_FR_Rotation | Rotation direction of wheel (Front Right) | N/A |
| WheelSpeed_RL | wheel speed value (Rear Left Wheel) | Applied |
| WheelSpeed_RL_Rotation | Rotation direction of wheel (Rear Left) | Applied |
| WheelSpeed_RR | wheel speed value (Rear Right Wheel) | Applied |
| WheelSpeed_RR_Rotation | Rotation direction of wheel (Rear Right) | Applied |
| Actual_Moving_Direction | Moving direction of vehicle | Applied |
| Longitudinal_Velocity | Estimated longitudinal velocity of vehicle | Applied |
| Longitudinal_Acceleration | Estimated longitudinal acceleration of vehicle | Applied |
| Lateral_Acceleration | Sensor value of lateral acceleration of vehicle | Applied |
| Yawrate | Sensor value of Yaw rate | Applied |
| Autonomy_State | State of whether autonomy mode or manual mode | Applied |
| Autonomy_Ready | Situation of Whether the vehicle can transition to autonomy mode or not | Applied |
| Autonomy_Fault | Status of whether the fault regarding a functionality in autonomy mode occurs or not | Applied |

3.3.3.1. Propulsion Direction Status

Current shift range
Values

TABLE 10

| value | Description | remarks |
|---|---|---|
| 0 | Reserved | |
| 1 | P | |
| 2 | R | |
| 3 | N | |
| 4 | D | |
| 5 | B | |
| 6 | Reserved | |
| 7 | Invalid value | |

Remarks
When the shift range is indeterminate, this output is set to "Invalid Value".
When the vehicle becomes the following status during VO mode, [Propulsion Direction Status] will turn to "P".
  [Longitudinal_Velocity]=0 [km/h]
  [Brake_Pedal_Position]<Threshold value (T.B.D.) (in case of being determined that the pedal isn't depressed)
  [1st_Left_Seat_Belt_Status]=Unbuckled
  [1st_Left_Door_Open_Status]=Opened 3.3.3.2. Propulsion Direction by Driver Shift lever position by driver operation
Values

TABLE 11

| value | Description | remarks |
|---|---|---|
| 0 | No Request | |
| 1 | P | |
| 2 | R | |
| 3 | N | |
| 4 | D | |
| 5 | B | |
| 6 | Reserved | |
| 7 | Invalid value | |

Remarks
Output based on the lever position operated by driver
If the driver releases his hand of the shift lever, the lever returns to the central position and the output is set as "No Request".
When the vehicle becomes the following status during NVO mode, [Propulsion Direction by Driver] will turn to "1(P)".
  [Longitudinal_Velocity]=0 [km/h]
  [Brake_Pedal_Position]<Threshold value (T.B.D.) (in case of being determined that the pedal isn't depressed)

[1st_Left_Seat_Belt_Status]=Unbuckled
[1st_Left_Door_Open_Status]=Opened

3.3.3.3. Immobilization Status

Output EPB and Shift-P status
Values
<Primary>

TABLE 12

| Value | | | |
|---|---|---|---|
| Shift | EPB | Description | Remarks |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

<Secondary>

TABLE 13

| Value | | | |
|---|---|---|---|
| Shift | | Description | Remarks |
| 0 | 0 | Other than Shift P | |
| 1 | 0 | Shift P | |
| 0 | 1 | Reserved | |
| 1 | 1 | Reserved | |

Remarks
Secondary signal does not include EPB lock status.

3.3.3.4. Immobilization Request by Driver

Driver operation of EPB switch
Values

TABLE 14

| value | Description | remarks |
|---|---|---|
| 0 | No Request | |
| 1 | Engaged | |
| 2 | Released | |
| 3 | Invalid value | |

Remarks
"Engaged" is outputted while the EPB switch is being pressed.
"Released" is outputted while the EPB switch is being pulled.

3.3.3.5. Standstill Status

Vehicle stationary status
Values

TABLE 15

| Value | Description | remarks |
|---|---|---|
| 0 | Released | |
| 1 | Applied | |
| 2 | Reserved | |
| 3 | Invalid value | |

Remarks
When Standstill Status=Applied continues for 3 minutes, EPB is activated.
If the vehicle is desired to start, ADS requests Standstill Command="Released".

3.3.3.6. Estimated_Coasting_Rate

Estimated vehicle deceleration when throttle is closed
Values
[unit: $m/s^2$]
Remarks
Estimated acceleration at WOT is calculated.
Slope and road load etc. are taken into estimation.
When the Propulsion Direction Status is "D", the acceleration to the forward direction shows a positive value.
When the Propulsion Direction Status is "R", the acceleration to the reverse direction shows a positive value.

3.3.3.7. Estimated_Max_Accel_Capability

Estimated maximum acceleration
Values
[unit: $m/s^2$]
Remarks
The acceleration at WOT is calculated.
Slope and road load etc. are taken into estimation.
The direction decided by the shift position is considered to be plus.

3.3.3.8. Estimated_Max_Decel_Capability

Estimated maximum deceleration
Values
−9.8 to 0 [unit: $m/s^2$]
Remarks
Affected by Brake_System_Degradation_Modes. Details are T.B.D.
Based on vehicle state or road condition, cannot output in some cases

3.3.3.9. Estimated_Road_Wheel_Angle_Actual

Front wheel steer angle
Values

TABLE 16

| value | Description | Remarks |
|---|---|---|
| others | [unit: rad] | |
| Minimum Value | Invalid value | The sensor is invalid. |

Remarks
Left is positive value (+). Right is negative value (−).
Before "the wheel angle when the vehicle is going straight" becomes available, this signal is Invalid value.

3.3.3.10. Estimated_Road_Wheel_Angle_Rate_Actual

Front wheel steer angle rate
Values

TABLE 17

| value | Description | Remarks |
|---|---|---|
| others | [unit: rad/s] | |
| Minimum Value | Invalid value | |

Remarks

Left is positive value (+). Right is negative value (−).

3.3.3.11. Steering_Wheel_Angle_Actual

Steering wheel angle
Values

TABLE 18

| Value | Description | Remarks |
|---|---|---|
| others | [unit: rad] | |
| Minimum Value | Invalid value | |

Remarks

Left is positive value (+). Right is negative value (−).
The steering angle converted from the steering assist motor angle
Before "the wheel angle when the vehicle is going straight" becomes available, this signal is Invalid value.

3.3.3.12. Steering_Wheel_Angle_Rate_Actual

Steering wheel angle rate
Values

TABLE 19

| Value | Description | Remarks |
|---|---|---|
| others | [unit: rad/s] | |
| Minimum Value | Invalid value | |

Remarks

Left is positive value (+). Right is negative value (−).
The steering angle rate converted from the steering assist motor angle rate

3.3.3.13. Current_Road_Wheel_Angle_Rate_Limit

Figure 19:
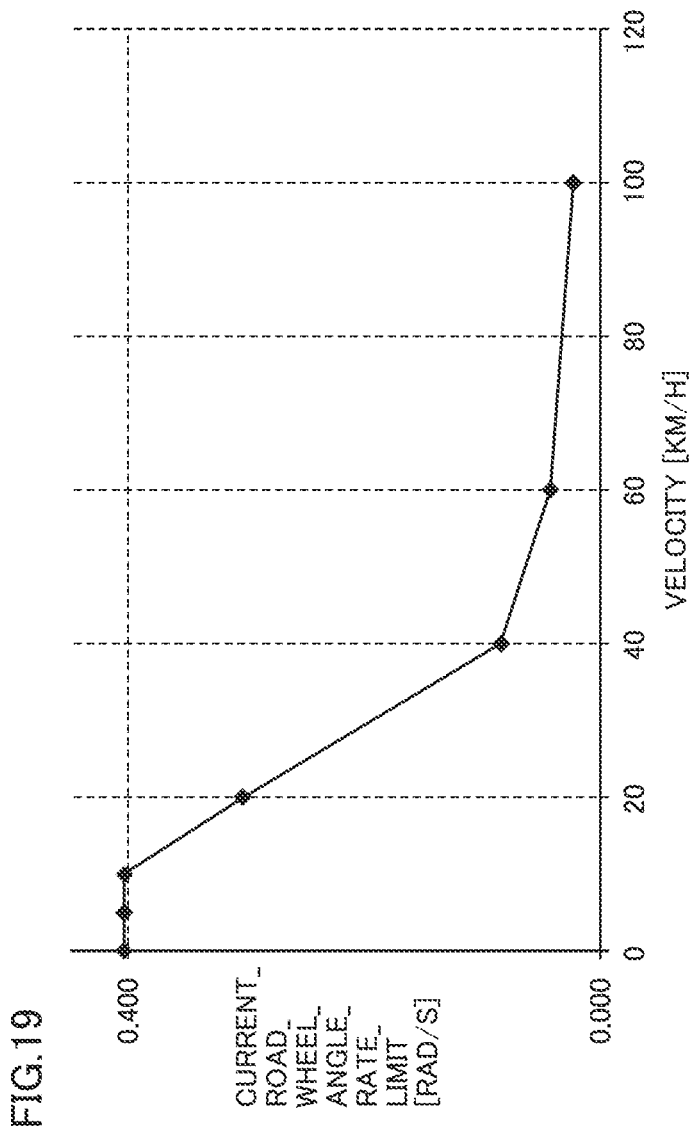
FIG. 19 is a diagram representing a limit value of variation in tire turning angle.

Road wheel angle rate limit
Values
When stopped: 0.4 [rad/s]
While running: Show "Remarks"
Remarks
Calculated from the "vehicle speed–steering angle rate" chart like below
A) At a very low speed or stopped situation, use fixed value of 0.4 [rad/s]
B) At a higher speed, the steering angle rate is calculated from the vehicle speed using 2.94 m/s$^3$
The threshold speed between A and B is 10 [km/h] (FIG. 19).

3.3.3.14. Estimated_Max_Lateral_Acceleration_Capability

Estimated max lateral acceleration
Values
2.94 [unit: m/s$^2$] fixed value
Remarks
Wheel Angle controller is designed within the acceleration range up to 2.94 m/s$^2$.

3.3.3.15. Estimated_Max_Lateral_Acceleration_Rate_Capability

Estimated max lateral acceleration rate
Values
2.94 [unit: m/s$^3$] fixed value

Remarks

Wheel Angle controller is designed within the acceleration range up to 2.94 m/s$^3$.

3.3.3.16. Accelerator_Pedal_Position

Position of the accelerator pedal (How much is the pedal depressed?)
Values
0 to 100 [unit: %]
Remarks
In order not to change the acceleration openness suddenly, this signal is filtered by smoothing process.
In normal condition
 The accelerator position signal after zero point calibration is transmitted.
In failure condition
 Transmitted failsafe value (0xFF)

3.3.3.17. Accelerator_Pedal_Intervention

This signal shows whether the accelerator pedal is depressed by a driver (intervention).
Values

TABLE 20

| Value | Description | Remarks |
|---|---|---|
| 0 | Not depressed | |
| 1 | depressed | |
| 2 | Beyond autonomy acceleration | |

Remarks

When Accelerator_Pedal_Position is higher than the defined threshold value (ACCL_INTV), this signal [Accelerator_Pedal_Intervention] will turn to "depressed".

When the requested acceleration from depressed acceleration pedal is higher than the requested acceleration from system (ADS, PCS etc.), this signal will turn to "Beyond autonomy acceleration".

Figure 20:
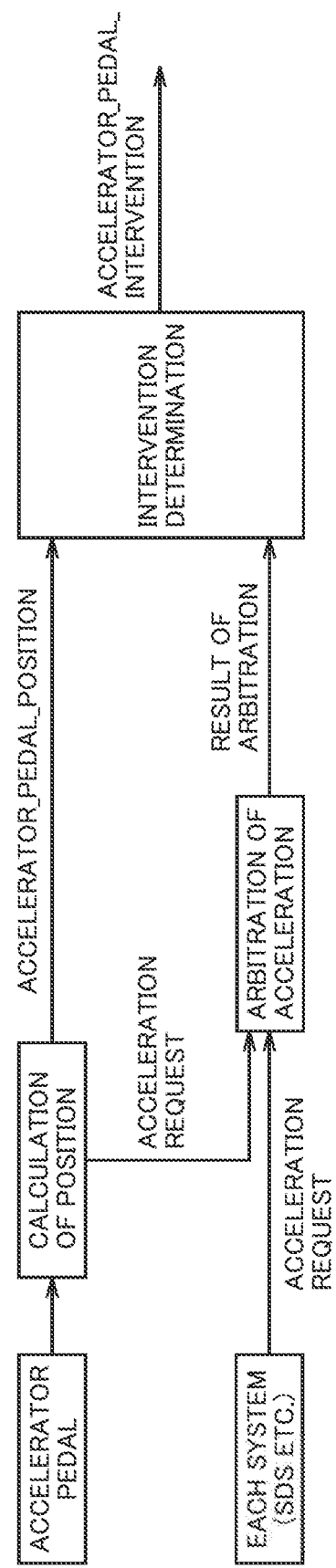
FIG. 20 is a diagram for illustrating intervention by an accelerator pedal.

During NVO mode, accelerator request will be rejected. Therefore, this signal will not turn to "2".
Detail design (FIG. 20)

3.3.3.18. Brake_Pedal_Position

Position of the brake pedal (How much is the pedal depressed?)
Values
0 to 100 [unit: %]
Remarks
In the brake pedal position sensor failure:
 Transmitted failsafe value (0xFF)
Due to assembling error, this value might be beyond 100%.

3.3.3.19. Brake_Pedal_Intervention

This signal shows whether the brake pedal is depressed by a driver (intervention).

Values

TABLE 21

| Value | Description | Remarks |
|---|---|---|
| 0 | Not depressed | |
| 1 | depressed | |
| 2 | Beyond autonomy deceleration | |

Remarks

When Brake_Pedal_Position is higher than the defined threshold value (BRK_INTV), this signal [Brake_Pedal_Intervention] will turn to "depressed".

When the requested deceleration from depressed brake pedal is higher than the requested deceleration from system (ADS, PCS etc.), this signal will turn to "Beyond autonomy deceleration".

Figure 21:
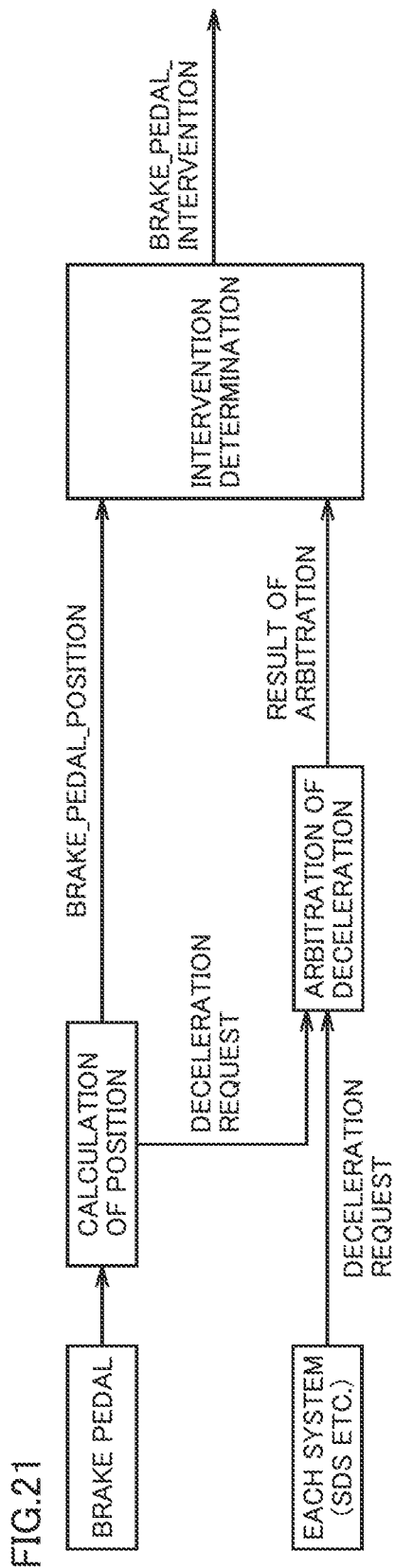
FIG. 21 is a diagram for illustrating intervention by a brake pedal.

Detail design (FIG. 21)

3.3.3.20. Steering_Wheel_Intervention

This signal shows whether the steering wheel is turned by a driver (intervention).

Values

TABLE 22

| Value | Description | Remarks |
|---|---|---|
| 0 | Not turned | |
| 1 | Turned collaboratively | Driver steering torque + steering motor torque |
| 2 | Turned by human driver | |

Remarks

In "Steering Wheel Intervention=1", considering the human driver's intent, EPS system will drive the steering with the Human driver collaboratively.

In "Steering Wheel Intervention=2", considering the human driver's intent, EPS system will reject the steering requirement from autonomous driving kit. (The steering will be driven the human driver.)

3.3.3.21. Shift_Lever_Intervention

This signal shows whether the shift lever is controlled by a driver (intervention).

Values

TABLE 23

| Value | Description | Remarks |
|---|---|---|
| 0 | OFF | |
| 1 | ON | Controlled (moved to any shift position) |

Remarks

N/A

3.3.3.22. WheelSpeed_FL, WheelSpeed_FR, WheelSpeed_RL, WheelSpeed_RR wheel speed value Values

TABLE 24

| Value | Description | Remarks |
|---|---|---|
| others | Velocity [unit: m/s] | |
| Maximum Value | Invalid value | The sensor is invalid. |

Remarks

T.B.D.

3.3.3.23. WheelSpeed_FL_Rotation, WheelSpeed_FR_Rotation, WheelSpeed_RL_Rotation, WheelSpeed_RR_Rotation Rotation direction of each wheel Values

TABLE 25

| value | Description | remarks |
|---|---|---|
| 0 | Forward | |
| 1 | Reverse | |
| 2 | Reserved | |
| 3 | Invalid value | The sensor is invalid. |

Remarks

After activation of ECU, until the rotation direction is fixed, "Forward" is set to this signal.

When detected continuously 2 (two) pulses with the same direction, the rotation direction will be fixed.

3.3.3.24. Actual_Moving_Direction

Rotation direction of wheel

Values

TABLE 26

| value | Description | remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When other than above, this signal will be determined by the majority rule of four WheelSpeed_Rotations.

When more than two WheelSpeed_Rotations are "Reverse", this signal shows "Reverse".

When more than two WheelSpeed_Rotations are "Forward", this signal shows "Forward".

When "Forward" and "Reverse" are the same counts, this signal shows "Undefined".

3.3.3.25. Longitudinal_Velocity

Estimated longitudinal velocity of vehicle
Values

TABLE 27

| Value | Description | Remarks |
|---|---|---|
| others | Velocity [unit: m/s] | |
| Maximum Value | Invalid value | The sensor is invalid. |

Remarks
This signal is output as the absolute value.

3.3.3.26. Longitudinal_Acceleration

Estimated longitudinal acceleration of vehicle
Values

TABLE 28

| value | Description | Remarks |
|---|---|---|
| others | Acceleration [unit: $m/s^2$] | |
| Minimum Value | Invalid value | The sensor is invalid. |

Remarks
This signal will be calculated with wheel speed sensor and acceleration sensor.
When the vehicle is driven at a constant velocity on the flat road, this signal shows "0".

3.3.3.27. Lateral Acceleration

Sensor value of lateral acceleration of vehicle
Values

TABLE 29

| Value | Description | Remarks |
|---|---|---|
| others | Acceleration [unit: $m/s^2$] | |
| Minimum Value | Invalid value | The sensor is invalid. |

Remarks
The positive value means counterclockwise. The negative value means clockwise.

3.3.3.28. Yaw Rate

Sensor value of Yaw rate
Values

TABLE 30

| Value | Description | Remarks |
|---|---|---|
| others | Yaw rate [unit: deg/s] | |
| Minimum Value | Invalid value | The sensor is invalid. |

Remarks
The positive value means counterclockwise. The negative value means clockwise.

3.3.3.29. Autonomy_State

State of whether autonomy mode or manual mode
Values

TABLE 31

| value | Description | Remarks |
|---|---|---|
| 00 | Manual Mode | The mode starts from Manual mode. |
| 01 | Autonomous Mode | |

Remarks
The initial state is the Manual mode. (When Ready ON, the vehicle will start from the Manual mode.)

3.3.3.30. Autonomy_Ready

Situation of whether the vehicle can transition to autonomy mode or not
Values

TABLE 32

| value | Description | Remarks |
|---|---|---|
| 00b | Not Ready For Autonomy | |
| 01b | Ready For Autonomy | |
| 11b | Invalid | means the status is not determined. |

Remarks
This signal is a part of transition conditions toward the Autonomy mode.
Please see the summary of conditions.

3.3.3.31. Autonomy_Fault

Status of whether the fault regarding a functionality in autonomy mode occurs or not
Values

TABLE 33

| value | Description | Remarks |
|---|---|---|
| 00b | No fault | |
| 01b | Fault | |
| 11b | Invalid | means the status is not determined. |

Remarks
[T.B.D.] Please see the other material regarding the fault codes of a functionality in autonomy mode.
[T.B.D.] Need to consider the condition to release the status of "fault".

3.4. APIs for BODY Control

3.4.1. Functions

T.B.D.

3.4.2. Inputs

TABLE 34

| Signal Name | Description | Redundancy |
|---|---|---|
| Turnsignallight_Mode_Command | Command to control the turnsignallight mode of the vehicle platform | N/A |

TABLE 34-continued

| Signal Name | Description | Redundancy |
| --- | --- | --- |
| Headlight_Mode_Command | Command to control the headlight mode of the vehicle platform | N/A |
| Hazardlight_Mode_Command | Command to control the hazardlight mode of the vehicle platform | N/A |
| Horn_Pattern_Command | Command to control the pattern of horn ON-time and OFF-time per cycle of the vehicle platform | N/A |
| Horn_Number_of_Cycle_Command | Command to control the Number of horn ON/OFF cycle of the vehicle platform | N/A |
| Horn_Continuous_Command | Command to control of horn ON of the vehicle platform | N/A |
| Windshieldwiper_Mode_Front_Command | Command to control the front windshield wiper of the vehicle platform | N/A |
| Windshieldwiper_Intermittent_Wiping_Speed_Command | Command to control the Windshield wiper actuation interval at the Intermittent mode | N/A |
| Windshieldwiper_Mode_Rear_Command | Command to control the rear windshield wiper mode of the vehicle platform | N/A |
| Hvac_1st_Command | Command to start/stop 1st row air conditioning control | N/A |
| Hvac_2nd_Command | Command to start/stop 2nd row air conditioning control | N/A |
| Hvac_TargetTemperature_1st_Left_Command | Command to set the target temperature around front left area | N/A |
| Hvac_TargetTemperature_1st_Right_Command | Command to set the target temperature around front right area | N/A |
| Hvac_TargetTemperature_2nd_Left_Command | Command to set the target temperature around rear left area | N/A |
| Hvac_TargetTemperature_2nd_Right_Command | Command to set the target temperature around rear right area | N/A |
| Hvac_Fan_Level_1st_Row_Command | Command to set the fan level on the front AC | N/A |
| Hvac_Fan_Level_2nd_Row_Command | Command to set the fan level on the rear AC | N/A |
| Hvac_1st_Row_AirOutlet_Mode_Command | Command to set the mode of 1st row air outlet | N/A |
| Hvac_2nd_Row_AirOutlet_Mode_Command | Command to set the mode of 2nd row air outlet | N/A |
| Hvac_Recirculate_Command | Command to set the air recirculation mode | N/A |
| Hvac_AC_Command | Command to set the AC mode | N/A |

3.4.2.1. Turnsignallight_Mode_Command

Command to control the turnsignallight mode of the vehicle platform
Values

TABLE 35

| value | Description | remarks |
| --- | --- | --- |
| 0 | OFF | Blinker OFF |
| 1 | Right | Right blinker ON |
| 2 | Left | Left blinker ON |
| 3 | reserved | |

Remarks
T.B.D.
Detailed Design
When Turnsignallight_Mode_Command=1, vehicle platform sends left blinker on request.

When Turnsignallight_Mode_Command=2, vehicle platform sends right blinker on request.

3.4.2.2. Headlight_Mode_Command

Command to control the headlight mode of the vehicle platform
Values

TABLE 36

| Value | Description | remarks |
| --- | --- | --- |
| 0 | No Request | Keep current mode |
| 1 | TAIL mode request | side lamp mode |
| 2 | HEAD mode request | Lo mode |
| 3 | AUTO mode request | |
| 4 | HI mode request | |
| 5 | OFF Mode Request | |
| 6-7 | reserved | |

Remarks
This command is valid when Headlight_Driver_Input=OFF or Auto mode ON.
Driver input overrides this command.
Headlight mode changes when Vehicle platform receives once this command.

3.4.2.3. Hazardlight_Mode_Command

Command to control the hazardlight mode of the vehicle platform
Values

TABLE 37

| value | Description | remarks |
|---|---|---|
| 0 | OFF | command for hazardlight OFF |
| 1 | ON | command for hazardlight ON |

Remarks
Driver input overrides this command.
Hazardlight is active during Vehicle Platform receives ON command.

3.4.2.4. Horn_Pattern_Command

Command to control the pattern of horn ON-time and OFF-time per cycle of the vehicle platform
Values

TABLE 38

| value | Description | remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | reserved |
| 4 | Pattern 4 | reserved |
| 5 | Pattern 5 | reserved |
| 6 | Pattern 6 | reserved |
| 7 | Pattern 7 | Reserved |

Remarks
Pattern 1 is assumed to use single short ON, Pattern 2 is assumed to use ON-OFF repeating.
Detail is under internal discussion.

3.4.2.5. Horn_Number_of_Cycle_Command

Command to control the Number of horn ON/OFF cycle of the vehicle platform
Values
0-7 [-]
Remarks
Detail is under internal discussion.

3.4.2.6. Horn Continuous Command

Command to control of horn ON of the vehicle platform
Values

TABLE 39

| value | Description | remarks |
|---|---|---|
| 0 | No request | |
| 1 | ON request | |

Remarks
This command overrides Horn_Pattern_Command, Horn_Number_of_Cycle_Command.
Horn is active during Vehicle Platform receives ON command.
Detail is under internal discussion.

3.4.2.7. Windshieldwiper_Mode_Front_Command

Command to control the front windshield wiper of the vehicle platform
Values

TABLE 40

| value | Description | remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-Time Wiping |
| 6, 7 | Reserved | |

Remarks
This command is under internal discussion the timing of valid.
This command is valid when Windshieldwiper_Front_Driver_Input=OFF or Auto mode ON.
Driver input overrides this command.
Windshieldwiper mode is kept during Vehicle platform is receiving the command.

3.4.2.8. Windshieldwiper_Intermittent_Wiping_Speed_Command

Command to control the Windshield wiper actuation interval at the Intermittent mode
Values

TABLE 41

| value | Description | remarks |
|---|---|---|
| 0 | FAST | |
| 1 | SECOND FAST | |
| 2 | THIRD FAST | |
| 3 | SLOW | |

Remarks
This command is valid when Windshieldwiper_Mode_Front_Status=INT.
Driver input overrides this command.
Windshieldwiper intermittent mode changes when Vehicle platform receives once this command.

3.4.2.9. Windshieldwiper_Mode_Rear_Command

Command to control the rear windshield wiper mode of the vehicle platform
Values

TABLE 42

| value | Description | Remarks |
|---|---|---|
| 0 | OFF mode request | |
| 1 | Lo mode request | |

TABLE 42-continued

| value | Description | Remarks |
|---|---|---|
| 2 | reserved | |
| 3 | Intermittent mode request | |
| 4-7 | reserved | |

Remarks
Driver input overrides this command.
Windshieldwiper mode is kept during Vehicle platform is receiving the command.
Wiping speed of intermittent mode is not variable.

3.4.2.10. Hvac_1st_Command

Command to start/stop 1st row air conditioning control
Values

TABLE 43

| value | Description | Remarks |
|---|---|---|
| 00 | No request | |
| 01 | ON | means turning the 1st air conditioning control to ON |
| 02 | OFF | means turning the 1st air conditioning control to OFF |

Remarks
The hvac of S-AM has a synchronization functionality. Therefore, in order to control 4 (four) hvacs (1st_left/right, 2nd_left/right) individually, VCIB achieves the following procedure after Ready-ON. (This functionality will be implemented from the CV.)
1: Hvac_1st_Command=ON
2: Hvac 2nd Command=ON
3: Hvac_TargetTemperature_2nd_Left_Command
4: Hvac_TargetTemperature_2nd_Right_Command
5: HvacFan_Level_2nd_Row_Command
6: Hvac_2nd_Row_AirOutlet_Mode_Command
7: Hvac_TargetTemperature_1st_Left_Command
8: Hvac_TargetTemperature_1st_Right_Command
9: Hvac_Fan_Level_1st_Row_Command
10: Hvac_1st_Row_AirOutlet_Mode_Command
The interval between each command needs 200 ms or more.
Other commands are able to be executed after #1.

3.4.2.11. Hvac_2nd_Command

Command to start/stop 2nd row air conditioning control

TABLE 44

| value | Description | Remarks |
|---|---|---|
| 00 | No request | |
| 01 | ON | means turning the 2nd air conditioning control to ON |
| 02 | OFF | means turning the 2nd air conditioning control to OFF |

Remarks
N/A

3.4.2.12. Hvac_TargetTemperature_1st_Left_Command

Command to set the target temperature around front left area
Values

TABLE 45

| value | Description | Remarks |
|---|---|---|
| 0 | No request | |
| 60 to 85 [unit: ° F.] (by 1.0° F.) | Temperature direction | |

Remarks
N/A

3.4.2.13. Hvac_TargetTemperature_1st_Right_Command

Command to set the target temperature around front right area
Values

TABLE 46

| value | Description | Remarks |
|---|---|---|
| 0 | No request | |
| 60 to 85 [unit: ° F.] (by 1.0° F.) | Temperature direction | |

Remarks
N/A

3.4.2.14. Hvac_TargetTemperature_2nd_Left_Command

Command to set the target temperature around rear left area
Values

TABLE 47

| value | Description | Remarks |
|---|---|---|
| 0 | No request | |
| 60 to 85 [unit: ° F.] (by 1.0° F.) | Temperature direction | |

Remarks
N/A

3.4.2.15. Hvac_TargetTemperature_2nd_Right_Command

Command to set the target temperature around rear right area
Values

TABLE 48

| value | Description | Remarks |
|---|---|---|
| 0 | No request | |
| 60 to 85 [unit: ° F.] (by 1.0° F.) | Temperature direction | |

Remarks
N/A

3.4.2.16. Hvac_Fan_Level_1st_Row_Command

Command to set the fan level on the front AC

Values

TABLE 49

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_1st_Command=OFF".
If you would like to turn the fan level to AUTO, you should transmit "Hvac_1st_Command=ON".

3.4.2.17. Hvac_Fan_Level_2nd_Row_Command

Command to set the fan level on the rear AC
Values

TABLE 50

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_2nd_Command=OFF".
If you would like to turn the fan level to AUTO, you should transmit "Hvac_2nd_Command=ON".

3.4.2.18. Hvac_1st_Row_AirOutlet_Mode_Command

Command to set the mode of 1st row air outlet
Values

TABLE 51

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |

Remarks
N/A

3.4.2.19. Hvac_2nd_Row_AirOutlet_Mode_Command

Command to set the mode of 2nd row air outlet
Values

TABLE 52

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |

Remarks
N/A

3.4.2.20. Hvac_Recirculate_Command

Command to set the air recirculation mode
Values

TABLE 53

| value | Description | Remarks |
|---|---|---|
| 00 | No request | |
| 01 | ON | means turning the air recirculation mode ON |
| 02 | OFF | means turning the air recirculation mode OFF |

Remarks
N/A

3.4.2.21. Hvac_AC_Command

Command to set the AC mode
Values

TABLE 54

| value | Description | remarks |
|---|---|---|
| 00 | No request | |
| 01 | ON | means turning the AC mode ON |
| 02 | OFF | means turning the AC mode OFF |

Remarks
N/A

3.4.3. Outputs

TABLE 55

| Signal Name | Description | Redundancy |
|---|---|---|
| Turnsignallight_Mode_Status | Status of the current turnsignallight mode of the vehicle platform | N/A |
| Headlight_Mode_Status | Status of the current headlight mode of the vehicle platform | N/A |
| Hazardlight_Mode_Status | Status of the current hazardlight mode of the vehicle platform | N/A |
| Horn_Status | Status of the current horn of the vehicle platform | N/A |
| Windshieldwiper_Mode_Front_Status | Status of the current front windshield wiper mode of the vehicle platform | N/A |
| Windshieldwiper_Mode_Rear_Status | Status of the current rear windshield wiper mode of the vehicle platform | N/A |
| Hvac_$1^{st}$_Status | Status of activation of the $1^{st}$ row HVAC | N/A |
| Hvac_$2^{nd}$_Status | Status of activation of the $2^{nd}$ row HVAC | N/A |

TABLE 55-continued

| Signal Name | Description | Redundancy |
|---|---|---|
| Hvac_Temperature_1st_Left_Status | Status of set temperature of 1st row left | N/A |
| Hvac_Temperature_1st_Right_Status | Status of set temperature of 1st row right | N/A |
| Hvac_Temperature_2nd_Left_Status | Status of set temperature of 2nd row left | N/A |
| Hvac_Temperature_2nd_Right_Status | Status of set temperature of 2nd row right | N/A |
| Hvac_Fan_Level_1st_Row_Status | Status of set fan level of 1st row | N/A |
| Hvac_Fan_Level_2nd_Row_Status | Status of set fan level of 2nd row | N/A |
| Hvac_1st_Row_AirOutlet_Mode_Status | Status of mode of 1st row air outlet | N/A |
| Hvac_2nd_Row_AirOutlet_Mode_Status | Status of mode of 2nd row air outlet | N/A |
| Hvac_Recirculate_Status | Status of set air recirculation mode | N/A |
| Hvac_AC_Status | Status of set AC mode | N/A |
| 1st_Right_Seat_Occupancy_Status | Seat occupancy status in 1st left seat | — |
| 1st_Left_Seat_Belt_Status | Status of driver's seat belt buckle switch | — |
| 1st_Right_Seat_Belt_Status | Status of passenger's seat belt buckle switch | — |
| 2nd_Left_Seat_Belt_Status | Seat belt buckle switch status in 2nd left seat | — |
| 2nd_Right_Seat_Belt_Status | Seat belt buckle switch status in 2nd right seat | — |

3.4.3.1. Turnsignallight_Mode_Status

Status of the current turnsignallight mode of the vehicle platform
Values

TABLE 56

| value | Description | Remarks |
|---|---|---|
| 0 | OFF | Turn lamp = OFF |
| 1 | Left | Turn lamp L = ON (flashing) |
| 2 | Right | Turn lamp R = ON (flashing) |
| 3 | invalid | |

Remarks
At the time of the disconnection detection of the turn lamp, state is ON.
At the time of the short detection of the turn lamp, State is OFF.

3.4.3.2. Headlight_Mode_Status

Status of the current headlight mode of the vehicle platform
Values

TABLE 57

| Value | Description | Remarks |
|---|---|---|
| 0 | OFF | |
| 1 | TAIL | |
| 2 | Lo | |
| 3 | reserved | |
| 4 | Hi | |
| 5-6 | reserved | |
| 7 | invalid | |

Remarks
N/A
Detailed Design
At the time of tail signal ON, Vehicle Platform sends 1.
At the time of Lo signal ON, Vehicle Platform sends 2.
At the time of Hi signal ON, Vehicle Platform sends 4.
At the time of any signal above OFF, Vehicle Platform sends 0.

3.4.3.3. Hazardlight_Mode_Status

Status of the current hazard lamp mode of the vehicle platform
Values

TABLE 58

| Value | Description | Remarks |
|---|---|---|
| 0 | OFF | Hazard lamp = OFF |
| 1 | Hazard | Hazard lamp = ON (flashing) |
| 2 | reserved | |
| 3 | invalid | |

Remarks
N/A

3.4.3.4. Horn_Status

Status of the current horn of the vehicle platform
Values

TABLE 59

| Value | Description | Remarks |
|---|---|---|
| 0 | OFF | |
| 1 | ON | |
| 2 | reserved (unsupport) | |
| 3 | invalid (unsupport) | |

Remarks
cannot detect any failure.
Vehicle platform sends "1" during Horn Pattern Command is active, if the horn is OFF.

3.4.3.5. Windshieldwiper_Mode_Front_Status

Status of the current front windshield wiper mode of the vehicle platform

Values

TABLE 60

| Value | Description | Remarks |
|---|---|---|
| 0 | OFF | Front wiper stopped |
| 1 | Lo | Front wiper being active in LO mode (also including being active in MIST, being active in coordination with washer, and being wiping at speed other than HI) |
| 2 | Hi | Front wiper being active in HI mode |
| 3 | INT | Front wiper being active in INT mode (also including motor stop while being active in INT mode and being active in INT mode owing to vehicle speed change function) |
| 4-5 | reserved | |
| 6 | fail | Front wiper failed |
| 7 | invalid | |

TABLE 61

| Value | Description | Remarks |
|---|---|---|
| 0 | OFF | Front wiper is stopped. |
| 1 | Lo | Front wiper is in LO mode (include in MIST mode, operation with washer, Medium speed). |
| 2 | Hi | Front wiper is in HI mode. |
| 3 | INT | Front wiper is in INT mode (include motor stopped between INT mode, INT operation of vehicle speed change function). |
| 4-5 | reserved | |
| 6 | fail | Front wiper is fail. |
| 7 | invalid | |

Remarks
Fail Mode Conditions
detect signal discontinuity
cannot detect except the above failure.

3.4.3.6. Windshieldwiper_Mode_Rear_Status

Status of the current rear windshield wiper mode of the vehicle platform
Values

TABLE 62

| Value | Description | Remarks |
|---|---|---|
| 0 | OFF | Rear wiper stopped |
| 1 | Lo | Rear wiper being in LO mode |
| 2 | reserved | |
| 3 | INT | Rear wiper being in INT mode |
| 4-5 | reserved | |
| 6 | fail | Rear wiper failed |
| 7 | invalid | |

Remarks
cannot detect any failure.

3.4.3.7. Hvac_1st_Status

Status of activation of the 1st row HVAC
Values

TABLE 63

| value | Description | remarks |
|---|---|---|
| 0b | OFF | |
| 1b | ON | |

Remarks
N/A

3.4.3.8. Hvac_2nd_Status

Status of activation of the 2nd row HVAC

TABLE 64

| value | Description | remarks |
|---|---|---|
| 0b | OFF | |
| 1b | ON | |

Remarks
N/A

3.4.3.9. Hvac_Temperature_1st_Left_Status

Status of set temperature of 1st row left
Values

TABLE 65

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A

3.4.3.10. Hvac_Temperature_1st_Right_Status

Status of set temperature of 1st row right
Values

TABLE 66

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A

3.4.3.11. Hvac_Temperature_2nd_Left_Status

Status of set temperature of 2nd row left
Values

TABLE 67

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A

3.4.3.12. Hvac_Temperature_2nd_Right_Status

Status of set temperature of 2nd row right

TABLE 68

| value | Description | remarks |
| --- | --- | --- |
| 0 | Lo | Max cold |
| 60 to 85 [unit: ° F.] | Target temperature | |
| 100 | Hi | Max hot |
| FFh | Unknown | |

Remarks
N/A

3.4.3.13. Hvac_Fan_Level_1st_Row_Status

Status of set fan level of 1st row

TABLE 69

| value | Description | remarks |
| --- | --- | --- |
| 0 | OFF | |
| 1-7 | Fan Level | |
| 8 | Undefined | |

Remarks
N/A

3.4.3.14. Hvac_Fan_Level_2nd_Row_Status

Status of set fan level of 2nd row
Values

TABLE 70

| value | Description | remarks |
| --- | --- | --- |
| 0 | OFF | |
| 1-7 | Fan Level | |
| 8 | Undefined | |

Remarks
N/A

3.4.3.15. Hvac_1st_Row_AirOutlet_Mode_Status

Status of mode of 1st row air outlet
Values

TABLE 71

| value | Description | remarks |
| --- | --- | --- |
| 000b | ALL OFF | when Auto mode is set |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |
| 101b | DEF | The windshield defogger operates |
| 111b | Undefined | |

Remarks
N/A

3.4.3.16. Hvac_2nd_Row_AirOutlet_Mode_Status

Status of mode of 2nd row air outlet
Values

TABLE 72

| value | Description | remarks |
| --- | --- | --- |
| 000b | ALL OFF | when Auto mode is set |
| 001b | UPPER | Air flows to the upper body |
| 010b | U/F | Air flows to the upper body and feet |
| 011b | FEET | Air flows to the feet. |
| 111b | Undefined | |

Remarks
N/A

3.4.3.17. Hvac_Recirculate_Status

Status of set air recirculation mode

TABLE 73

| value | Description | remarks |
| --- | --- | --- |
| 00 | OFF | means that the air recirculation mode is OFF |
| 01 | ON | means that the air recirculation mode is ON |

Remarks
N/A

3.4.3.18. Hvac_AC_Status

Status of set AC mode
Values

TABLE 74

| value | Description | remarks |
| --- | --- | --- |
| 00 | OFF | means that the AC mode is OFF |
| 01 | ON | means that the AC mode is ON |

Remarks
N/A

3.4.3.19. 1st_Right_Seat_Occupancy_Status

Seat occupancy status in 1st left seat
Values

TABLE 75

| value | Description | remarks |
| --- | --- | --- |
| 0 | Not occupied | |
| 1 | Occupied | |
| 2 | Undecided | IG OFF or signal from sensor being lost |
| 3 | Failed | |

Remarks
When there is luggage on the seat, this signal may be set to "Occupied".

3.4.3.20. 1st_Left_Seat_Belt_Status

Status of driver's seat belt buckle switch

Values

TABLE 76

| value | Description | remarks |
|---|---|---|
| 0 | Buckled | |
| 1 | Unbuckled | |
| 2 | Undetermined | |
| 3 | Fault of a switch | |

Remarks

When Driver's seat belt buckle switch status signal is not set, [undetermined] is transmitted.

It is checking to a person in charge, when using it. (Outputs "undetermined=10" as an initial value.)

The judgement result of buckling/unbuckling shall be transferred to CAN transmission buffer within 1.3 s after IG_ON or before allowing firing, whichever is earlier.

3.4.3.21. 1st_Right_Seat_Belt_Status

Status of passenger's seat belt buckle switch

Values

TABLE 77

| value | Description | remarks |
|---|---|---|
| 0 | Buckled | |
| 1 | Unbuckled | |
| 2 | Undetermined | |
| 3 | Fault of a switch | |

Remarks

When Passenger's seat belt buckle switch status signal is not set, [undetermined] is transmitted.

It is checking to a person in charge, when using it. (Outputs "undetermined=10" as an initial value.)

The judgement result of buckling/unbuckling shall be transferred to CAN transmission buffer within 1.3 s after IG_ON or before allowing firing, whichever is earlier.

3.4.3.22. 2nd_Left_Seat_BeltStatus

Seat belt buckle switch status in 2nd left seat

Values

TABLE 78

| value | Description | remarks |
|---|---|---|
| 0 | Buckled | |
| 1 | Unbuckled | |
| 2 | Undetermined | |
| 3 | Reserved | |

Remarks cannot detect sensor failure.

3.4.3.23. 2nd_Right_Seat_Belt_Status

Seat belt buckle switch status in 2nd right seat

Values

TABLE 79

| value | Description | remarks |
|---|---|---|
| 0 | Buckled | |
| 1 | Unbuckled | |
| 2 | Undetermined | |
| 3 | Reserved | |

Remarks cannot detect any failure.

3.5. APIs for Power Control

3.5.1. Functions

T.B.D.

3.5.2. Inputs

TABLE 80

| Signal Name | Description | Redundancy |
|---|---|---|
| Power_Mode_Request | Command to control the power mode of the vehicle platform | N/A |

3.5.2.1. Power_Mode_Request

Command to control the power mode of the vehicle platform

Values

TABLE 81

| Value | Description | Remarks |
|---|---|---|
| 00 | No request | |
| 01 | Sleep | means "Ready OFF" |
| 02 | Wake | means that VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |

Remarks

Regarding "wake", let us share how to achieve this signal on the CAN. (See the other material) Basically, it is based on "ISO11989-2:2016". Also, this signal should not be a simple value. Anyway, please see the other material.

This API will reject the next request for a certain time [4000 ms] after receiving a request.

The followings are the explanation of the three power modes, i.e. [Sleep][Wake][Driving Mode], which are controllable via API.

[Sleep]

Vehicle power off condition. In this mode, the high voltage battery does not supply power, and neither VCIB nor other VP ECUs are activated.

[Wake]

VCIB is awake by the low voltage battery. In this mode, ECUs other than VCIB are not awake except for some of the body electrical ECUs.

[Driving Mode]

Ready ON mode. In this mode, the high voltage battery supplies power to the whole VP and all the VP ECUs including VCIB are awake.

3.5.3. Outputs

TABLE 82

| Signal Name | Description | Redundancy |
|---|---|---|
| Power_Mode_Status | Status of the current power mode of the vehicle platform | N/A |

3.5.3.1. Power_Mode_Status

Status of the current power mode of the vehicle platform
Values

TABLE 83

| Value | Description | Remarks |
|---|---|---|
| 00 | Resd | Reserved for same data align as mode request |
| 01 | Sleep | means "Ready OFF" |
| 02 | Wake | means that the only VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |
| 07 | unknown | means unhealthy situation would occur |

Remarks

VCIB will transmit [Sleep] as Power_Mode_Status continuously for 3000 [ins] after executing the sleep sequence. And then, VCIB will be shutdown.

3.6. APIs for Safety

3.6.1. Functions

T.B.D.

3.6.2. Inputs

TABLE 84

| Signal Name | Description | Redundancy |
|---|---|---|
| T.B.D. | | |

3.6.3. Outputs

TABLE 85

| Signal Name | Description | Redundancy |
|---|---|---|
| Request for Operation | Request for operation according to status of vehicle platform toward ADS | |
| Passive_Safety_Functions_Triggered | Collision detection signal | — |
| Brake_System_Degradation_Modes | Indicates Brake_System_Degradation_Modes | Applied |
| Propulsive_System_Degradation_Modes | Indicates Propulsive_System_Degradation_Modes | N/A |
| Direction_Control_Degradation_Modes | Indicates Direction_Control_Degradation_Modes | N/A |
| WheelLock_Control_Degradation_Modes | Indicates WheelLock_Control_Degradation_Modes | Applied |
| Steering_System_Degradation_Modes | Indicates Steering_System_Degradation_Modes | Applied |
| Power_System_Degradation_Modes | Indicates Power_System_Degradation_Modes | Applied |
| Communication_Degradation_Modes | | |

3.6.3.1. Request for Operation

Request for operation according to status of vehicle platform toward ADS
Values

TABLE 86

| value | Description | remarks |
|---|---|---|
| 0 | No request | |
| 1 | Need maintenance | |
| 2 | Need back to garage | |
| 3 | Need stopping safely immediately | |
| Others | Reserved | |

Remarks
T.B.D.

3.6.3.2. Passive_Safety_Functions_Triggered

Crash detection Signal
Values

TABLE 87

| value | Description | remarks |
|---|---|---|
| 0 | Normal | |
| 5 | Crash Detection (airbag) | |
| 6 | Crash Detection (high voltage circuit is shut off) | |
| 7 | Invalid Value | |
| Others | Reserved | |

Remarks
When the event of crash detection is generated, the signal is transmitted 50 consecutive times every 100 [ms]. If the crash detection state changes before the signal transmission is completed, the high signal of priority is transmitted.
Priority: crash detection>normal
Transmits for 5 s regardless of ordinary response at crash, because the vehicle breakdown judgment system shall send a voltage OFF request for 5 s or less after crash in HV vehicle.
Transmission interval is 100 ms within fuel cutoff motion delay allowance time (1 s) so that data can be transmitted more than 5 times. In this case, an instantaneous power interruption is taken into account.

3.6.3.3. Brake_System_Degradation_Modes

Indicate Brake_System status
Values

TABLE 88

| value | Description | remarks |
|---|---|---|
| 0 | Normal | — |
| 1 | Failure detected | — |

Remarks
When the Failure is detected, Safe stop is moved.

3.6.3.4. Propulsive_System_Degradation_Modes

Indicate Powertrain_System status
Values

TABLE 89

| value | Description | remarks |
|---|---|---|
| 0 | Normal | — |
| 1 | Failure detected | — |

Remarks
When the Failure is detected, Safe stop is moved.

3.6.3.5. Direction_Control_Degradation_Modes

Indicate Direction_Control status
Values

TABLE 90

| value | Description | remarks |
|---|---|---|
| 0 | Normal | — |
| 1 | Failure detected | — |

Remarks
When the Failure is detected, Safe stop is moved.
When the Failure is detected, Propulsion Direction Command is refused.

3.6.3.6. WheelLock_Control_Degradation_Modes

Indicate WheelLock_Control status
Values

TABLE 91

| value | Description | remarks |
|---|---|---|
| 0 | Normal | — |
| 1 | Failure detected | — |

Remarks
Primary indicates EPB status, and Secondary indicates SBW indicates.
When the Failure is detected, Safe stop is moved.

3.6.3.7. Steering_System_Degradation_Modes

Indicate Steering_System status
Values

TABLE 92

| value | Description | remarks |
|---|---|---|
| 0 | Normal | — |
| 1 | Failure detected | — |
| 2 | Stationary steering not possible | Temporary lowering in performance due to high temperature or the like |

Remarks
When the Failure are detected, Safe stop is moved.

3.6.3.8. Power_System_Degradation_Modes

[T.B.D]

3.6.3.9. Communication_Degradation_Modes

[T.B.D]

3.7. APIs for Security

3.7.1. Functions

T.B.D.

3.7.2. Inputs

TABLE 93

| Signal Name | Description | Redundancy |
|---|---|---|
| 1st_Left_Door_Lock_Command | Command to control each door lock of the vehicle platform | N/A |
| 1st_Right_Door_Lock_Command | Lock command supports only ALL Door Lock. Unlock command supports 1st-left Door unlock only, and ALL Door unlock. Trunk Door Lock/unlock command include in ALL Door lock/unlock | N/A |
| 2nd_Left_Door_Lock_Command | | N/A |
| 2nd_Right_Door_Lock_Command | | N/A |
| Central_Vehicle_Lock_Exterior_Command | Command to control the all door lock of the vehicle platform | N/A |

3.7.2.1. 1st_Left_Door_Lock_Command, 1st_Right_Door_Lock_Command, 2nd_Left_Door_Lock_Command, 2nd_Right_Door_Lock_Command Command to control each door lock of the vehicle platform Values

TABLE 94

| Value | Description | Remarks |
|---|---|---|
| 0 | No Request | |
| 1 | Lock (unsupported) | |
| 2 | Unlock | |
| 3 | reserved | |

Remarks

Lock command supports only ALL Door Lock.

Unlock command supports 1st-left Door unlock only, and ALL Door unlock.

3.7.2.2. Central_Vehicle_Lock_Exterior_Command

Command to control the all door lock of the vehicle platform.

Values

TABLE 95

| Value | Description | Remarks |
|---|---|---|
| 0 | No Request | |
| 1 | Lock (all) | include trunk lock |
| 2 | Unlock (all) | include trunk unlock |
| 3 | reserved | |

Remarks

Lock command supports only ALL Door Lock.

Unlock command supports 1st-left Door unlock only, and ALL Door unlock.

3.7.3. Outputs

TABLE 96

| Signal Name | Description | Redundancy |
|---|---|---|
| 1st_Left_Door_Lock_Status | Status of the current 1st-left door lock mode of the vehicle platform | N/A |
| 1st_Right_Door_Lock_Status | Status of the current 1st-right door lock mode of the vehicle platform | N/A |
| 2nd_Left_Door_Lock_Status | Status of the current 2nd-left door lock mode of the vehicle platform | N/A |
| 2nd_Right_Door_Lock_Status | Status of the current 2nd-right door lock mode of the vehicle platform | N/A |
| Central_Vehicle_Exterior_Locked_Status | Status of the current all door lock mode of the vehicle platform | N/A |
| Vehicle_Alarm_Status | Status of the current vehicle alarm of the vehicle platform | N/A |

3.7.3.1. 1st_Left_Door_Lock_Status

Status of the current 1st-left door lock mode of the vehicle platform
Values

TABLE 97

| value | Description | Remarks |
|---|---|---|
| 0 | reserved | |
| 1 | Locked | D seat locked |
| 2 | Unlocked | D seat unlocked |
| 3 | invalid | |

Remarks
cannot detect any failure.

3.7.3.2. 1st_Right_Door_Lock_Status

Status of the current 1st-right door lock mode of the vehicle platform
Values

TABLE 98

| value | Description | remarks |
|---|---|---|
| 0 | reserved | |
| 1 | Locked | P seat locked |
| 2 | Unlocked | P seat unlocked |
| 3 | invalid | |

Remarks
cannot detect any failure.

3.7.3.3. 2nd_Left_Door_Lock_Status

Status of the current 2nd-left door lock mode of the vehicle platform
Values

TABLE 99

| Value | Description | remarks |
|---|---|---|
| 0 | Reserved | |
| 1 | Locked | RL seat locked |
| 2 | Unlocked | RL seat unlocked |
| 3 | invalid | |

Remarks
cannot detect any failure.

3.7.3.4. 2nd_Right_Door_Lock_Status

Status of the current 2nd-right door lock mode of the vehicle platform
Values

TABLE 100

| value | Description | remarks |
|---|---|---|
| 0 | reserved | |
| 1 | Locked | RR seat locked |
| 2 | Unlocked | RR seat unlocked |
| 3 | invalid | |

Remarks
cannot detect any failure.

3.7.3.5. Central_Vehicle_Exterior_Locked_Status

Status of the current all door lock mode of the vehicle platform
Values

TABLE 101

| value | Description | remarks |
|---|---|---|
| 0 | Reserved (unsupport) | |
| 1 | All Locked (unsupport) | |
| 2 | Anything Unlocked (unsupport) | |
| 3 | invalid (unsupport) | |

Remarks
Vehicle platform refers to each door lock status, in case any door unlocked, sends 0.
in case all door locked, sends 1.

3.7.3.6. Vehicle_Alarm_Status

Status of the current vehicle alarm of the vehicle platform
Values

TABLE 102

| Value | Description | remarks |
|---|---|---|
| 0 | Disarmed | Auto alarm system not active |
| 1 | Armed | Auto alarm system active • not on alert |
| 2 | Active | Auto alarm system active • on alert |
| 3 | invalid | |

Remarks
N/A

3.8. APIs for MaaS Service

3.8.1. Functions

T.B.D.

3.8.2. Inputs

TABLE 103

| Signal Name | Description | Redundancy |
|---|---|---|
| T.B.D. | | |

3.8.3. Outputs

TABLE 104

| Signal Name | Description | Redundancy |
|---|---|---|
| T.B.D. | | |

Example 2

Toyota's MaaS Vehicle Platform
Architecture Specification
[Standard Edition #0.1]
History of Revision

TABLE 105

| Date of Revision | ver. | Summary of Revision | Reviser |
|---|---|---|---|
| 2019 Nov. 4 | 0.1 | Creating a new material | MaaS Business Div. |

Index
1. General Concept 4
1.1. Purpose of this Specification 4
1.2. Target Vehicle Type 4
1.3. Target Electronic Platform 4
1.4. Definition of Term 4
1.5. Precaution for Handling 4
1.6. Overall Structure of MaaS 4
1.7. Adopted Development Process 6
1.8. ODD (Operational Design Domain) 6
2. Safety Concept 7
2.1. Outline 7
2.2. Hazard analysis and risk assessment 7
2.3. Allocation of safety requirements 8
2.4. Redundancy 8
3. Security Concept 10
3.1. Outline 10
3.2. Assumed Risks 10
3.3. Countermeasure for the risks 10
   3.3.1. The countermeasure for a remote attack 11
   3.3.2. The countermeasure for a modification 11
3.4. Addressing Held Data Information 11
3.5. Addressing Vulnerability 11
3.6. Contract with Operation Entity 11
4. System Architecture 12
4.1. Outline 12
4.2. Physical LAN architecture (in-Vehicle) 12
4.3. Power Supply Structure 14
5. Function Allocation 15
5.1. in a healthy situation 15
5.2. in a single failure 16
6. Data Collection 18
6.1. At event 18
6.2. Constantly 18

1. General Concept

1.1. Purpose of this Specification

This document is an architecture specification of Toyota's MaaS Vehicle Platform and contains the outline of system in vehicle level.

1.2. Target Vehicle Type

This specification is applied to the Toyota vehicles with the electronic platform called 19ePF [ver.1 and ver.2].
The representative vehicle with 19ePF is shown as follows.
e-Palette, Sienna, RAV4, and so on.

1.3. Definition of Term

TABLE 106

| Term | Definition |
| --- | --- |
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.
All the contents are subject to change. Such changes are notified to the users. Please note that some parts are still T.B.D. will be updated in the future.

2. Architectural Concept

2.1. Overall Structure of MaaS

Figure 22:
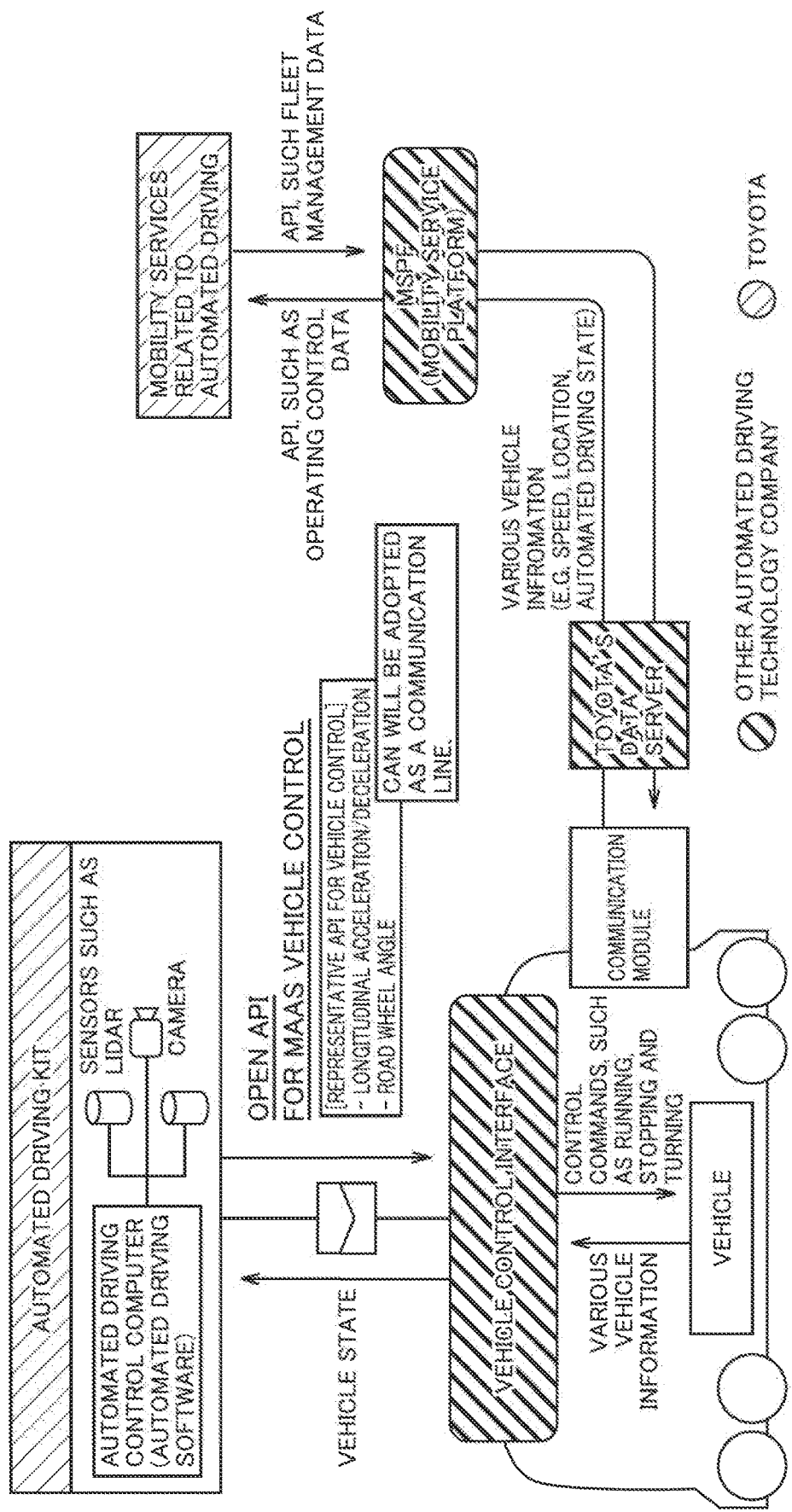
FIG. 22 is a diagram of an overall configuration of MaaS.

The overall structure of MaaS with the target vehicle is shown (FIG. 22).
Vehicle control technology is being used as an interface for technology providers.
Technology providers can receive open API such as vehicle state and vehicle control, necessary for development of automated driving systems.

2.2. Outline of System Architecture on the Vehicle

Figure 23:
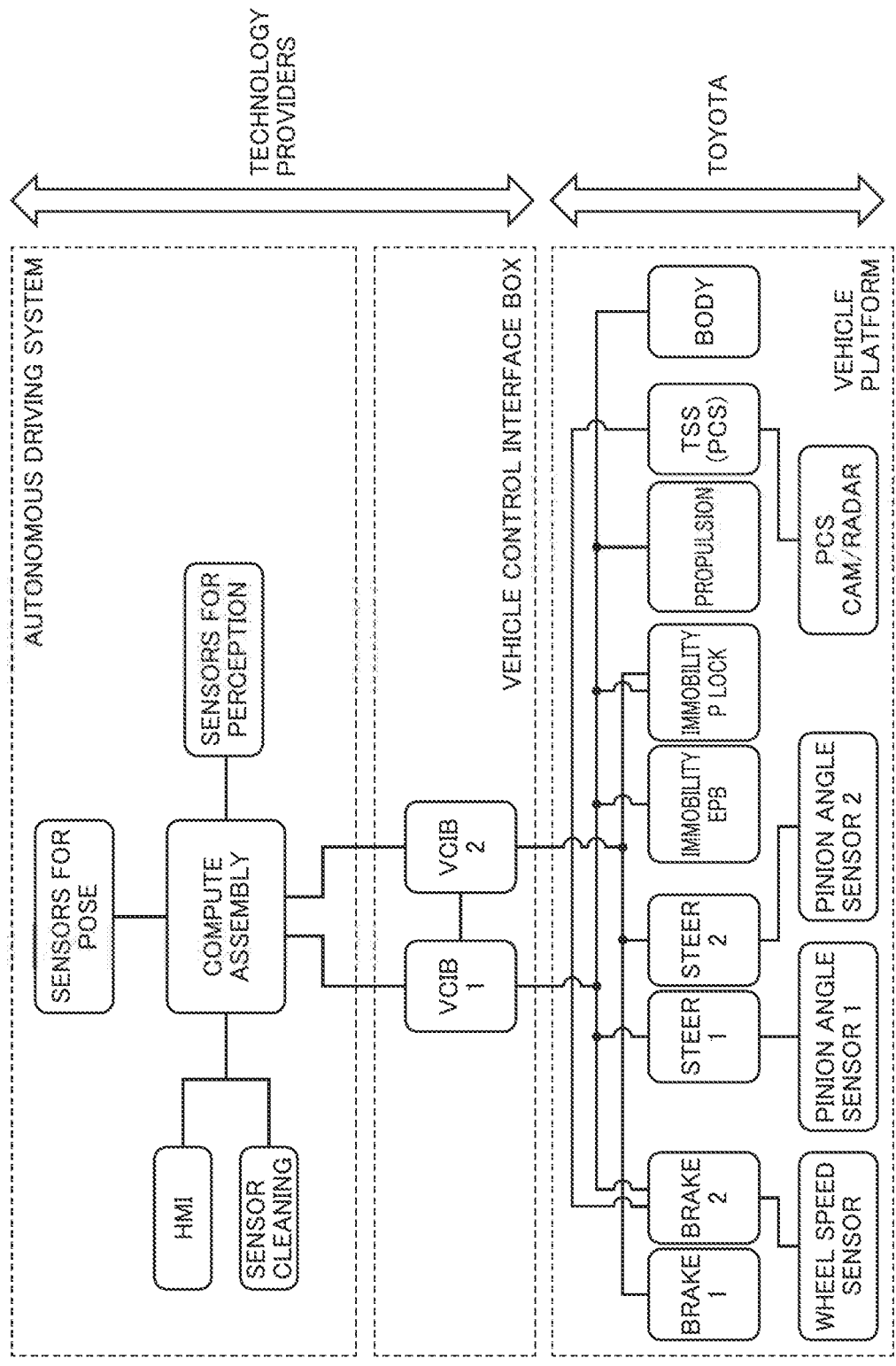
FIG. 23 is a diagram of a system configuration of a vehicle.

The system architecture on the vehicle as a premise is shown (FIG. 23).
The target vehicle of this document will adopt the physical architecture of using CAN for the bus between ADS and VCIB. In order to realize each API in this document, the CAN frames and the bit assignments are shown in the form of "bit assignment chart" as a separate document.

2.3. Outline of Power Supply Architecture on the Vehicle

Figure 24:
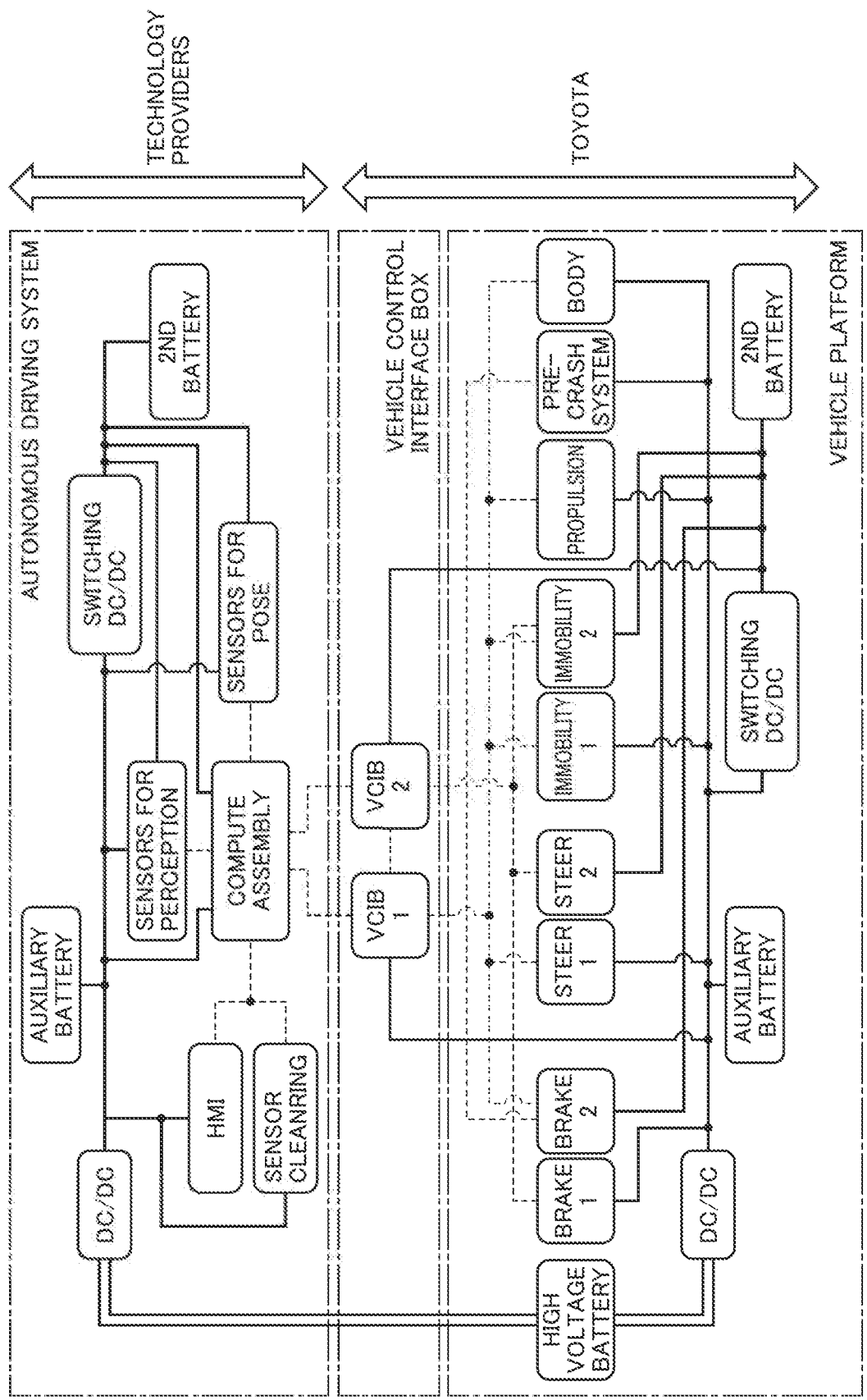
FIG. 24 is a diagram showing the vehicle's power feeding configuration.

The power supply architecture as a premise is shown as follows (FIG. 24).
The blue colored parts are provided from an ADS provider. And the orange colored parts are provided from the VP.
The power structure for ADS is isolate from the power structure for VP. Also, the ADS provider should install a redundant power structure isolated from the VP.

3. Safety Concept

3.1. Overall Safety Concept

Figure 25:
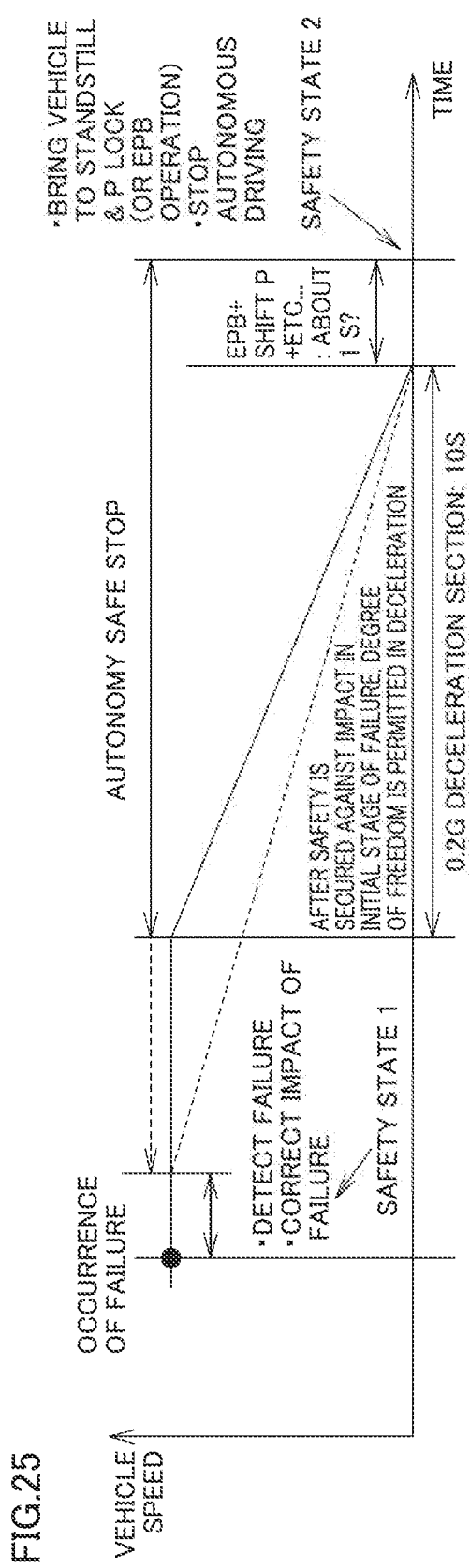
FIG. 25 is a diagram for illustrating a strategy taken until the vehicle is safely brought to a standstill when a failure occurs.

The basic safety concept is shown as follows.
The strategy of bringing the vehicle to a safe stop when a failure occurs is shown as follows (FIG. 25).
1. After occurrence of a failure, the entire vehicle executes "detecting a failure" and "correcting an impact of failure" and then achieves the safety state 1.
2. Obeying the instructions from the ADS, the entire vehicle stops in a safe space at a safe speed (assumed less than 0.2 G).
However, depending on a situation, the entire vehicle should happen a deceleration more than the above deceleration if needed.
3. After stopping, in order to prevent slipping down, the entire vehicle achieves the safety state 2 by activating the immobilization system.

TABLE 107

| category | content |
| --- | --- |
| Precondition | Only one single failure at a time across the entire integrated vehicle. (Multiple failures are not covered) After the initial single failure, no other failure is anticipated in the duration in which the functionality is maintained. |
| Responsibility for the vehicle platform until safety state 2 | In case of a single failure, the integrated vehicle should maintain the necessary functionality for safety stop. The functionality should be maintained for 15 (fifteen) seconds. |

TABLE 107-continued

| category | content |
|---|---|
| Basic Responsibility Sharing | [For ADS]<br>The ADS should create the driving plan, and should indicate vehicle control values to the VP.<br>[For Toyota vehicle platform]<br>The Toyota VP should control each system of the VP based on indications from the ADS. |

See the separated document called "Fault Management" regarding notifiable single failure and expected behavior for the ADS.

3.2. Redundancy

The redundant functionalities with Toyota's MaaS vehicle are shown.

Toyota's Vehicle Platform has the following redundant functionalities to meet the safety goals led from the functional safety analysis.

Redundant Braking

Any single failure on the Braking System doesn't cause loss of braking functionality. However, depending on where the failure occurred, the capability left might not be equivalent to the primary system's capability. In this case, the braking system is designed to prevent the capability from becoming 0.3 G or less.

Redundant Steering

Any single failure on the Steering System doesn't cause loss of steering functionality. However, depending on where the failure occurred, the capability left might not be equivalent to the primary system's capability. In this case, the steering system is designed to prevent the capability from becoming 0.3 G or less.

Redundant Immobilization

Toyota's MaaS vehicle has 2 immobilization systems, i.e. P lock and EPB. Therefore, any single failure of immobilization system doesn't cause loss of the immobilization capability. However, in the case of failure, maximum stationary slope angle is less steep than when the systems are healthy.

Redundant Power

Any single failure on the Power Supply System doesn't cause loss of power supply functionality. However, in case of the primary power failure, the secondary power supply system keeps supplying power to the limited systems for a certain time.

Redundant Communication

Any single failure on the Communication System doesn't cause loss of all the communication functionality. System which needs redundancy has physical redundant communication lines. For more detail information, see the chapter "Physical LAN architecture (in-Vehicle)".

4. Security Concept

4.1. Outline

Regarding security, Toyota's MaaS vehicle adopts the security document issued by Toyota as an upper document.

4.2. Assumed Risks

The entire risk includes not only the risks assumed on the base e-PF but also the risks assumed for the Autono-MaaS vehicle.

The entire risk is shown as follows.
[Remote Attack]
To vehicle
  Spoofing the center
  ECU Software Alternation
  DoS Attack
  Sniffing
From vehicle
  Spoofing the other vehicle
  Software Alternation for a center or an ECU on the other vehicle
  DoS Attack to a center or other vehicle
  Uploading illegal data
[Modification]
Illegal Reprogramming
Setting up an illegal ADK
Installation of an unauthenticated product by a customer

4.3. Countermeasure for the Risks

The countermeasure of the above assumed risks is shown as follows.

4.3.1. The Countermeasure for a Remote Attack

The countermeasure for a remote attack is shown as follows.

Since the autonomous driving kit communicates with the center of the operation entity, end-to-end security should be ensured. Since a function to provide a travel control instruction is performed, multi-layered protection in the autonomous driving kit is required. Use a secure microcomputer or a security chip in the autonomous driving kit and provide sufficient security measures as the first layer against access from the outside. Use another secure microcomputer and another security chip to provide security as the second layer. (Multi-layered protection in the autonomous driving kit including protection as the first layer to prevent direct entry from the outside and protection as the second layer as the layer below the former)

4.3.2. The Countermeasure for a Modification

The countermeasure for a modification is shown as follows.

For measures against a counterfeit autonomous driving kit, device authentication and message authentication are carried out. In storing a key, measures against tampering should be provided and a key set is changed for each pair of a vehicle and an autonomous driving kit. Alternatively, the contract should stipulate that the operation entity exercise sufficient management so as not to allow attachment of an unauthorized kit. For measures against attachment of an unauthorized product by an Autono-MaaS vehicle user, the contract should stipulate that the operation entity exercise management not to allow attachment of an unauthorized kit.

In application to actual vehicles, conduct credible threat analysis together, and measures for addressing most recent vulnerability of the autonomous driving kit at the time of LO should be completed.

5. Function Allocation

5.1. In a Healthy Situation

Figure 26:
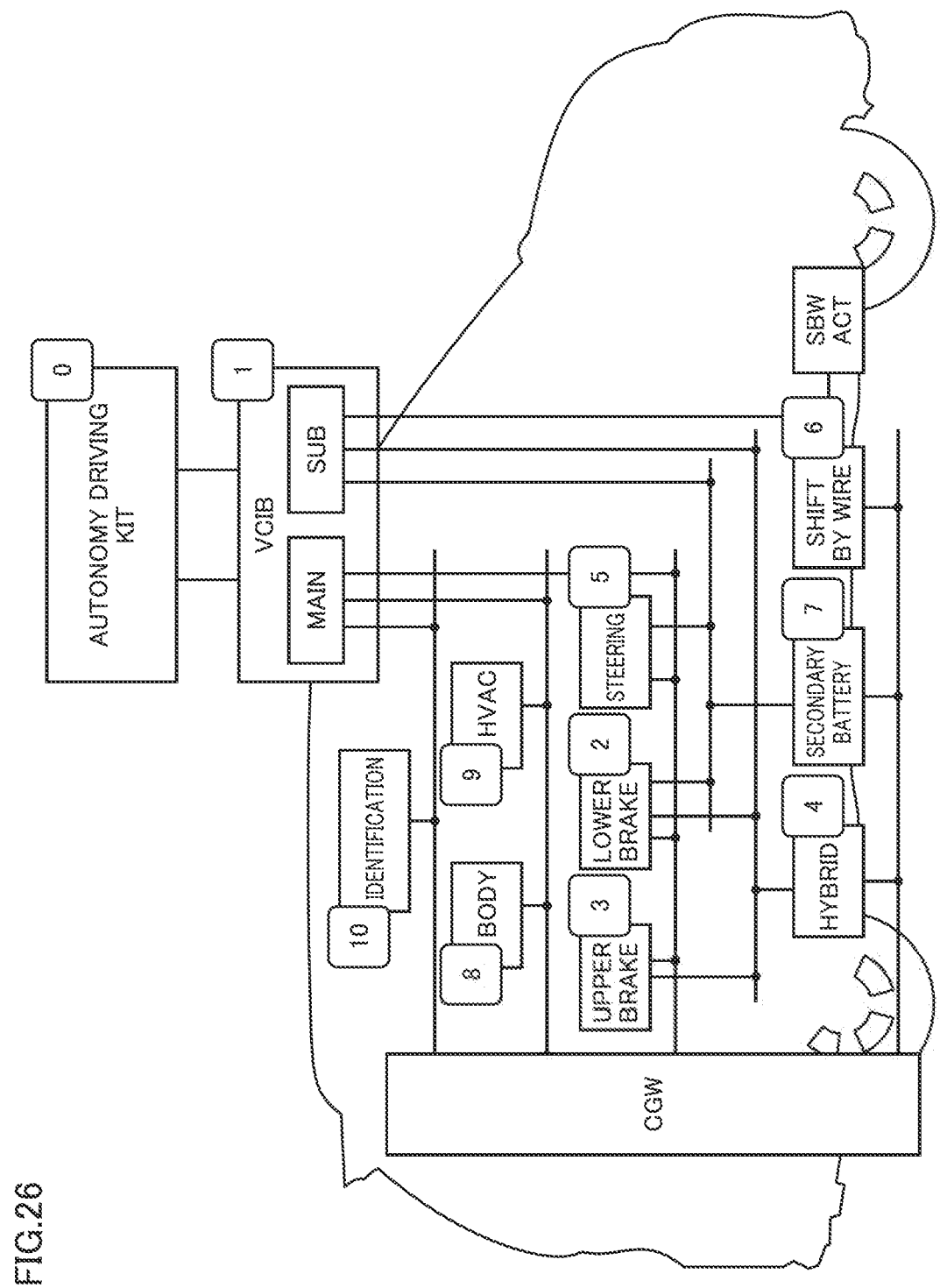
FIG. 26 is a diagram showing an arrangement of representative functions of the vehicle.

The allocation of representative functionalities is shown as below (FIG. 26).

[Function Allocation]

TABLE 108

| Function category | Function name | Related to # | remarks |
|---|---|---|---|
| Planning | Plan for driving path | 0 | |
| | Calculating control indications | 0 | e.g. longitudinal G |
| Overall | API Pub/Sub | 1 | One system with redundancy |
| Security | Autonomy Driving Kit Authentication | 1 | One system with redundancy |
| | Message Authentication | 1 | One system with redundancy |
| | Door locking control | 8 | |
| Longitudinal/Lateral | Motion control | 2 (Primary), 3 (Secondary) | |
| | Propulsion control | 4 | |
| | Braking control | 2, 3 | Two units controlled according to deceleration requirement |
| | Steering control | 5 | One system with redundancy |
| | Immobilization control | 2 (EPB), 6 (P Lock) | |
| | Shift control | 6 | |
| Power supply | Secondary battery control | 7 | |
| | Vehicle power control | 10 | For more information, see the API specification. |
| Access/Comfort | Body control | 8 | Turn signal, Headlight, Window, etc. |
| | HVAC control | 9 | |
| Data | Data logging (at event) | 1 | |
| | Data logging (constantly) | 1 | |

5.2. In a Single Failure

See the separated document called "Fault Management" regarding notifiable single failure and expected behavior for the ADS.

Though embodiments of the present disclosure have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A vehicle comprising:
a vehicular body on which an autonomous driving system is mountable on and removable from, wherein
the vehicular body includes a vehicle platform and a vehicle control interface,
the vehicle control interface mediates communication of a signal between the vehicle platform and the autonomous driving system,
the vehicle platform includes a system, a sensor, and a control device to control the vehicular body,
the vehicle without the autonomous driving system is drivable with the vehicular body alone,
the vehicle control interface include an electronic controller,
the electronic controller includes a processor,
the electronic controller converts a command received from the autonomous driving system into a format of a signal that is processed by the vehicle platform, and sends the converted command to the vehicle platform, the command including a first command to request to switch a shift range to another,
the vehicle control interface outputs to the autonomous driving system a first signal indicating a state of an autonomous mode or a manual mode,
the vehicle platform detects a state of the vehicular body and sends a detection signal indicating the detected state to the vehicle control interface,
the electronic controller obtains a state signal indicating the state of the vehicular body based on the detection signal, and outputs the state signal to the autonomous driving system, the state signal including a second signal indicating a moving direction of the vehicle,
when the vehicle control interface outputs the first signal indicating the autonomous mode, the electronic controller determines whether the second signal indicates a standstill and whether the first command indicates no request,
when the electronic controller determines that the second signal indicates a standstill and the first command does not indicate no request, the control device of the vehicle platform performs a shift change required by the first command, and
when the electronic controller determines that the second signal does not indicate a standstill and the first command does not indicate no request, the control device of the vehicle platform does not perform the shift change required by the first command,
wherein the first command is set to any one of a first value indicating no request, a second value requesting a shift to a reverse range, and a third value requesting a shift to a drive range, when the electronic controller determines that the second signal indicates a standstill and the first command indicates the first value, the control device of the vehicle platform does not perform a shift change, when the electronic controller determines that the second signal indicates a standstill and the first command indicates the second value, the control device of the vehicle platform switches a shift range to the reverse range, and when the electronic controller determines that the second signal indicates a standstill and the first command indicates the third value, the control device of the vehicle platform switches a shift range to the drive range.

2. The vehicle according to claim 1, wherein
the command sent from the autonomous driving system to the vehicle control interface further includes a second command to request acceleration and deceleration, when the vehicle control interface issues a first control command corresponding to the first command to request the vehicle platform to switch a shift range to another in order to perform a shift change of the vehicle, the vehicle control interface also issues a second control command corresponding to the second command to simultaneously request the vehicle platform to provide deceleration.

3. The vehicle according to claim 2, wherein
when the electronic controller determines that the second signal indicates a standstill and the first command does not indicate no request, the vehicle control interface transmits the first control command to the vehicle platform to instruct the vehicle platform to start the shift change, when the vehicle control interface transmits the first control command, the electronic controller determines whether the shift change has been completed, and the vehicle control interface issues the second control command to continue to request the vehicle platform to provide deceleration while the electronic controller determines that the shift change is not completed.

4. The vehicle according to claim 1, wherein
the vehicle includes a shift lever,
the vehicle control interface further outputs to the autonomous driving system a third signal indicating a current shift range of the vehicle, when the first signal indicates the autonomous mode, a driver operation of the shift lever is not reflected in the third signal, when the first signal indicates the manual mode, a driver operation of the shift lever is reflected in the third signal.

5. The vehicle according to claim 4, wherein
the vehicle control interface further outputs to the autonomous driving system a fourth signal indicating a shift lever position by a driver, and the autonomous driving system determines a value for the first command by referring to the fourth signal.

6. The vehicle according to claim 1, wherein the second signal indicates a standstill when all wheels of the vehicle continue a speed of 0 for a prescribed period of time, the second signal indicates forward motion when more than half of the wheels of the vehicle rotate forward, and the second signal indicates backward motion when more than half the wheels of the vehicle rotate backward.

7. The vehicle according to claim 1, wherein the autonomous driving system is mounted on the vehicular body.

8. The vehicle according to claim 7, wherein the vehicle control interface communicates signals with the autonomous driving system through an Application Program Interface (API) defining each signal to be communicated.

9. The vehicle according to claim 8, wherein the vehicle control interface communicates signals defined by an automobile manufacturer with the vehicle platform.

10. The vehicle according to claim 1, wherein the vehicle platform includes a plurality of systems to implement equivalent functions.

11. The vehicle according to claim 10, wherein in the vehicle platform, functions for braking, steering, and locking the vehicle are provided with redundancy.

* * * * *